(12) United States Patent
Jolly et al.

(10) Patent No.: US 8,162,606 B2
(45) Date of Patent: Apr. 24, 2012

(54) HELICOPTER HUB MOUNTED VIBRATION CONTROL AND CIRCULAR FORCE GENERATION SYSTEMS FOR CANCELING VIBRATIONS

(75) Inventors: Mark R. Jolly, Raleigh, NC (US);
Andrew D. Meyers, Apex, NC (US);
Daniel Mellinger, Philadelphia, PA (US); Douglas E. Ivers, Cary, NC (US);
Askari Badre-Alam, Apex, NC (US);
Douglas A. Swanson, Apex, NC (US);
Russell E. Altieri, Cary, NC (US)

(73) Assignee: Lord Corporation, Cary, NC (US)

( * ) Notice: Subject to any disclaimer, the term of this patent is extended or adjusted under 35 U.S.C. 154(b) by 579 days.

(21) Appl. No.: 12/419,775

(22) Filed: Apr. 7, 2009

(65) Prior Publication Data
US 2010/0034655 A1    Feb. 11, 2010

Related U.S. Application Data

(63) Continuation-in-part of application No. 12/286,461, filed on Sep. 30, 2008, now Pat. No. 7,942,633, which is a continuation of application No. 11/215,388, filed on Aug. 30, 2005, now Pat. No. 7,448,854, application No. 12/419,775, which is a continuation-in-part of application No. 11/557,384, filed on Nov. 7, 2006, now Pat. No. 7,722,322, and a continuation-in-part of application No. 11/215,388, filed on Aug. 30, 2005, now Pat. No. 7,448,854, application No. 12/419,775, which is a continuation-in-part of application No. 12/288,867, filed on Oct. 24, 2008, now Pat. No. 8,090,482.

(60) Provisional application No. 60/605,470, filed on Aug. 30, 2004, provisional application No. 60/734,232, filed on Nov. 7, 2005, provisional application No. 61/042,980, filed on Apr. 7, 2008, provisional application No. 61/122,160, filed on Dec. 12, 2008, provisional application No. 60/982,612, filed on Oct. 25, 2007.

(51) Int. Cl.
*F04D 29/26* (2006.01)
*F01D 5/26* (2006.01)
*B64C 11/00* (2006.01)

(52) U.S. Cl. ............... 416/1; 416/61; 416/500; 415/1; 415/119

(58) Field of Classification Search ............... 415/1, 10, 415/119; 416/1, 55, 60, 61, 500
See application file for complete search history.

(56) References Cited

U.S. PATENT DOCUMENTS
2,425,650 A    8/1947    Stalker
(Continued)

FOREIGN PATENT DOCUMENTS
EP    0337040 A1    10/1989
(Continued)

OTHER PUBLICATIONS

Hutchinson Worldwide, Advanced Products Overview, 2005, 17 pages, Evry, France.

(Continued)

*Primary Examiner* — Igor Kershteyn
(74) *Attorney, Agent, or Firm* — Richard G. Miller

(57) ABSTRACT

A rotary wing aircraft including a vehicle vibration control system. The vehicle vibration control system includes a rotating hub mounted vibration control system, the rotating hub mounted vibration control system mounted to the rotating rotary wing hub with the rotating hub mounted vibration control system rotating with the rotating rotary wing hub. The vehicle vibration control system includes a rotary wing aircraft member sensor for outputting rotary wing aircraft member data correlating to the relative rotation of the rotating rotary wing hub member rotating relative to the nonrotating body, at least a first nonrotating body vibration sensor, the at least first nonrotating body vibration sensor outputting at least first nonrotating body vibration sensor data correlating to vibrations, at least a first nonrotating body circular force generator, the at least a first nonrotating body circular force generator fixedly coupled with the nonrotating body, and a distributed force generation data communications network link.

19 Claims, 64 Drawing Sheets

U.S. PATENT DOCUMENTS

| | | | |
|---|---|---|---|
| 3,091,712 A * | 5/1963 | Galbraith | 310/81 |
| 3,158,038 A | 11/1964 | Goodman | |
| 3,219,120 A | 11/1965 | Hopper | |
| 3,412,961 A | 11/1968 | Howard | |
| 3,509,971 A | 5/1970 | Gerstine et al. | |
| 3,538,469 A | 11/1970 | Litte et al. | |
| 3,540,809 A | 11/1970 | Paul et al. | |
| 3,617,020 A | 11/1971 | Gerstine et al. | |
| 3,635,427 A | 1/1972 | Balke | |
| 3,649,132 A | 3/1972 | Arcidiacono | |
| 3,761,851 A | 9/1973 | Nelson | |
| 3,770,997 A | 11/1973 | Presley | |
| 3,783,746 A | 1/1974 | Jacobellis | |
| 3,807,678 A | 4/1974 | Karnopp et al. | |
| 3,811,313 A | 5/1974 | Schut | |
| 3,830,109 A | 8/1974 | Litvinovich et al. | |
| 3,839,945 A | 10/1974 | Jacobellis | |
| 3,857,535 A | 12/1974 | Osder | |
| 3,910,720 A | 10/1975 | Vincent et al. | |
| 4,057,363 A | 11/1977 | Kenigsberg et al. | |
| 4,083,654 A | 4/1978 | Kenigsberg et al. | |
| 4,084,445 A | 4/1978 | Erwin | |
| 4,211,121 A * | 7/1980 | Brown | 74/87 |
| 4,213,584 A | 7/1980 | Tefft et al. | |
| 4,218,187 A | 8/1980 | Madden | |
| 4,255,084 A | 3/1981 | Mouille et al. | |
| 4,326,158 A | 4/1982 | Helgesen | |
| 4,426,911 A | 1/1984 | Robinson et al. | |
| 4,479,098 A | 10/1984 | Watson et al. | |
| 4,483,425 A | 11/1984 | Newman | |
| 4,561,319 A * | 12/1985 | Lilja | 74/61 |
| 4,596,513 A | 6/1986 | Carlson et al. | |
| 4,699,348 A | 10/1987 | Freudenberg | |
| 4,808,955 A | 2/1989 | Godkin et al. | |
| 4,892,328 A | 1/1990 | Kurtzman et al. | |
| 4,901,573 A | 2/1990 | Srinivasan et al. | |
| 4,922,159 A | 5/1990 | Phillips et al. | |
| 4,928,028 A | 5/1990 | Leibovich | |
| 4,953,098 A | 8/1990 | Fischer, Jr. et al. | |
| 4,963,804 A | 10/1990 | Geiger | |
| 5,005,439 A | 4/1991 | Jensen et al. | |
| 5,092,195 A | 3/1992 | Parsons | |
| 5,102,289 A | 4/1992 | Yokoshima et al. | |
| 5,170,103 A | 12/1992 | Rouch et al. | |
| 5,170,104 A | 12/1992 | Laughlin | |
| 5,202,824 A | 4/1993 | Chen | |
| 5,213,184 A | 5/1993 | Legouis et al. | |
| 5,219,143 A | 6/1993 | Staple et al. | |
| 5,231,336 A | 7/1993 | Van Namen | |
| 5,251,863 A | 10/1993 | Gossman et al. | |
| 5,253,542 A | 10/1993 | Houze | |
| 5,278,913 A | 1/1994 | Delfosse et al. | |
| 5,310,137 A | 5/1994 | Yoerkie, Jr. et al. | |
| 5,345,206 A | 9/1994 | Morcos | |
| 5,347,884 A | 9/1994 | Garnjost et al. | |
| 5,369,348 A | 11/1994 | Gennesseaux | |
| 5,375,794 A | 12/1994 | Bleeg | |
| 5,410,879 A | 5/1995 | Houze | |
| 5,452,865 A | 9/1995 | Tran et al. | |
| 5,497,861 A | 3/1996 | Brotz | |
| 5,526,292 A | 6/1996 | Hodgson et al. | |
| 5,549,290 A | 8/1996 | Long et al. | |
| 5,553,514 A | 9/1996 | Walkowc | |
| 5,604,413 A | 2/1997 | Khorrami et al. | |
| 5,620,068 A | 4/1997 | Garnjost et al. | |
| 5,639,214 A | 6/1997 | Guimbal | |
| 5,647,726 A | 7/1997 | Sehgal et al. | |
| 5,667,166 A | 9/1997 | Tran et al. | |
| 5,682,069 A | 10/1997 | Phillips et al. | |
| 5,691,582 A | 11/1997 | Lucas et al. | |
| 5,710,822 A | 1/1998 | Steenhagen et al. | |
| 5,757,662 A | 5/1998 | Dyer et al. | |
| 5,811,821 A | 9/1998 | Alexander et al. | |
| 5,825,663 A | 10/1998 | Barba et al. | |
| 5,860,625 A | 1/1999 | Tran et al. | |
| 5,883,478 A | 3/1999 | Thesling | |
| 5,896,076 A | 4/1999 | Van Namen | |
| 5,903,077 A | 5/1999 | Garnjost et al. | |
| 5,920,173 A | 7/1999 | Mercadal et al. | |
| 6,006,875 A | 12/1999 | Van Namen | |
| 6,009,985 A | 1/2000 | Ivers | |
| 6,018,689 A | 1/2000 | Kumura et al. | |
| 6,045,090 A | 4/2000 | Krysinsky et al. | |
| 6,059,274 A | 5/2000 | Owen et al. | |
| 6,062,818 A | 5/2000 | Manfredotti et al. | |
| 6,067,853 A | 5/2000 | Thevenot | |
| 6,094,601 A | 7/2000 | Popovich | |
| 6,105,685 A | 8/2000 | Bald | |
| 6,139,271 A | 10/2000 | Chadwick | |
| 6,212,445 B1 | 4/2001 | Barba et al. | |
| 6,216,047 B1 | 4/2001 | Goto | |
| 6,229,898 B1 | 5/2001 | Goodman | |
| 6,236,934 B1 | 5/2001 | Dyer et al. | |
| 6,279,704 B1 | 8/2001 | Manfredotti | |
| 6,289,575 B1 | 9/2001 | Hollingsworth et al. | |
| 6,296,093 B1 | 10/2001 | Norris et al. | |
| 6,318,527 B1 | 11/2001 | Byrnes et al. | |
| 6,354,536 B1 | 3/2002 | Torok et al. | |
| 6,355,994 B1 | 3/2002 | Andeen et al. | |
| 6,375,127 B1 | 4/2002 | Appa | |
| 6,382,049 B1 | 5/2002 | Chiou et al. | |
| 6,416,016 B1 | 7/2002 | Welsh | |
| 6,418,228 B1 | 7/2002 | Terai et al. | |
| 6,443,273 B1 | 9/2002 | Ledbetter et al. | |
| 6,467,723 B1 | 10/2002 | Rossetti | |
| 6,476,534 B1 | 11/2002 | Vanderbeck et al. | |
| 6,480,609 B1 | 11/2002 | Strehlow et al. | |
| 6,504,278 B1 | 1/2003 | Bald et al. | |
| 6,512,435 B2 | 1/2003 | Van Namen | |
| 6,603,224 B1 | 8/2003 | Hollingsworth et al. | |
| 6,618,646 B1 | 9/2003 | Dyer | |
| 6,639,496 B1 | 10/2003 | Van Namen | |
| 6,644,590 B2 | 11/2003 | Terpay et al. | |
| 6,719,503 B1 | 4/2004 | McCalmont et al. | |
| 6,769,872 B2 | 8/2004 | Torok et al. | |
| 6,869,375 B2 | 3/2005 | Welsh | |
| 7,025,342 B2 | 4/2006 | Nemoto et al. | |
| 7,047,109 B2 | 5/2006 | Ogura et al. | |
| 7,093,806 B2 | 8/2006 | Osterberg | |
| 7,118,328 B2 | 10/2006 | Welsh et al. | |
| 7,132,817 B2 | 11/2006 | Noe | |
| 7,155,973 B2 | 1/2007 | Dyer | |
| 7,288,861 B1 | 10/2007 | Willard et al. | |
| 7,448,854 B2 | 11/2008 | Jolly | |
| 7,471,057 B2 | 12/2008 | Clary | |
| 7,554,237 B2 | 6/2009 | Clary | |
| 7,722,322 B2 | 5/2010 | Altieri et al. | |
| 2001/0035068 A1 | 11/2001 | Case et al. | |
| 2002/0123403 A1 | 9/2002 | Welsh | |
| 2003/0060903 A1 | 3/2003 | MacMartin et al. | |
| 2003/0089193 A1 | 5/2003 | Altieri et al. | |
| 2004/0036367 A1 | 2/2004 | Denton et al. | |
| 2004/0050999 A1 | 3/2004 | Hill et al. | |
| 2004/0098168 A1 | 5/2004 | Dyer | |
| 2005/0067908 A1* | 3/2005 | Nai et al. | 310/112 |
| 2005/0075210 A1 | 4/2005 | Frederickson | |
| 2005/0079056 A1 | 4/2005 | Welsh | |
| 2005/0114053 A1 | 5/2005 | Southward et al. | |
| 2005/0184193 A1 | 8/2005 | Bourjac | |
| 2005/0201863 A1 | 9/2005 | Welsh | |
| 2006/0054738 A1 | 3/2006 | Badre-Alam | |
| 2006/0083617 A1 | 4/2006 | Jolly et al. | |
| 2006/0135302 A1 | 6/2006 | Manfredotti et al. | |
| 2007/0156289 A1 | 7/2007 | Altieri et al. | |
| 2009/0035137 A1 | 2/2009 | Jolly et al. | |
| 2009/0116963 A1 | 5/2009 | Welsh | |
| 2009/0236468 A1 | 9/2009 | Welsh | |
| 2009/0254230 A1 | 10/2009 | Jolly et al. | |
| 2010/0012768 A1 | 1/2010 | Jolly | |
| 2010/0034655 A1 | 2/2010 | Jolly et al. | |
| 2010/0209242 A1 | 8/2010 | Popelka et al. | |
| 2010/0221096 A1 | 9/2010 | Altieri et al. | |
| 2010/0221110 A1 | 9/2010 | Jolly et al. | |
| 2011/0027081 A1 | 2/2011 | Jolly et al. | |

FOREIGN PATENT DOCUMENTS

| | | |
|---|---|---|
| EP | 0409462 A1 | 1/1991 |
| EP | 0409462 B1 | 1/1991 |
| EP | 0506772 B1 | 10/1992 |
| EP | 0601527 B1 | 4/1997 |
| EP | 0805288 A2 | 5/1997 |
| EP | 0776431 B1 | 6/1997 |
| EP | 0840191 A1 | 5/1998 |
| GB | 1120193 | 7/1968 |
| JP | 61164109 A | 7/1986 |
| JP | 2001233296 | 8/2001 |
| WO | 00049309 | 8/2000 |
| WO | 03028194 A1 | 4/2003 |
| WO | 03072436 A1 | 9/2003 |
| WO | 2006135405 A2 | 12/2006 |
| WO | 2008033884 A2 | 3/2008 |
| WO | 2008079431 A2 | 7/2008 |
| WO | 2008133614 A1 | 11/2008 |
| WO | 2009055007 A2 | 4/2009 |

OTHER PUBLICATIONS

Renishaw, Magnetic rotary encoders, http://www.renishaw.com/client/product/UKEnglish/PGP-1136.shtml, Jun. 5, 2006, 2 pages.

Austriamicrosystems, AS 5045 12-bit programmable magnetic rotary encoder, http://www.austriamicrosystems.com/03products/products detail/AS5045/description AS5045.htm, Jun. 5, 2006, 1 page.

Austriamicrosystems, AS 5043 10-bit programmable 360 magnetic angle encoder with absolute digital and analog outputs, http://www.austriamicrosystems.com/03products/products detail/AS5043/description AS5043.htm, Jun. 5, 2006, 1 page.

Austriamicrosystems, AS 5040 10-bit programmable magnetic rotary encoder, http://www.austriamicrosystems.com/03products/products detail/AS5040/description AS5040.htm, Jun. 5, 2006, 1 page.

Austriamicrosystems, AS 5035 programmable 64ppr incremental magnetic rotary encoder, http://www.austriamicrosystems.com/03products detail/AS5035/description AS5035.htm, Jun. 5, 2006, 1 page.

Renishaw, RM22 non-contact 5V, http://www.renishaw.com/client/product/UKEnglish/PGP-6074.shtml, Jun. 5, 2006, 3 pages.

Moog Aircraft Group, Vibration Suppression Actuation System, http://www.moog.com. 2001, 2 pages, East Aurora, New York, U.S.

Aviation Week, Boeing's CH-47 ULOR-the Wing's the Thing, 2008, The McGraw-Hill Companies, Inc., 2 pages.

National Aeronautics and Space Administration, Dynamic Response of NASA Rotor Test Apparatus and Sikorsky S-76 Hub Mounted in the 80- by 120-Foot Wind Tunnel, NASA Technical Memorandum 108847, Sep. 1994, 28 pages.

Oliviera. Bauchau, Jesus Rodriguez, Shyi-Yaung Chen, Modeling the Bifilar Pendulum Using Nonlinear, Flexible Multibody Dynmaics, Journal of the American Helicopter Society, 47, No. 1, pp. 53-62, 2003, 36 pages.

Eliot Quon, Mechanical and Aerospace Engineering, Sikorsky Aircraft, Summer 2007.

Heverly D E et al, An Optimal Actuator Placement Methodology for Active Control of Helicopter Airframe Vibrations, Journal of the American Helicopter Society, American Helicopter Society, Alexandria, VA, US, vol. 46, No. 4, Oct. 1, 2011, pp. 251-261.

Kollmorgen, BM(s) Series Motors, Radford, VA, pp. 1-17.

Moog Inc., General Characteristics—High Frequency Rotor/Stator Units, East Aurora, NY, pp. 1-6.

Advances Motion Controls, B30A40 Series Brushless Servo Amplifiers, Camarillo, CA, pp. C-59-C-66.

BEI Technologies, Inc., VCA 100 Standalone Voice Coil Servo Controller/Amplifier, Sep. 19, 2003, pp. 1-2.

KCF Technologies, Inc., Electro-Magnetic Shaker (20 N), Part No. KCF-5500, pp. 1-5.

Padfield, R. Randall, Bell 427 Much More than a 407 with a Second Engine, www.ainonline.com, Mar. 15, 2005, pp. 1-12.

Oswald Regelbare Elektromotoren, Linear Direct Drives, Three-Phase Synchronous Linear Motors, Series LIN-S . . . L with external cooling, Series LIN-S . . . F with liquid cooling, Miltenberg, pp. 1-6.

California Linear Devices, Inc., High Performance Linear Servo Motors, www.calinear.com, Apr. 12, 2005, pp. 1-2.

California Linear Devices, Inc., CLD Linear Motors, www.calinear.com, Apr. 12, 2005, pp. 1-2.

Van Namen, F.T., Electromagnetic Linear Actuators for Active Vibration Control, Motran Industries, Inc., Valencia, CA, Apr. 7, 2005, pp. 1-2.

Procter, George, Linear Motor Advantages in Machine Vision Systems, Copley Controls Corp., Canton, MA, pp. 1-5.

Motran Industries, Inc., Valencia, CA, AFX 470-100, www.motran.com, Apr. 11, 2005, pp. 1-2.

Motran Industries, Inc., Valencia, CA, Inertial Force Actuators, www.motran.com, Apr. 11, 2005, pp. 1-2.

Motran Industries, Inc., Electromagnetic Linear Actuators for Active Vibration Control, Jul. 28, 2003, pp. 1-2.

Ryota Okawa, et al., Modal Analysis of HDDs Actuators, Fujikura Technical review, 2002, pp. 7-12.

Adaptronics, Inc., Glossary of Common Terms, Sep. 24, 2003, pp. 1-3.

Adaptronics, Inc., Piezolectric Actuators, Sep. 24, 2003, pp. 1-2.

Motran Industries, Inc., Inertial Actuator, Jul. 28, 2003, pp. 1-2.

C.Y. Chen, et al., Passive Voice Coil Feedback Control of Closed-Box Subwoofer System, Proc. Instn Mech Engrs, vol. 214, part C, 2000, pp. 995-1005.

Motran Industries, Inc., The Intertial Force Tranducer, Jul. 28, 2003, pp. 1-4.

Motran Industries, Inc., The Axial Force Transducer, Jul. 28, 2003, pp. 1-5.

Motran Industries, Inc., Inertial Force Actuators, Jun. 16, 2000, pp. 1-2.

Vibration & Waves, Damped Harmonic Motion, General Solutions, Feb. 17, 2004, pp. 1-2.

Vibration & Waves, Damped Harmonic Motion, Heavy Damping, Feb. 17, 2004, pp. 1-2.

Motion Control Solutions, Voice Coil Actuators, 1998, p. 1.

Anthony C. Morcos, Voice Coil Actuators for Use in Motion Control Systems, Motion Magazine, Fall 1998, pp. 1-5.

BEI Technologies, Inc., Compact Bi-Directional Linear Actuator Offers Solutions for Hysteresis-Free Operating Requirements, Sep. 19, 2003, pp. 1-2.

BEI Technologies, Inc., Worlds Largest and Most Powerful Voice Coil Actuator, Jan. 2003, p. 1.

BEI Technologies, Inc., Abbreviated Specifications for VCA 100 Stand-Alone Voice Coil Servo., 1998, p. 1.

Vibration & Waves, Damped Harmonic Motion, Light Damping, Feb. 17, 2004, pp. 1-8.

* cited by examiner

CFG (CIRCULAR FORCE GENERATOR) PRODUCES ROTATING FORCE WITH CONTROLLED ROTATING FORCE MAGNITUDE AND CONTROLLED ROTATING FORCE PHASE
COM. BUS PREFERABLY USES CANbus

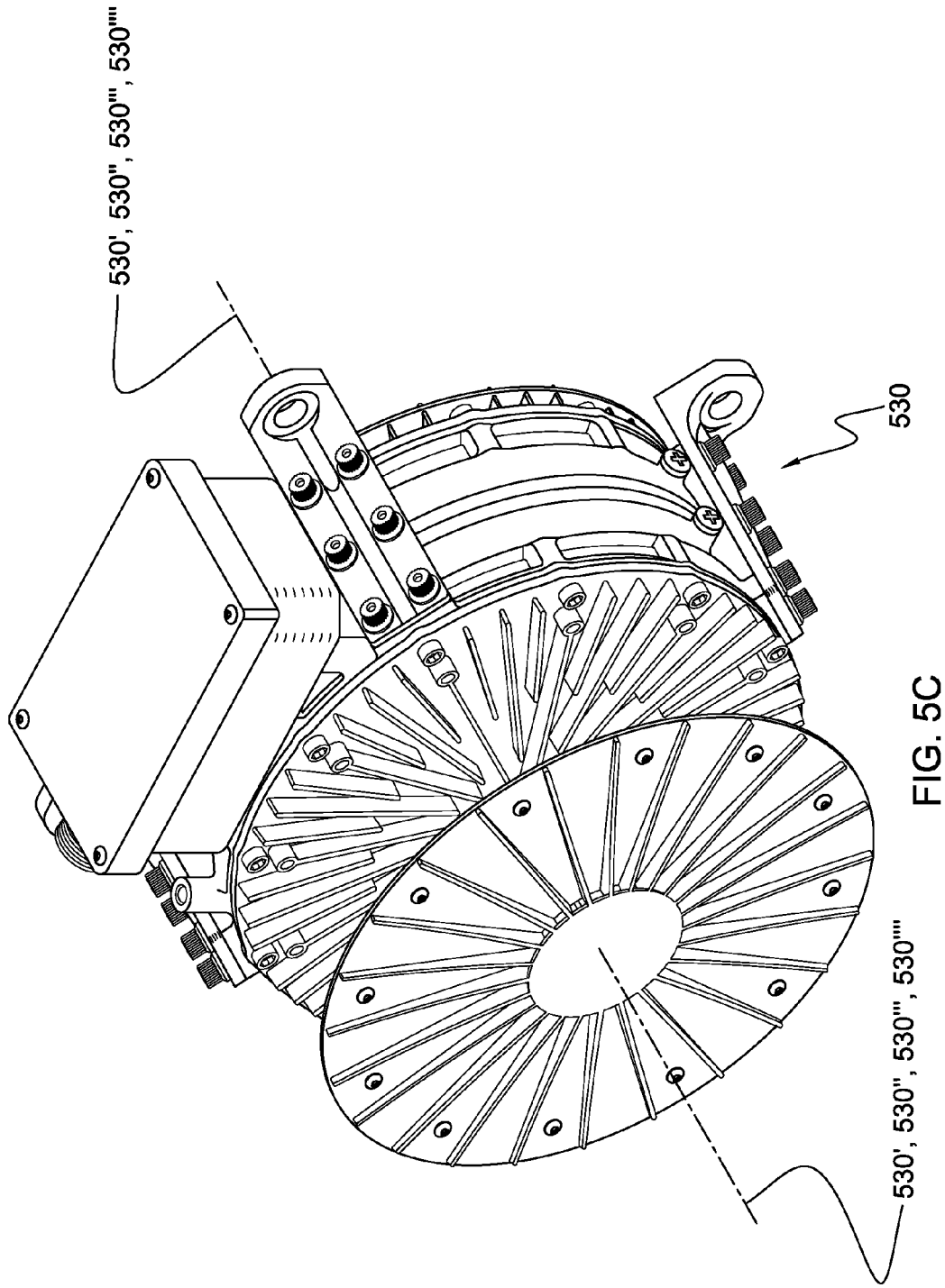

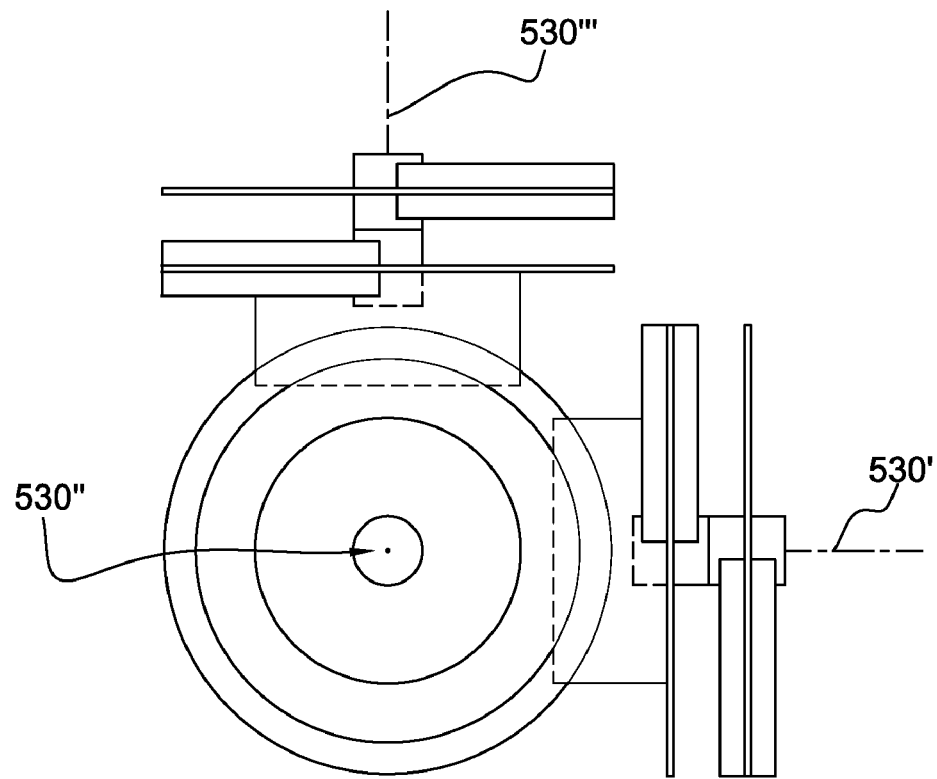
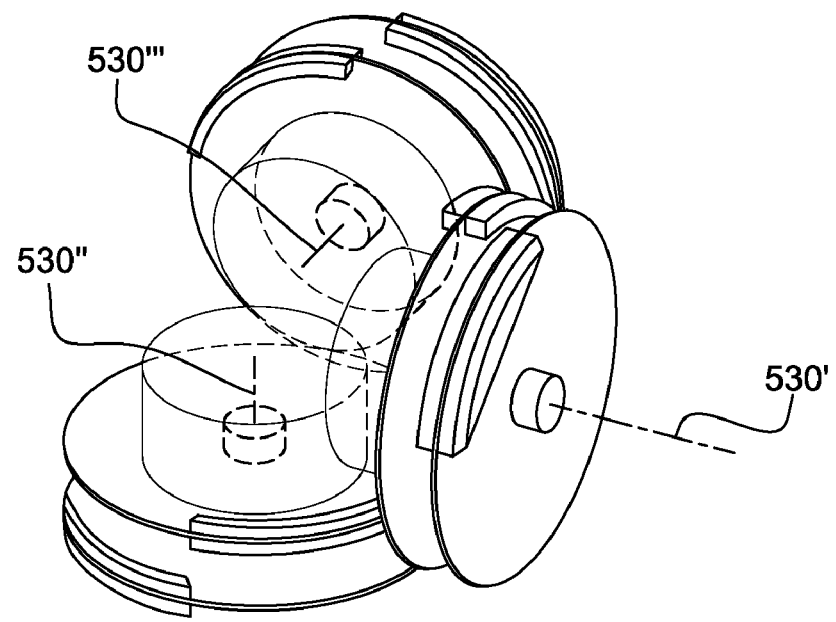
FIG. 6B

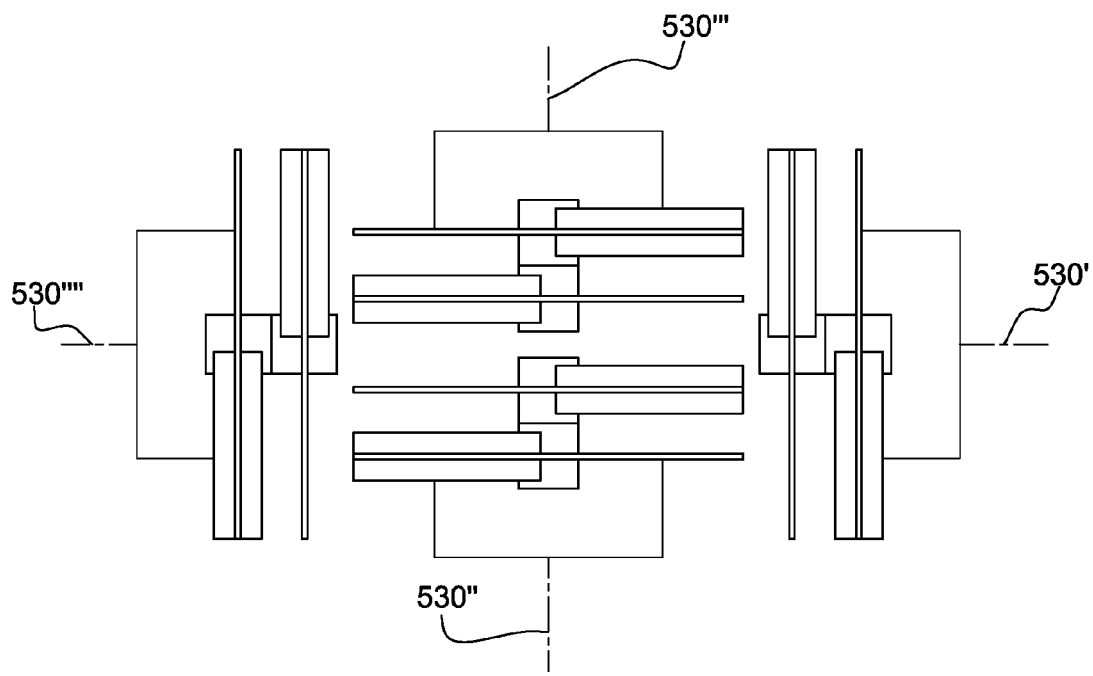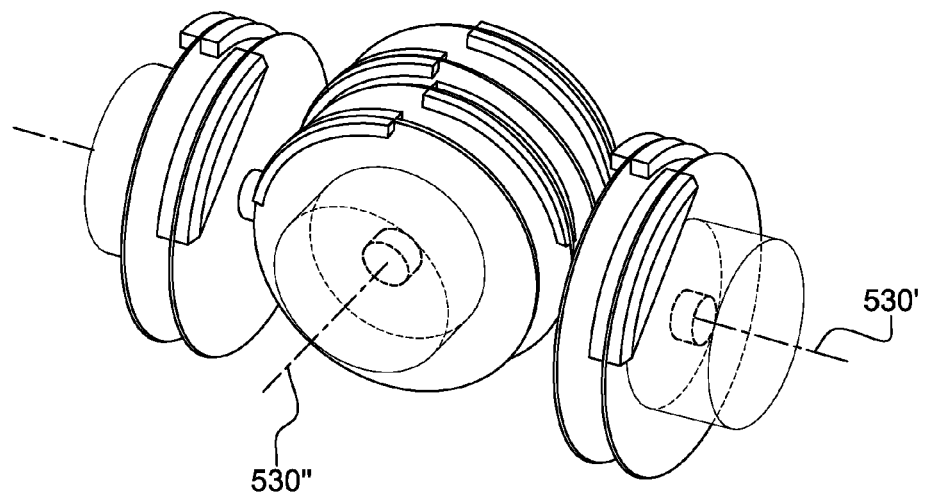
FIG. 6D

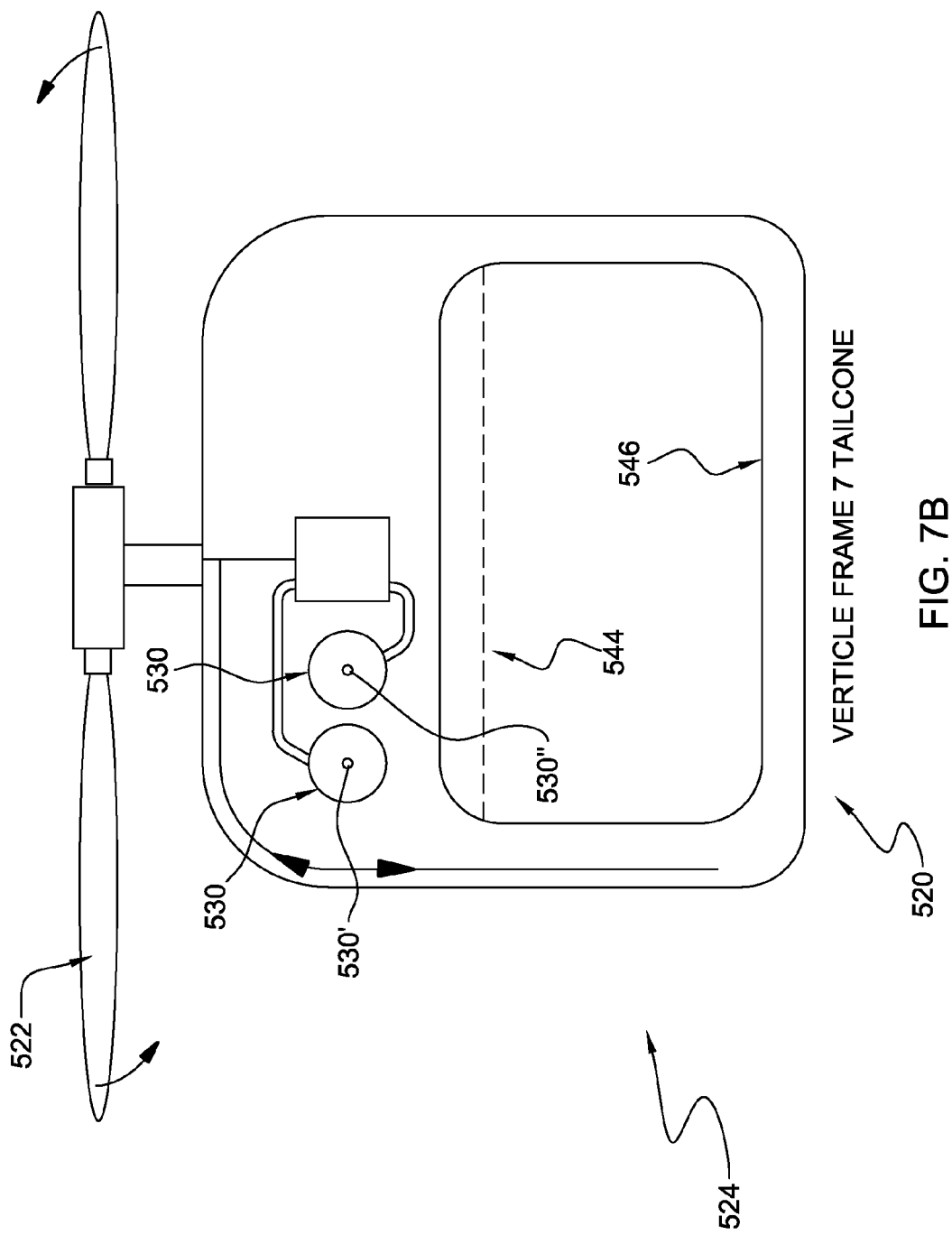

BASE MOUNT

SHEAR MOUNT

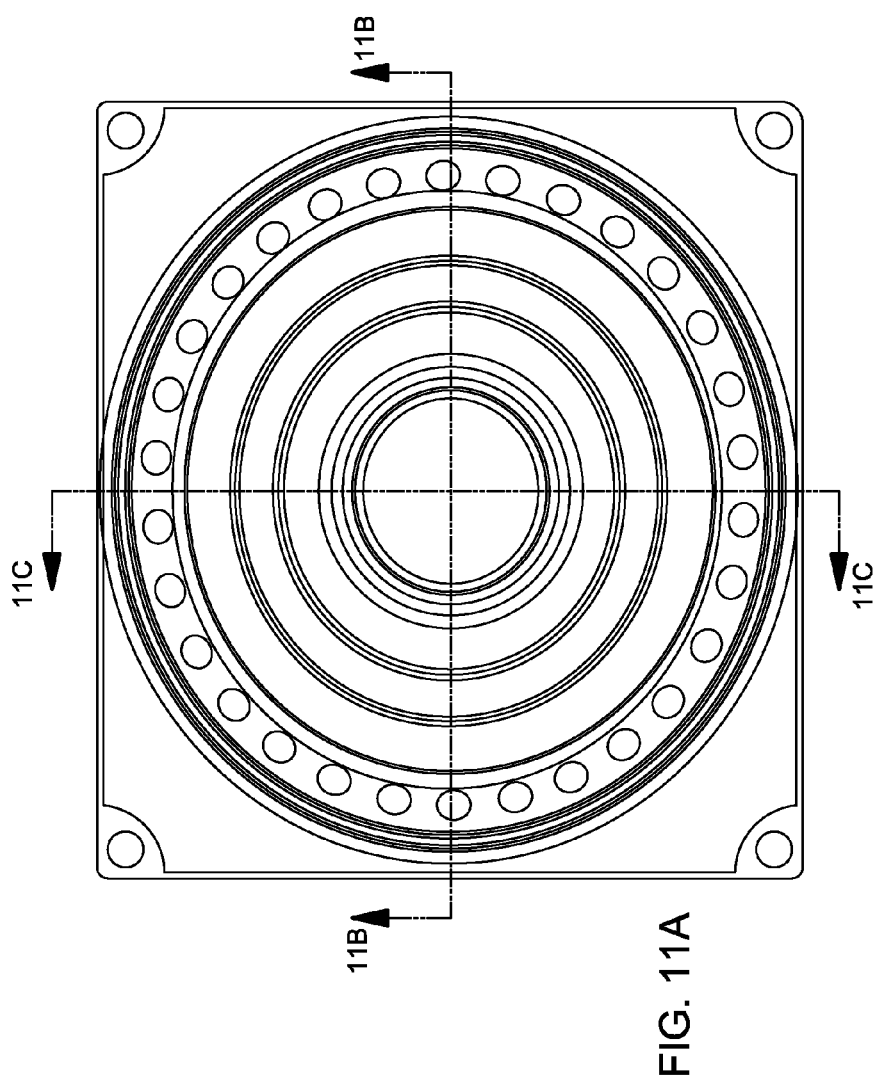
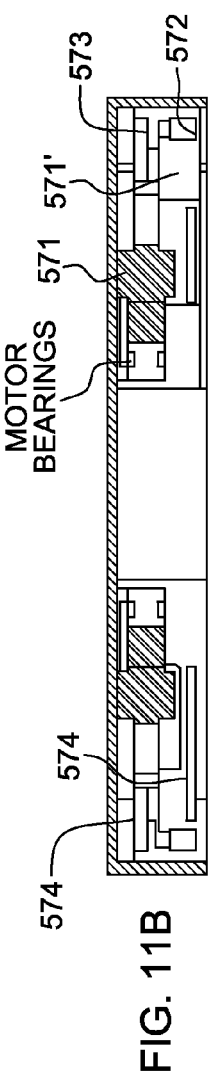
FIG. 11A
FIG. 11B
FIG. 11C

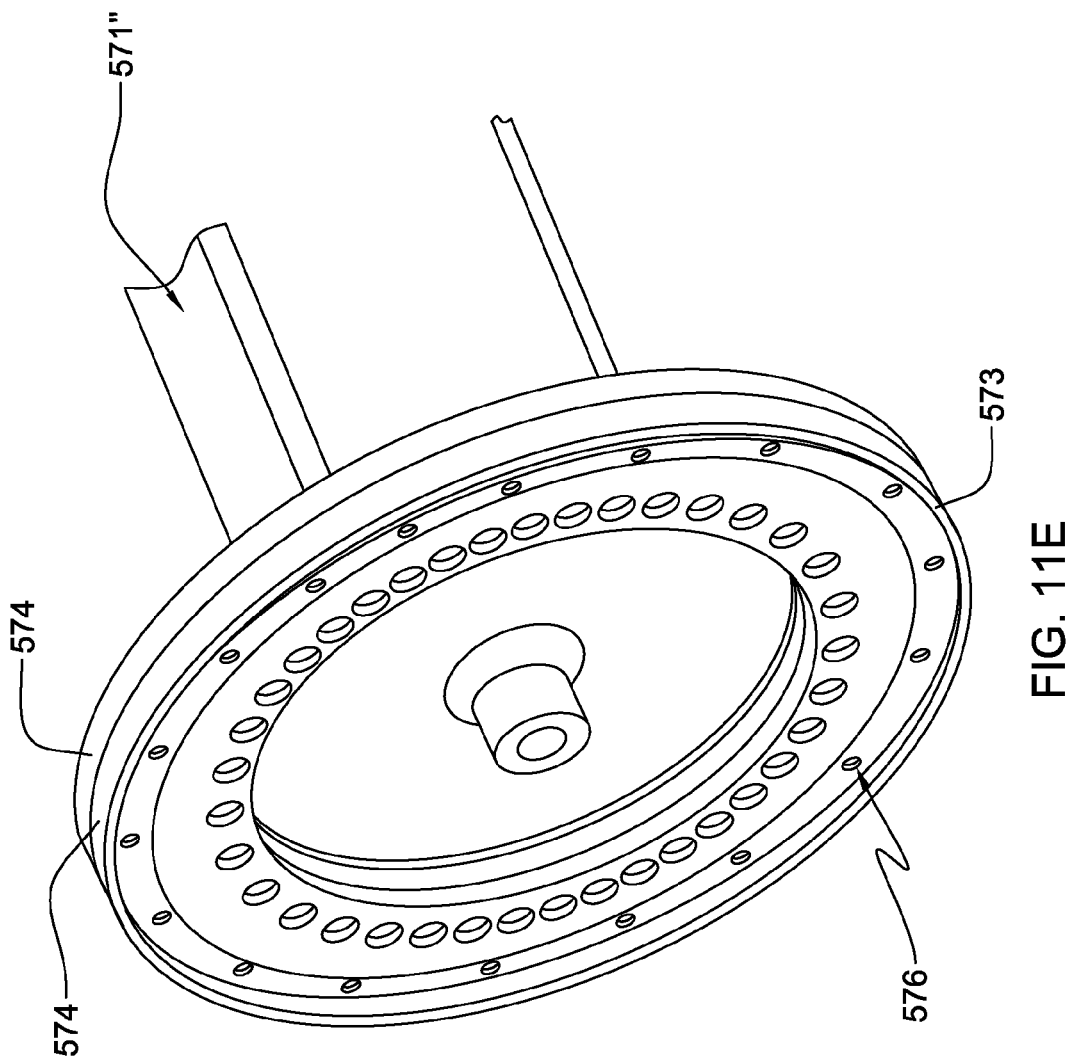

DISTRIBUTED MASTER SYSTEM CONTROL AUTHORITY

DUAL FREQUENCY HMVS

3P HMVS

HELICOPTER HUB MOUNTED VIBRATION CONTROL AND CIRCULAR FORCE GENERATION SYSTEMS FOR CANCELING VIBRATIONS

CROSS-REFERENCE

This Application is a Continuation-in-Part (CIP) of U.S. patent application Ser. No. 12/286,461 filed on Sept. 30, 2008 now U.S. Pat. No. 7,942,633, which is a Continuation of U.S. patent application Ser. No. 11/215,388 filed on Aug. 30, 2005, now U.S. Pat. No. 7,448,854. U.S. patent application Ser. No. 11/215,388 claims the benefit of U.S. Provisional Patent Application Ser. No. 60/605,470 filed on Aug. 30, 2004, all of which the priority are hereby claimed and hereby incorporated by reference.

This Application is a Continuation-in-Part (CIP) of U.S. patent application Ser. No. 11/557,384 filed on Nov. 7, 2006 now U.S. Pat. No. 7,722,322, which claims the benefit of U.S. Provisional Patent Application 60/734,232 filed on Nov. 7, 2005, also U.S. patent application Ser. No. 11/557,384 is a Continuation-in-Part (CIP) of U.S. patent application Ser. No. 11/215,388 filed on Aug. 30, 2005, now U.S. Pat. No. 7,448,854. U.S. patent application Ser. No. 11/215,388 claims the benefit of U.S. Provisional Patent Application 60/605,470 filed on Aug. 30, 2004, all of which the priority are hereby claimed and hereby incorporated by reference.

This Application claims priority to U.S. Provisional Patent Application 61/042,980 filed on Apr. 7, 2008 which is hereby incorporated by reference. This Application claims priority to U.S. Provisional Patent Application 61/122,160 filed on Dec. 12, 2008 which is hereby incorporated by reference. This Application is a Continuation-in-Part (CIP) of U.S. patent application Ser. No. 12/288,867 filed on Oct. 24, 2008 now U.S. Pat. No. 8,090,482 which is hereby incorporated by reference, U.S. patent application Ser. No. 12/288,867 claims the benefit of U.S. Provisional Patent Application 60/982,612 filed on Oct. 25, 2007, all of which the priority are hereby claimed.

FIELD OF THE INVENTION

The invention relates to the field of vibration control systems for actively minimizing vibrations in structures. The invention relates to the field of methods/systems for actively controlling vibrations in vehicles. More particularly the invention relates to the field of controlling vibrations in aircraft vehicles having a nonrotating body and a rotating member, and more particularly the invention relates to helicopter vibration control systems.

SUMMARY OF THE INVENTION

In embodiments the invention includes a rotary wing aircraft, the rotary wing aircraft having a nonrotating aerostructure body and a rotating rotary wing hub, the rotary wing aircraft including a vehicle vibration control system, a rotating hub mounted vibration control system, the rotating hub mounted vibration control system mounted to the rotating rotary wing hub with the rotating hub mounted vibration control system rotating with the rotating rotary wing hub, a rotary wing aircraft member sensor for outputting rotary wing aircraft member data correlating to the relative rotation of the rotating rotary wing hub member rotating relative to the nonrotating body, at least a first nonrotating body vibration sensor, the at least first nonrotating body vibration sensor outputting at least first nonrotating body vibration sensor data correlating to vibrations, at least a first nonrotating body circular force generator, the at least a first nonrotating body circular force generator fixedly coupled with the nonrotating body, a distributed force generation data communications network link, the distributed force generation data communications system network link linking together at least the first nonrotating body circular force generator and the rotating hub mounted vibration control system wherein the rotating hub mounted vibration control system and the first nonrotating body circular force generator communicate force generation vibration control data through the distributed force generation data communications network, the at least first nonrotating body circular force generator controlled to produce a rotating force with a controllable rotating force magnitude and a controllable rotating force phase, the controllable rotating force magnitude controlled from a minimal force magnitude up to a maximum force magnitude, and with the controllable rotating force phase controlled in reference to the rotary wing aircraft member sensor data correlating to the relative rotation of the rotating rotary wing hub rotating relative to the nonrotating body wherein the vibration sensed by the at least first nonrotating body vibration sensor is reduced.

In embodiments the invention includes a aircraft vibration control system, for a aircraft vehicle having a nonrotating aerostructure body and a rotating rotary wing hub, including, a rotating hub mounted vibration control system, the rotating hub mounted vibration control system mounted to the rotating rotary wing hub with the rotating hub mounted vibration control system rotating with the rotating rotary wing hub, a rotary wing aircraft member sensor for outputting rotary wing aircraft member data correlating to the relative rotation of the rotating rotary wing hub member rotating relative to the nonrotating body, at least a first nonrotating body vibration sensor, the at least first nonrotating body vibration sensor outputting at least first nonrotating body vibration sensor data correlating to vibrations, at least a first nonrotating body force generator, the at least first nonrotating body force generator fixedly coupled with the nonrotating body, a distributed force generation data communications network serial link, the distributed force generation data communications system network serial link linking together at least the first nonrotating body force generator and the rotating hub mounted vibration control system wherein the rotating hub mounted vibration control system and the first nonrotating body force generator communicate and share force generation vibration control data through the distributed force generation data communications network, the at least first nonrotating body force generator controlled to produce a force with a controllable magnitude and a controllable phase, the controllable force magnitude controlled from a minimal force magnitude up to a maximum force magnitude, and with the controllable force phase controlled in reference to the rotary wing aircraft member sensor data correlating to the relative rotation of the rotating rotary wing hub rotating relative to the nonrotating body and the rotating hub mounted vibration control system includes at least a first hub mounted vibration control system rotor with a first imbalance mass concentration, the first hub mounted vibration control system rotor driven to rotate at a first rotation speed greater than an operational rotation frequency of the rotating rotary wing hub, and at least a second hub mounted vibration control system rotor with a second imbalance mass concentration, the second hub mounted vibration control system rotor driven to rotate at the first rotation speed greater than the operational rotation frequency of the rotating rotary wing hub, wherein the vibration sensed by the at least first nonrotating body vibration sensor is reduced.

In embodiments the invention includes a aircraft vibration control system, for a aircraft vehicle having a nonrotating aerostructure body and a rotating rotary wing hub, including, a rotating hub mounted means for controlling vibrations, the rotating hub mounted means for controlling vibrations mounted to the rotating rotary wing hub with the rotating hub mounted means for controlling vibrations rotating with the rotating rotary wing hub, a rotary wing aircraft member sensor for outputting rotary wing aircraft member data correlating to the relative rotation of the rotating rotary wing hub member rotating relative to the nonrotating body, at least a first nonrotating body vibration sensor, the at least first nonrotating body vibration sensor outputting at least first nonrotating body vibration sensor data correlating to vibrations, at least a first nonrotating body force generator, the at least first nonrotating body force generator fixedly coupled with the nonrotating body, a means for linking together the first nonrotating body force generator and the rotating hub mounted means for controlling vibrations wherein the rotating hub mounted means for controlling vibrations and the first nonrotating body force generator communicate and share force generation vibration control data through the means for linking, the at least first nonrotating body force generator controlled to produce a force with a controllable magnitude and a controllable phase, the controllable force magnitude controlled from a minimal force magnitude up to a maximum force magnitude, and with the controllable force phase controlled in reference to the rotary wing aircraft member sensor data correlating to the relative rotation of the rotating rotary wing hub rotating relative to the nonrotating body and, wherein the vibration sensed by the at least first nonrotating body vibration sensor is reduced.

In embodiments the invention includes a vehicle vibration control system for controlling troublesome vibrations in a nonrotating vehicle body having a rotating machine member, the vehicle vibration control system including a vehicle vibration control system controller, a rotating machine member sensor, for inputting vehicle rotating machine member data correlating to a relative rotation of the rotating machine member rotating relative to the nonrotating body into the vehicle vibration control system controller, at least a first nonrotating vehicle body vibration sensor, the at least first nonrotating vehicle body vibration sensor inputting at least first nonrotating vehicle body vibration sensor data correlating to vehicle vibrations into the vehicle vibration control system controller, at least a first nonrotating vehicle body circular force generator, the at least a first nonrotating vehicle body circular force generator for fixedly mounting to the nonrotating vehicle body wherein the at least first nonrotating vehicle body circular force generator is controlled by the controller to produce a rotating force with a controllable rotating force magnitude and a controllable rotating force phase, the controllable rotating force magnitude controlled from a minimal force magnitude up to a maximum force magnitude, and with the controllable rotating force phase controlled in reference to the vehicle rotating machine member sensor data correlating to the relative rotation of the vehicle rotating machine member rotating relative to the nonrotating vehicle body with the vehicle vibration sensed by the at least first nonrotating vehicle body vibration sensor reduced by the controller, and a hub mounted vibration control system, the hub mounted vibration control system linked with the vehicle vibration control system controller.

In embodiments the invention includes a method of controlling vibration, the method including, providing at least a first nonrotating vehicle body circular force generator, fixedly mounting the at least first nonrotating vehicle body circular force generator to a nonrotating vehicle body, controlling the at least first nonrotating vehicle body circular force generator to produce a rotating force with a controllable rotating force magnitude and a controllable rotating force phase, providing hub mounted vibration control system, fixedly mounting the hub mounted vibration control system to a rotatable hub of the nonrotating vehicle body, providing distributed force generation data communications network link and linking the hub mounted vibration control system together with the at least first nonrotating vehicle body circular force generator.

In an embodiment the invention includes a rotary wing aircraft vehicle, the vehicle having a nonrotating vehicle structure frame body and a rotating machine member, the vehicle including a vehicle vibration control system, the vehicle vibration control system including a vehicle vibration control system controller. The vehicle includes a vehicle rotating machine member sensor for inputting vehicle rotating machine member data correlating to the relative rotation of the vehicle rotating machine member rotating relative to the nonrotating vehicle body into the vehicle vibration control system controller. The vehicle includes at least a first nonrotating vehicle body vibration sensor, the at least first nonrotating vehicle body vibration sensor inputting at least first nonrotating vehicle body vibration sensor data correlating to vehicle vibrations into the vehicle vibration control system controller. The vehicle includes at least a first nonrotating vehicle body circular force generator, the at least a first nonrotating vehicle body circular force generator fixedly coupled with the nonrotating vehicle body, the at least first nonrotating vehicle body circular force generator controlled by the controller to produce a rotating force with a controllable rotating force magnitude and a controllable rotating force phase, the controllable rotating force magnitude controlled from a minimal force magnitude up to a maximum force magnitude, and with the controllable rotating force phase controlled in reference to the vehicle rotating machine member sensor data correlating to the relative rotation of the vehicle rotating machine member rotating relative to the nonrotating vehicle body wherein the vehicle vibration sensed by the at least first nonrotating vehicle body vibration sensor is reduced.

In an embodiment the invention includes a vehicle vibration control system for controlling troublesome vibrations in a nonrotating vehicle body having a rotating machine member. The vehicle vibration control system including a vehicle vibration control system controller. The vehicle vibration control system including a rotating machine member sensor, for inputting vehicle rotating machine member data correlating to a relative rotation of the rotating machine member rotating relative to the nonrotating body into the vehicle vibration control system controller. The vehicle vibration control system including at least a first nonrotating vehicle body vibration sensor, the at least first nonrotating vehicle body vibration sensor inputting at least first nonrotating vehicle body vibration sensor data correlating to vehicle vibrations into the vehicle vibration control system controller. The vehicle vibration control system including at least a first nonrotating vehicle body circular force generator, the at least a first nonrotating vehicle body circular force generator for fixedly mounting to the nonrotating vehicle body wherein the at least first nonrotating vehicle body circular force generator is controlled by the controller to produce a rotating force with a controllable rotating force magnitude and a controllable rotating force phase, the controllable rotating force magnitude controlled from a minimal force magnitude up to a maximum force magnitude, and with the controllable rotating force phase controlled in reference to the vehicle rotating machine member sensor data correlating to the relative rotation of the vehicle rotating machine member rotating relative to the nonrotating vehicle body with the vehicle vibration sensed by the at least first nonrotating vehicle body vibration sensor reduced by the controller.

In an embodiment the invention includes a method of controlling helicopter vibrations. The method includes providing a nonrotating helicopter body below a rotating helicopter rotor member. The method includes providing a vibration control system controller. The method includes providing a rotating helicopter rotor member sensor for inputting rotating member data correlating to a relative rotation of the rotating member rotating relative to the nonrotating body into the vibration control system controller. The method includes providing at least a first nonrotating body vibration sensor, the at least first nonrotating vehicle body vibration sensor inputting at least first nonrotating body vibration sensor data correlating to vehicle vibrations into the vibration control system controller. The method includes providing at least a first nonrotating vehicle body circular force generator. The method includes coupling the at least first nonrotating vehicle body circular force generator to the nonrotating helicopter body. The method includes controlling with the controller the coupled at least first nonrotating vehicle body circular force generator to produce a rotating force upon the nonrotating helicopter body with a controllable rotating force magnitude and a controllable rotating force phase, the controllable rotating force magnitude controlled from a minimal force magnitude up to a maximum force magnitude, and with the controllable rotating force phase controlled in reference to the rotating member sensor data correlating to the relative rotation of the rotating member rotating relative to the nonrotating body with the vibration sensed by the at least first nonrotating vehicle body vibration sensor reduced by the controller.

In an embodiment the invention includes a method of controlling vibrations. The method includes providing a nonrotating structure body having a rotating machine member. The method includes providing a vibration control system controller. The method includes providing a rotating machine member sensor, for inputting rotating member data correlating to a relative rotation of the rotating member rotating relative to the nonrotating body into the vibration control system controller. The method includes providing at least a first nonrotating body vibration sensor, the at least first nonrotating body vibration sensor inputting at least first nonrotating body vibration sensor data correlating to vibrations into the vibration control system controller. The method includes providing at least a first nonrotating body circular force generator. The method includes coupling the at least first nonrotating vehicle body circular force generator to the nonrotating structure body. The method includes controlling with the controller the coupled at least first nonrotating body circular force generator to produce a rotating force with a controllable rotating force magnitude and a controllable rotating force phase, the controllable rotating force magnitude controlled from a minimal force magnitude up to a maximum force magnitude, and with the controllable rotating force phase controlled relative to the rotating member sensor data correlating to the relative rotation of the rotating member rotating relative to the nonrotating body with the vibration sensed by the at least first nonrotating vehicle body vibration sensor reduced by the controller.

In an embodiment the invention includes a computer program product for a vibration control system. The computer program product comprising a computer readable medium. The computer program product comprising program instructions to monitor rotating machine member data correlating to a relative rotation of a rotating machine member rotating relative to a nonrotating body structure. The computer program product comprising program instructions to monitor nonrotating body structure vibration sensor data correlating to nonrotating body structure vibrations. The computer program product comprising program instructions to control a circular force generator mounted to the nonrotating body structure to control the circular force generator to output into the nonrotating body structure a rotating force with a controllable rotating force magnitude controlled from a minimal force magnitude up to a maximum force magnitude and a controllable rotating force phase controlled in reference to the monitored rotating machine member data to minimize nonrotating body structure vibrations.

In an embodiment the invention includes a computer system for reducing vibrations in a vehicle with a nonrotating body structure and a rotating machine member rotating relative to the nonrotating body structure. The computer system comprising computer media with computer program instructions including program instructions to monitor rotating machine member data correlating to the relative rotation of the rotating machine member rotating relative to the nonrotating body structure. The computer system comprising computer media with computer program instructions including program instructions to monitor nonrotating body structure vibration sensor data correlating to nonrotating body structure vibrations measured by a plurality of nonrotating vehicle body vibration sensors. The computer system comprising computer media with computer program instructions including program instructions to control a circular force generator mounted to the nonrotating body structure to control the circular force generator to produce a rotating force with a controllable rotating force magnitude controlled from a minimal force magnitude up to a maximum force magnitude and a controllable rotating force phase controlled in reference to the monitored rotating machine member data to minimize nonrotating body structure vibrations measured by the plurality of nonrotating vehicle body vibration sensors.

In an embodiment the invention includes a computer data signal. The computer data signal transmitted in a vibration reducing computer system for a vehicle with a nonrotating body structure and a rotating machine member rotating relative to the nonrotating body structure. The computer data signal comprising a circular force command signal including information for producing a rotating force with a controllable rotating force magnitude controlled from a minimal force magnitude up to a maximum force magnitude into the nonrotating body structure and a controllable rotating force phase controlled in reference to the rotating machine member to minimize nonrotating body structure vibrations in the nonrotating body structure.

In an embodiment the invention includes a vibration control system for controlling vibration on a structure responsive to a vibration disturbance at a given frequency. The vibration control system preferably includes a circular force generator for creating a controllable rotating force with controllable magnitude and phase. The vibration control system preferably includes a vibration sensor for generating a vibration signal indicative of vibration of the structure. The vibration control system preferably includes a controller that receives the vibration signal from the vibration sensor and commands the force generator to create said rotating force wherein such vibration of the structure sensed by the sensor is reduced. Preferably the vibration control system includes multiple circular force generators and multiple vibration sensors distributed throughout the structure, most preferably with the quantity of vibration sensors greater than the quantity of circular force generators. Preferably the vibration control system includes a reference sensor for generating a persistent signal indicative of the vibration disturbance, preferably wherein the reference sensor monitors a rotating machine member that is rotating relative to the structure and producing the vibrations. Preferably the controllable rotating force rotates at a given harmonic circular force generating frequency, preferably a harmonic of a rotating machine member that is rotating relative to the structure and producing the vibrations. Preferably the controllable rotating force is determined and calculated as circular force described as a real and imaginary part α and β, preferably with a circular force command signal generated with α and β. Preferably the controllable rotating force is generated with two corotating imbalance moving masses, which are preferably controlled with imbalance phasing $\Phi_1$, $\Phi_2$ with the actual imbalance phasing $\Phi_1$, $\Phi_2$ realizing the commanded α, β circular force.

In an embodiment the invention includes a vibration control system for controlling a vibration on a structure responsive to a vibration disturbance at a given frequency, said vibration control system including a circular force generator for creating a controllable rotating force with a controllable magnitude and controllable magnitude phase, said vibration control system including a vibration sensor for generating a vibration signal indicative of said vibration of said structure, said vibration control system including a controller that receives said vibration signal from said vibration sensor and commands said circular force generator to create said rotating force wherein such vibration of said structure sensed by said sensor is reduced.

It is to be understood that both the foregoing general description and the following detailed description are exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principals and operation of the invention.

BRIEF DESCRIPTION OF THE DRAWINGS

FIG. 5A-G illustrates CFGs (Circular Force Generators) for producing rotating force with controlled rotating force magnitude and controlled rotating force phase.

FIG. 6A-F illustrates methods/systems with multiple oriented Circular Force Generators (CFGs).

FIG. 7A-E illustrates helicopter systems/methods for controlling vibration with control accelerometer sensors and CFGs located, mounted and oriented relative to a helicopter floor, sidewall, roof, and vehicle frames.

FIG. 11A-G illustrate CFGs (Circular Force Generators) with motor driven master rotating mass imbalance rotors and slave rotating mass imbalance rotors.

DETAILED DESCRIPTION OF THE PREFERRED EMBODIMENT

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

Reference will now be made in detail to the present preferred embodiments of the invention, examples of which are illustrated in the accompanying drawings.

In an embodiment the invention includes a rotary wing aircraft vehicle, the vehicle having a nonrotating vehicle structure frame body and a rotating machine member, the vehicle including a vehicle vibration control system, the vehicle vibration control system including a vehicle vibration control system controller. The vehicle includes a vehicle rotating machine member sensor for inputting vehicle rotating machine member data correlating to the relative rotation of the vehicle rotating machine member rotating relative to the nonrotating vehicle body into the vehicle vibration control system controller. The vehicle includes at least a first nonrotating vehicle body vibration sensor, the at least first nonrotating vehicle body vibration sensor inputting at least first nonrotating vehicle body vibration sensor data correlating to vehicle vibrations into the vehicle vibration control system controller. The vehicle includes at least a first nonrotating vehicle body circular force generator, the at least a first nonrotating vehicle body circular force generator fixedly coupled with the nonrotating vehicle body, the at least first nonrotating vehicle body circular force generator controlled by the controller to produce a rotating force with a controllable rotating force magnitude and a controllable rotating force phase, the controllable rotating force magnitude controlled from a minimal force magnitude up to a maximum force magnitude, and with the controllable rotating force phase controlled in reference to the vehicle rotating machine member sensor data correlating to the relative rotation of the vehicle rotating machine member rotating relative to the nonrotating vehicle body wherein the vehicle vibration sensed by the at least first nonrotating vehicle body vibration sensor is reduced.

Figure 2:
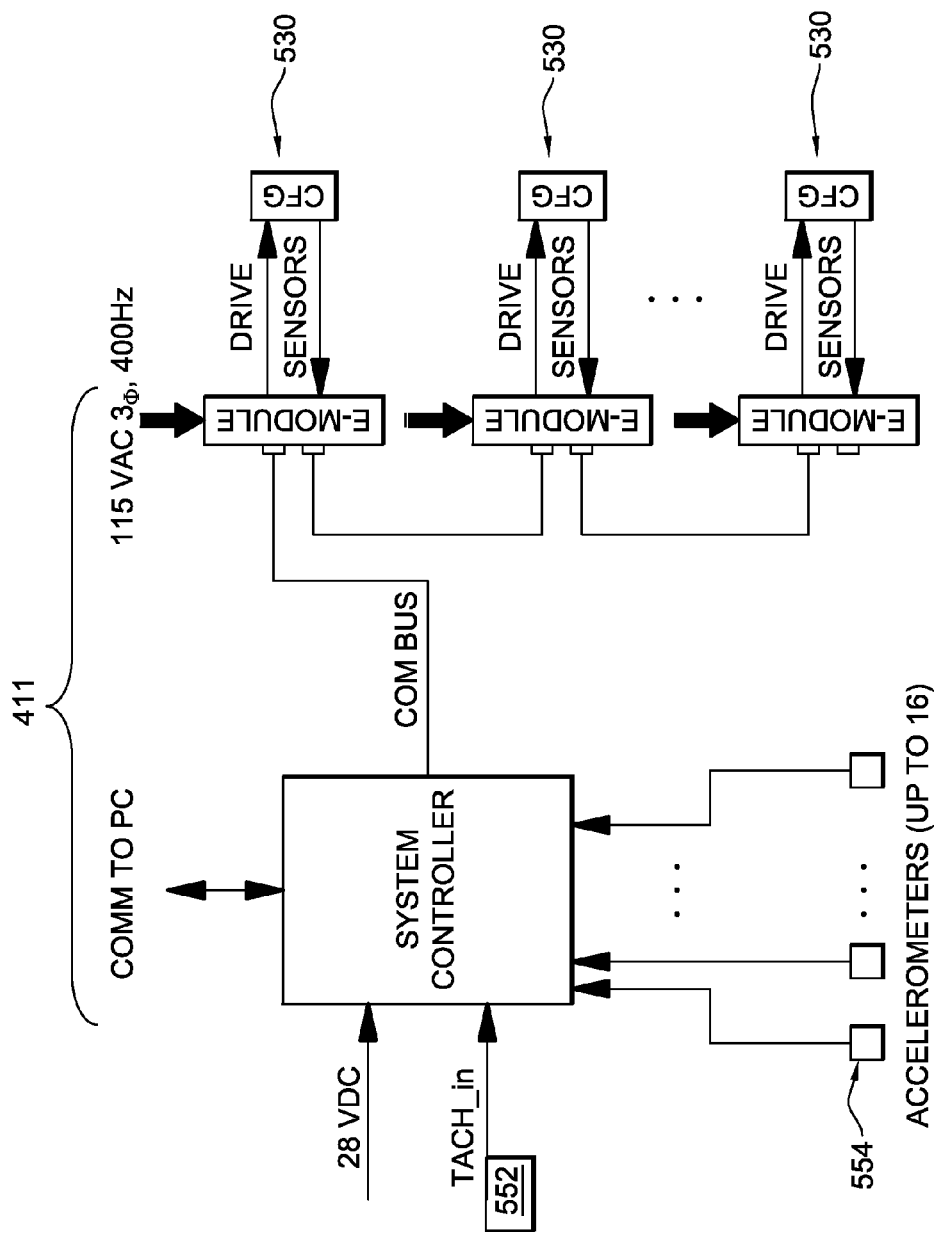
FIG. 2 illustrates methods/systems for controlling helicopter vibrations with a communications bus and CFGs (Circular Force Generators) producing rotating force with controlled rotating force magnitude and controlled rotating force phase.

In an embodiment the rotary wing aircraft vehicle 520 includes a nonrotating vehicle body 524, preferably the helicopter structure frame, and a rotating machine member 522, preferably the helicopter rotating rotary wing hub. The rotating vehicle machine member 522 produces vibrations, with vibration disturbances at a vibration frequency, in the nonrotating vehicle body 524. The rotating machine member 522 rotating relative to the vehicle body 524 and producing troublesome vibrations in the vehicle body 524. The vehicle 520 includes a vehicle vibration control system 409, the vehicle vibration control system 409 including a vehicle vibration control system controller 411. Preferably the vehicle vibration control system controller 411 is comprised of at least one computer with inputs and outputs and at least one computer processor, with the vehicle vibration control system controller computer system for reducing vibrations preferably including computer media and utilizing computer programs with computer program instructions. Preferably the controller operates on one or more electronic devices connected and integrated together and communicating with each other. In an embodiment such as illustrated in FIG. 2, controller 411 operates withing the system controller electronic devices and with the electronic modules (E-Modules) communicating through the communications bus. The vehicle 520 includes a vehicle rotating machine member sensor 552 for inputting vehicle rotating machine member data correlating to the relative rotation of the vehicle rotating machine member 522 rotating relative to the nonrotating vehicle body 524 into the vehicle vibration control system controller, preferably a tach output from a tachometer sensor 524 with tach inputs inputted into the controller 411. Preferably the vehicle rotating machine member sensor 552 is a reference sensor for generating a persistent signal indicative of the vibration disturbance, and senses a harmonic of the rotating speed of the rotating vehicle machine member 522 producing vibrations in the vehicle.

The vehicle 520 includes at least a first nonrotating vehicle body vibration sensor 554, the at least first nonrotating vehicle body vibration sensor 554 inputting at least first nonrotating vehicle body vibration sensor data correlating to vehicle vibrations into the vehicle vibration control system controller 411, preferably the vibration sensors 554 are accelerometers coupled to the vehicle nonrotating body such that the accelerometers senses the vibrations and output vibrations signals into the vibration controller 411.

The vehicle 520 includes at least a first nonrotating vehicle body circular force generator 530, the at least a first nonrotating vehicle body circular force generator 530 fixedly coupled with the nonrotating vehicle body 524 with the at least first nonrotating vehicle body circular force generator controlled by the controller 411 to produce a rotating force with a controllable rotating force magnitude and a controllable rotating force phase, the controllable rotating force magnitude controlled from a minimal force magnitude up to a maximum force magnitude. Preferably the at least a first nonrotating vehicle body circular force generator 530 is mechanically mounted to the frame structure body 524 of the vehicle 520 wherein the produced rotating force is transferred there into it with the controllable rotating force phase controlled in reference to the vehicle rotating machine member sensor data correlating to the relative rotation of the vehicle rotating machine member rotating relative to the nonrotating vehicle body (tach input) wherein the vehicle vibration sensed by the at least first nonrotating vehicle body vibration sensor is reduced. In preferred embodiments this includes producing 0 magnitude forces with 180° mass separations and maximum force magnitude with 0° mass separation controlled by the controller 411.t. Vibration is preferably reduced at a frequency correlating to rotating machine member 522, with vibrations preferably reduced at harmonics of the rotating machine member. Preferably methods include controlling harmonic vibrations of the rotating machine member with the generated rotating force emanating from the circular force generator 530, preferably the circular force generator 530 driving rotating moving masses at a harmonic of the vehicle rotating machine member. Preferably the system 409 generates rotating force as compared to linear component force, with the rotating force rotating at a harmonic of the vehicle rotating machine member 522, and preferably the rotating force phase is controlled relative to a vehicle rotating machine member sensor persistent signal harmonic reference tachometer sine wave preferably utilized in the system controller 411 obtained from a sensor 552 input.

Preferably the vehicle 520 includes n nonrotating vehicle body vibration sensors 554 and m nonrotating vehicle body circular force generators 530 wherein n>m. Preferably the rotating force is controlled to rotate at a vibration disturbance frequency, that is a harmonic of the rotating machine member 522 rotating speed with the system 409 and methods producing circular forces and not specifically or intentionally controlled to produce linear forces. Preferably the methods/systems preferably inhibit and avoid calculating linear forces and outputting such. Preferably the vehicle vibration control system controller 411 generates a rotating reference signal from the vehicle rotating machine member data correlating to the relative rotation of the vehicle rotating machine member rotating relative to the nonrotating vehicle body. Preferably the vehicle vibration control system controller 411 calculates in reference to the rotating reference signal the rotating force with a real part $\alpha$ and an imaginary part $\beta$. Preferably the systems/methods avoid and inhibit calculating linear forces for controlling the vibration, and preferably the vibration control system 409 controller 411 includes a vibe control subsystem (such as Vibe Control—FIG. 1B) which calculates real parts $\alpha_m$ and imaginary parts $\beta_m$ in generating circular force command signals which command/describe desired rotating force vectors, such circular force command signals $\alpha_m \beta_m$ are preferably sent to rotor phase computer subsystem (such as Rotor Phase Compute—FIG. 1B) which in turn preferably computes mass phase signals, which are preferably sent to motor control/motor drive subsystem (such as Motor Control/Motor Drive—FIG. 1B) which generates motor drive signals that drive rotatingmasses around their circular paths, preferably with motor drive signals that drive the masses to generate the circular forces.

Figure 3:
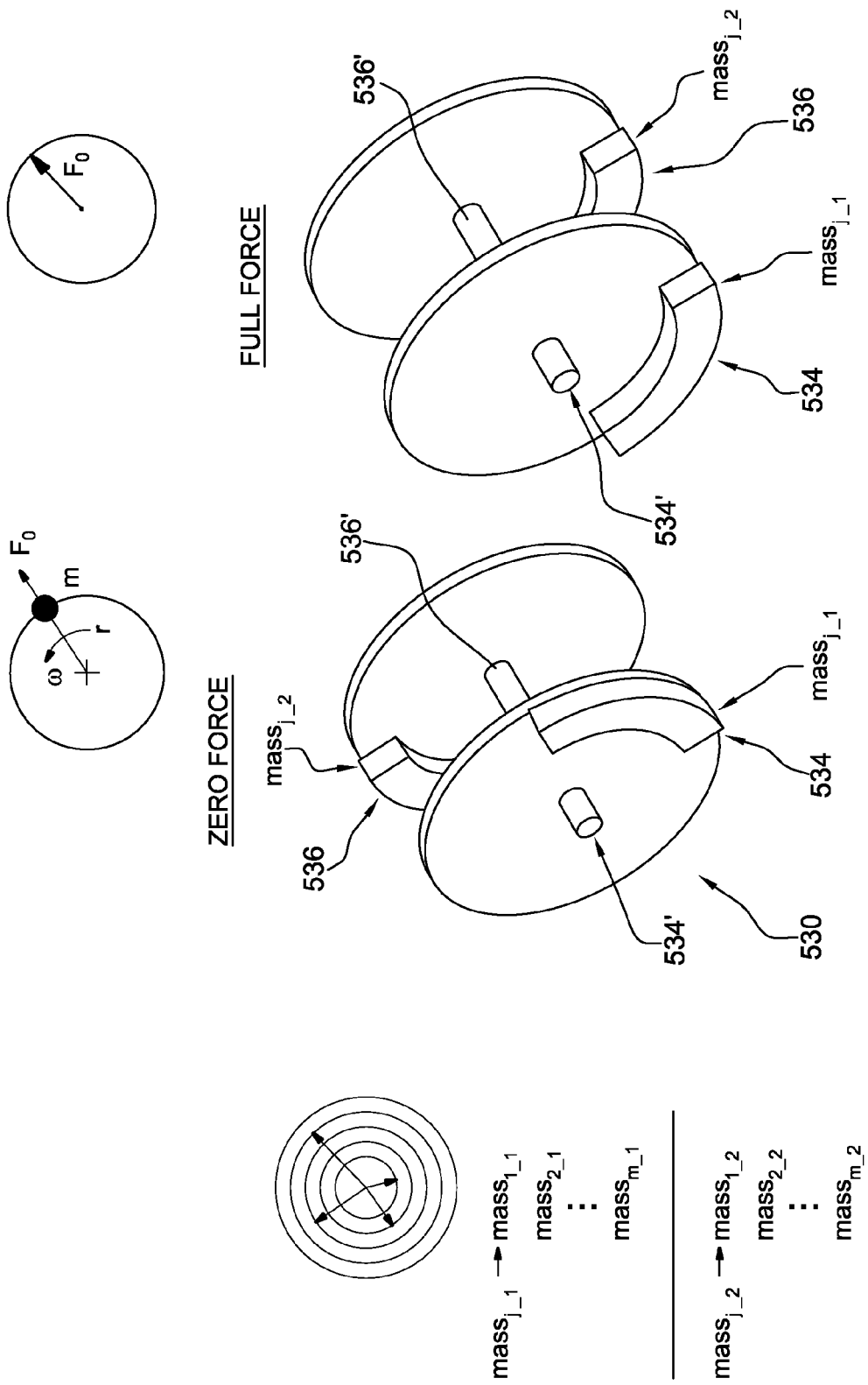
FIG. 3 illustrates circular force generation with two co-rotating imbalanced rotors creating a circular force with controllable magnitude and phase.
Figure 4:
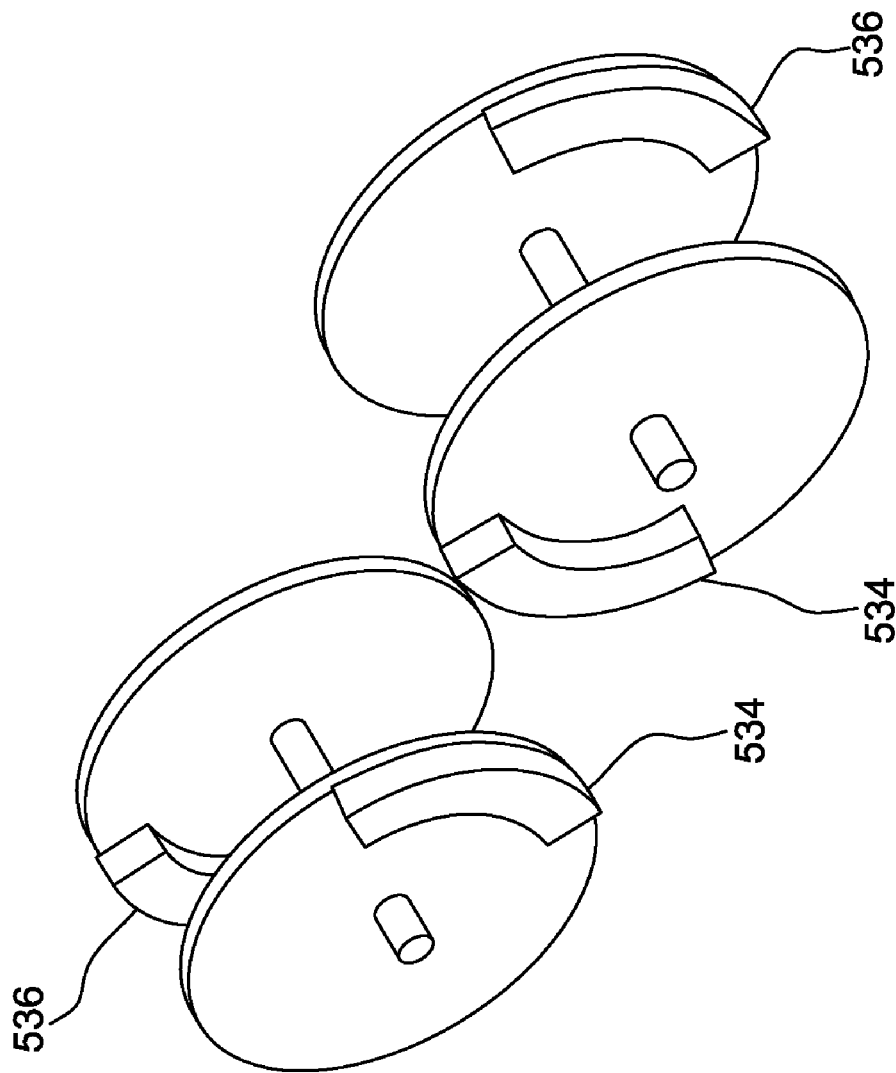
FIG. 4 illustrates Circular Force Generators (CFGs) with co-rotating imbalanced rotors.
Figure 5A:
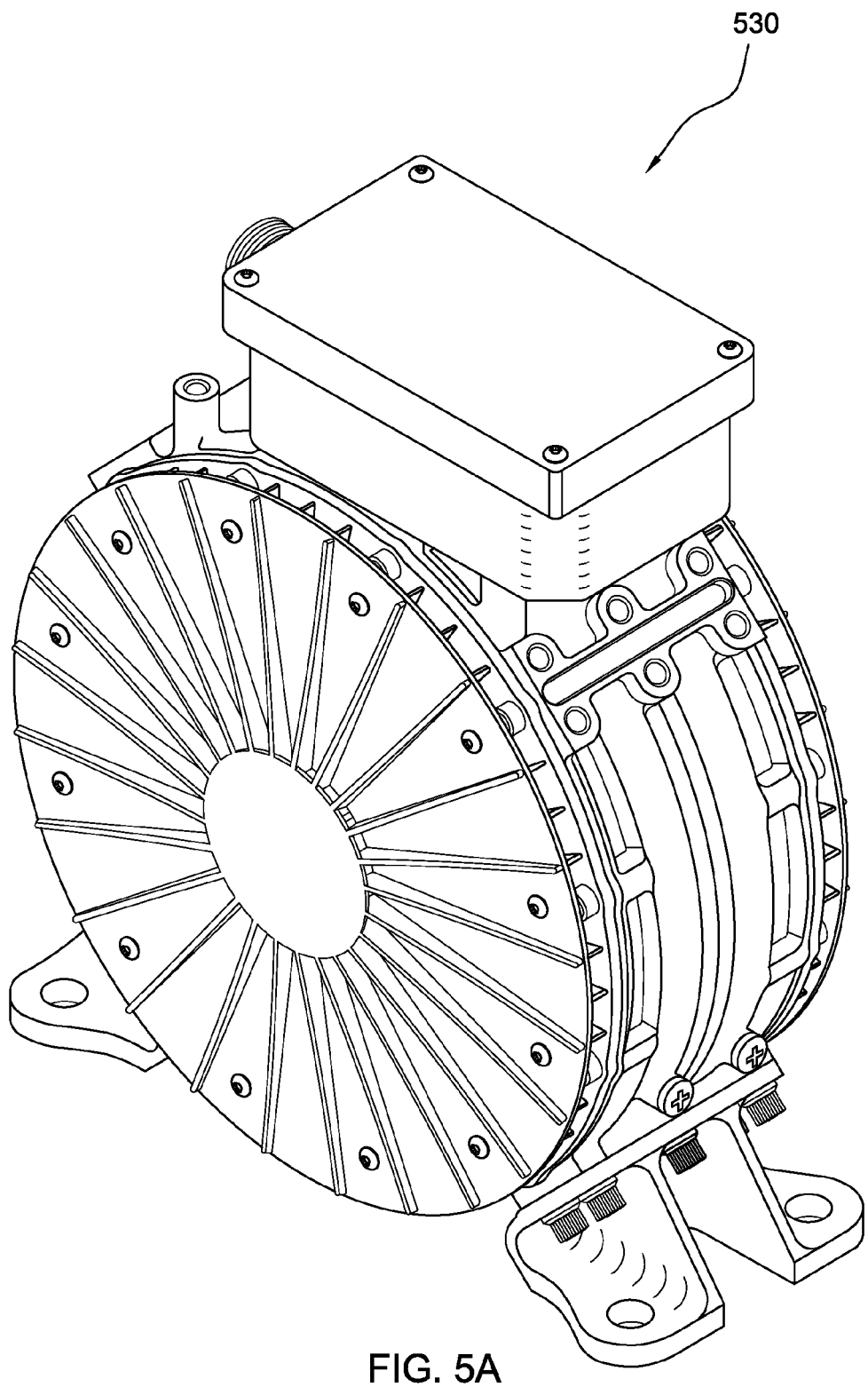
Figure 5B:
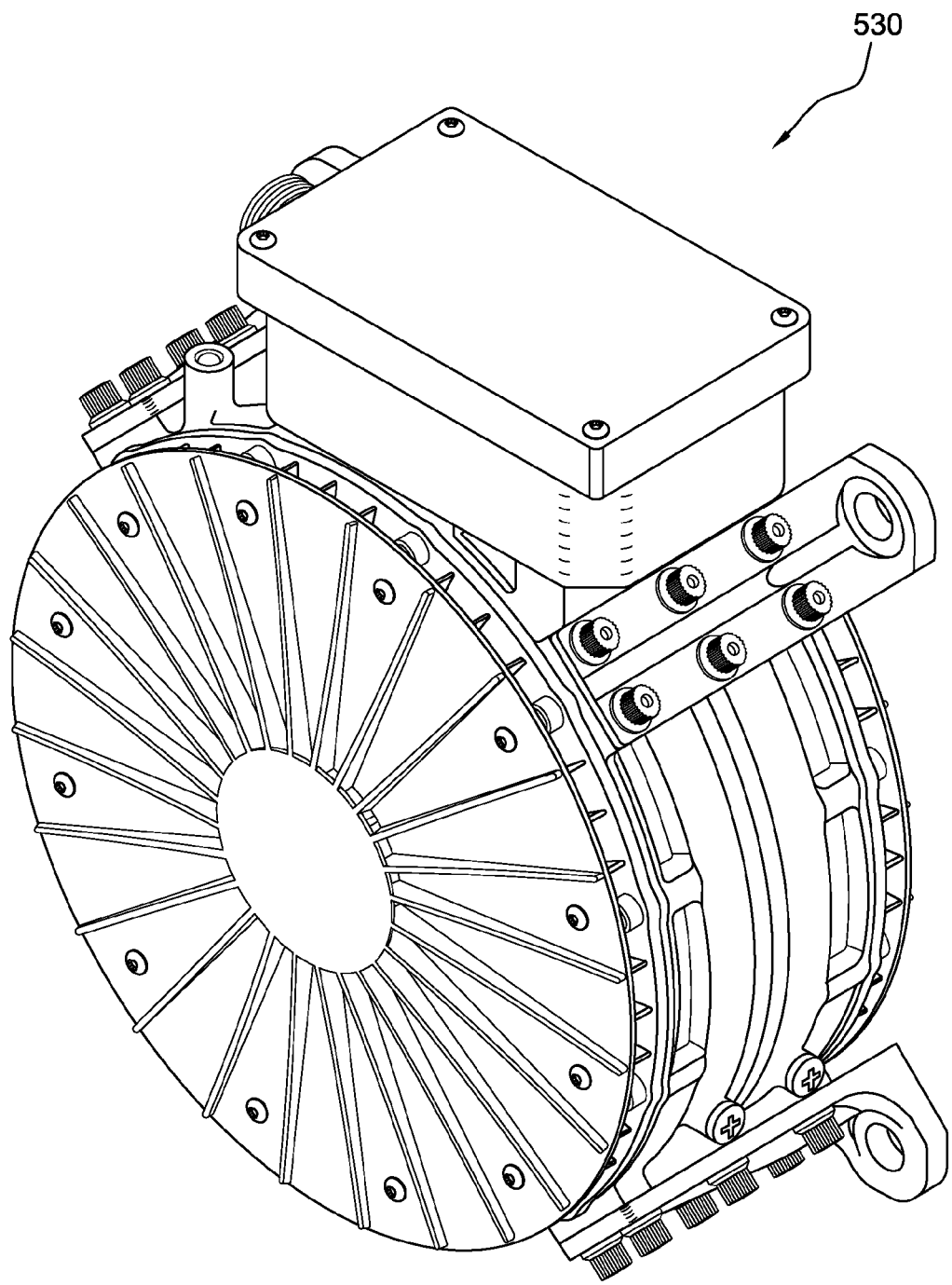
Figure 5D:
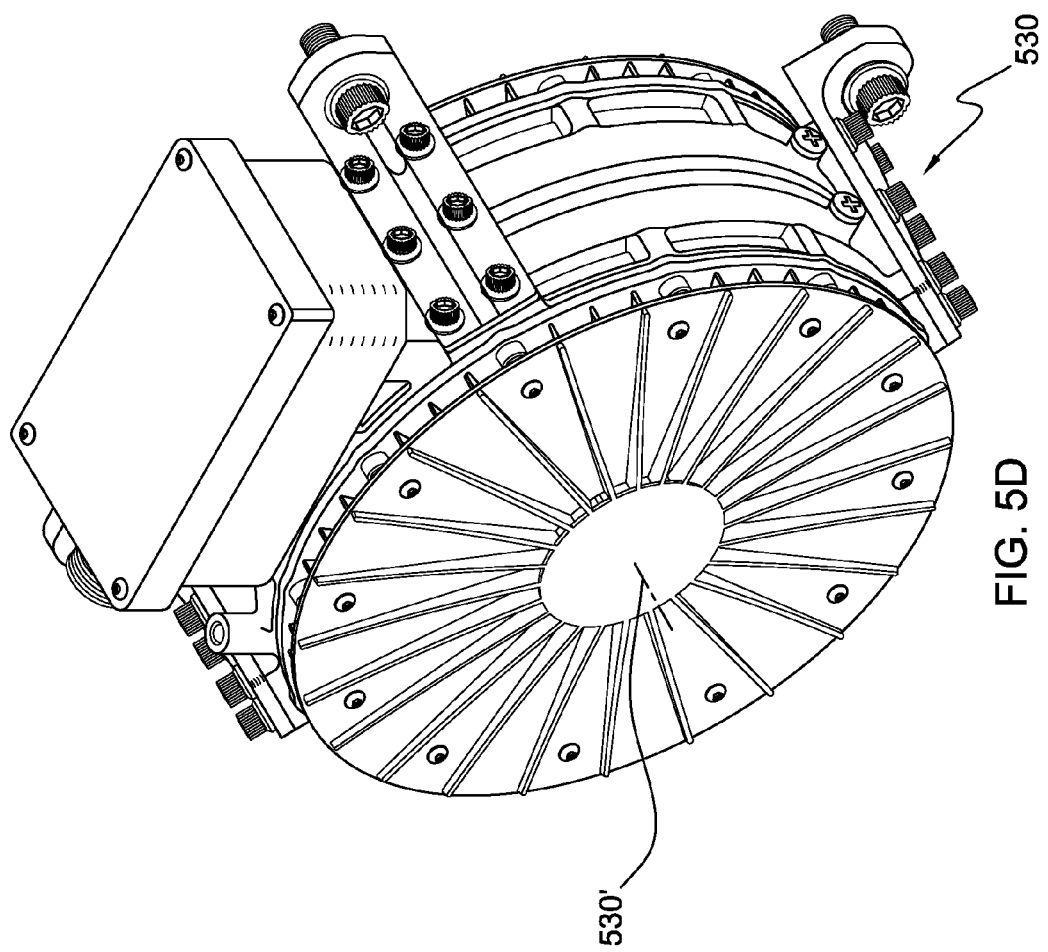
Figure 5E:
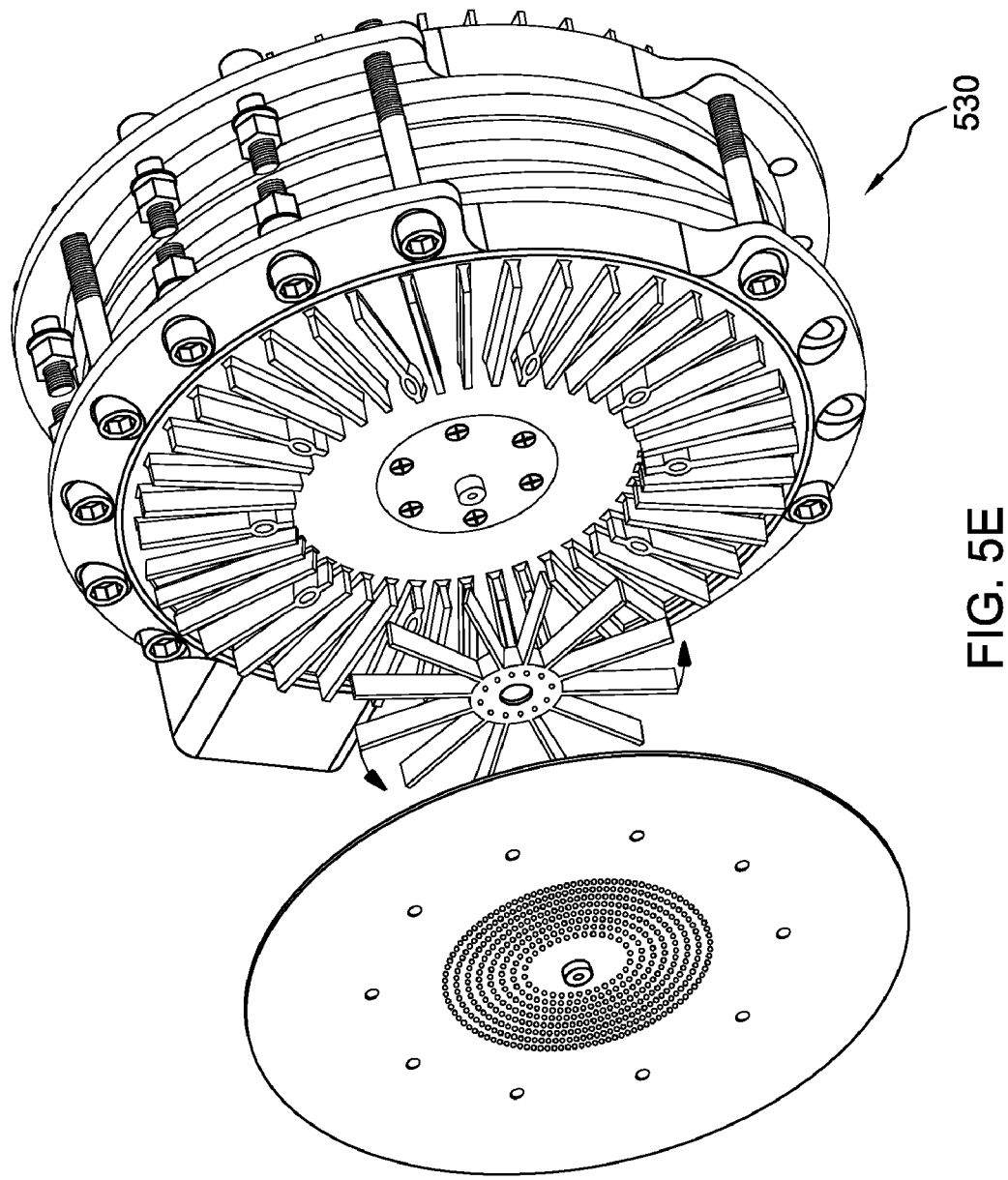
Figure 5F:
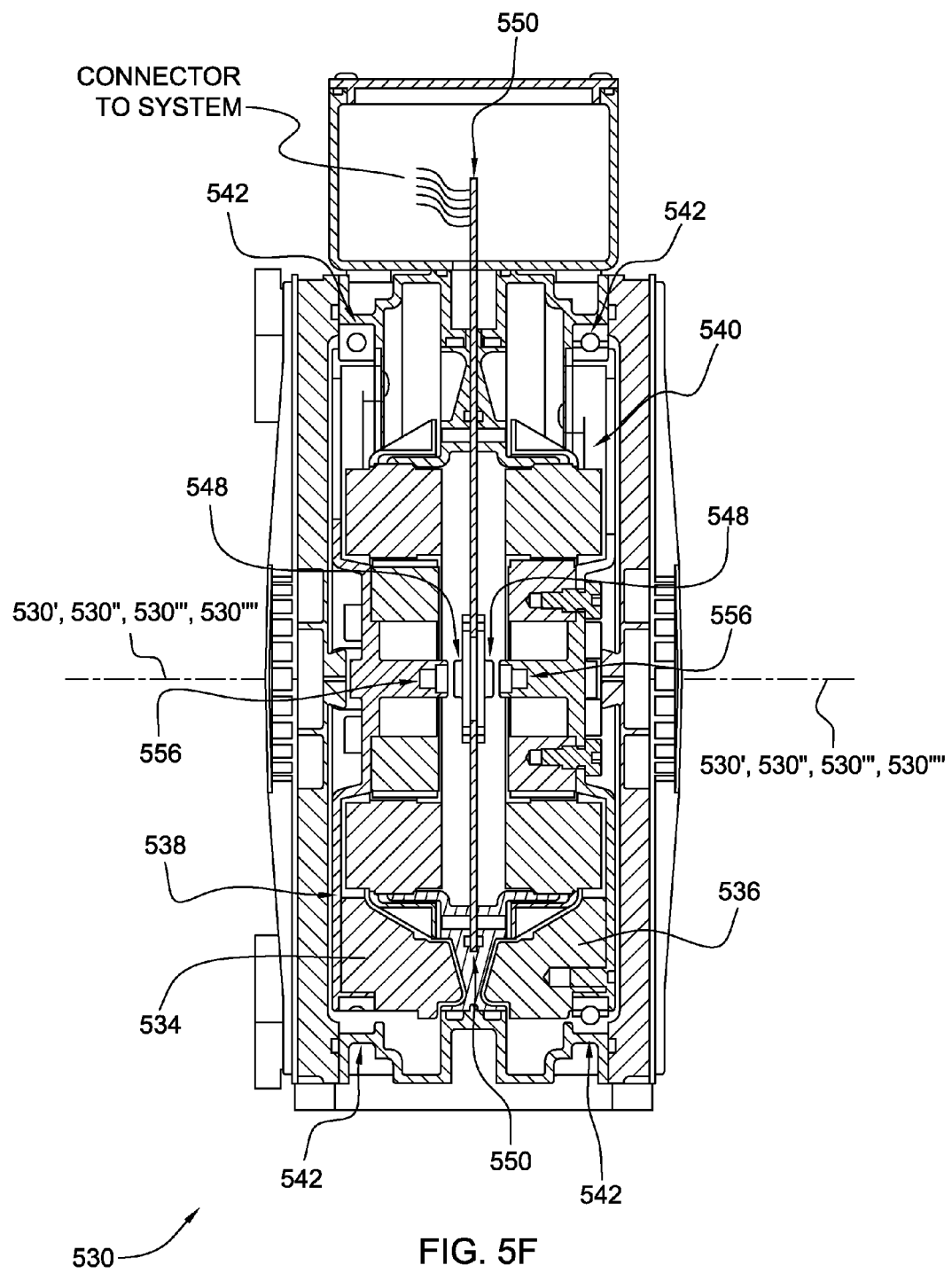
Figure 5G:
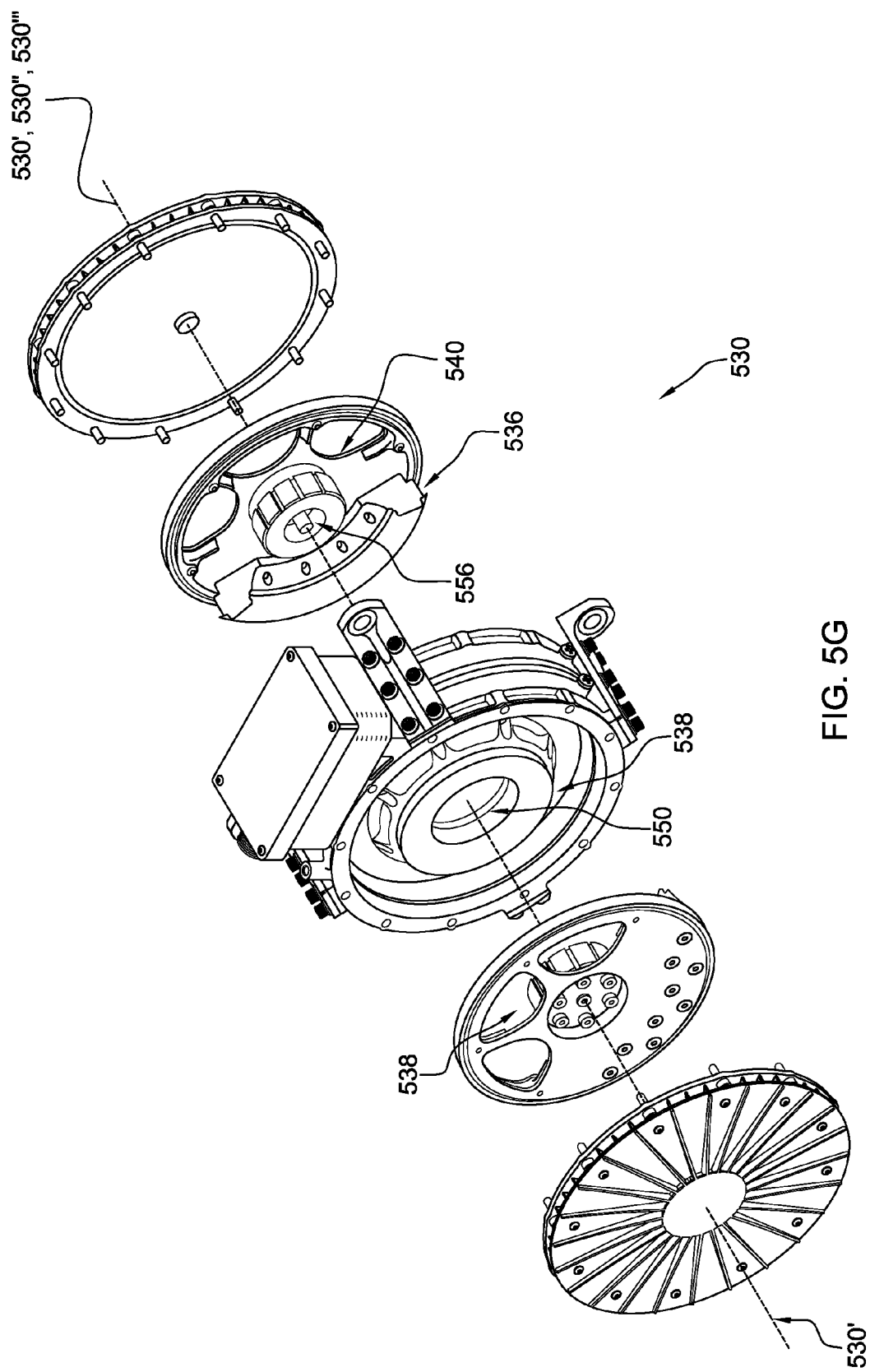
Figure 6A:
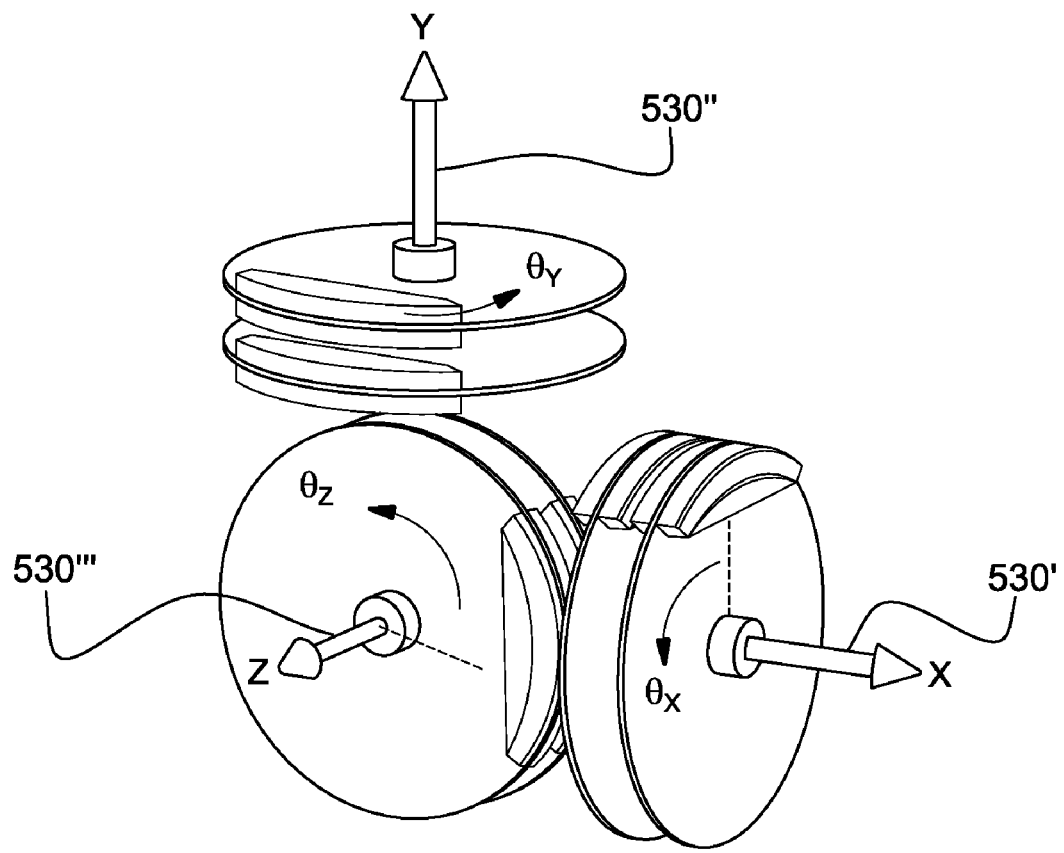
Figure 6C:
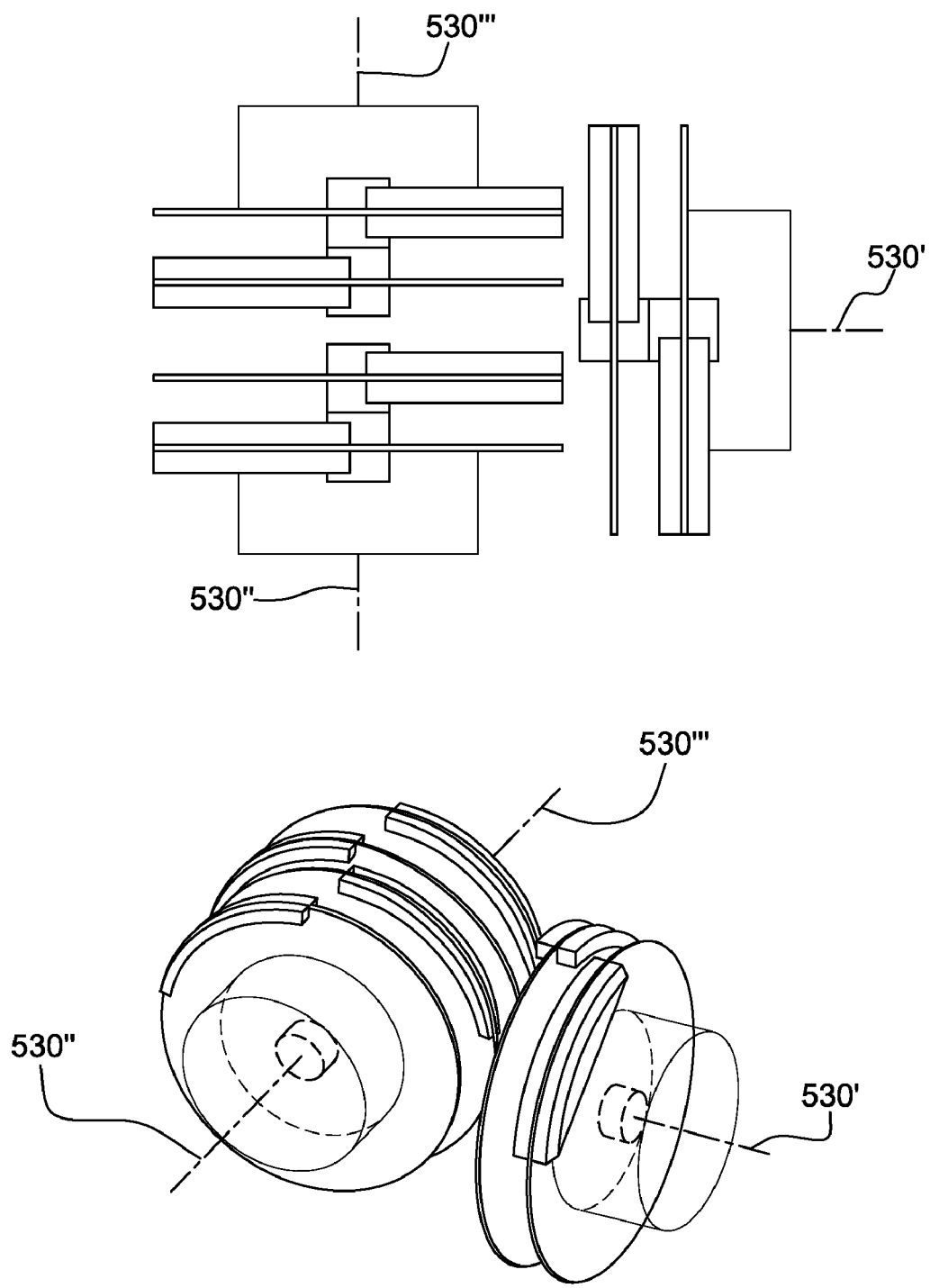
Figure 6E:
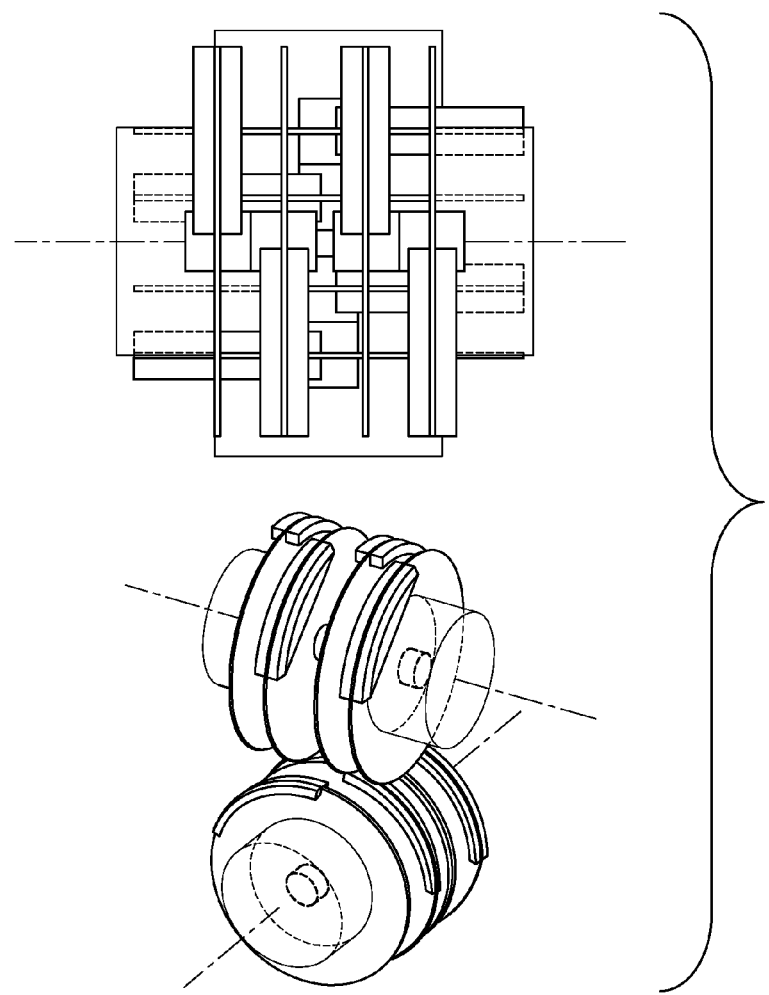
Figure 6F:
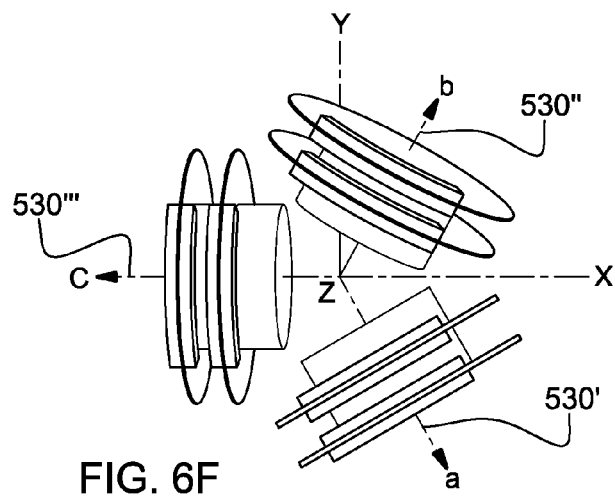

Preferably the vehicle 520 includes at least first nonrotating vehicle body circular force generator 530 including at least a first rotating mass (mass$_{1\_1}$) 534 controllably driven about a first rotating mass axis 534' with a first rotating mass controllable rotating imbalance phase $\Phi_{1\_1}$ and at least a second corotating mass (mass$_{1\_2}$) 536 controllably driven about a second rotating mass axis 536' with a second rotating mass controllable rotating imbalance phase $\Phi_{1\_2}$. As shown in FIG. 3, preferably axes 534' and 536' are overlapping, with the first ((mass$_{m\_1}$) and second mass (mass$_{m\_2}$) (with m whole number equal to or greater than one) adjacent each other, preferably with duplicate mass arcs of duplicate arcuate shape and arcuate size oriented about the overlapping axes. Preferably the duplicate mass arcs of duplicate arcuate shape and arcuate size oriented about the overlapping axes adjacent each other, are preferably unnested rotating masses. The rotating mass arc preferably has an outer circumference curvature and an inner circular circumference curvature, and a center of mass. The circular force generator 530 preferably has two of the rotating mass arcs, with each rotating mass arc having a center of mass and a mass line going normal from the center of mass to its rotating mass axis providing a center of mass rotation axis track line, preferably with the first and second rotating mass arcs center of mass rotation axis track lines not crossing or interecting but parallel, and preferably approximately adjacent.

Preferably the vehicle 520 includes n nonrotating vehicle body vibration sensors 554 and m nonrotating vehicle body circular force generators 530 wherein n>m and (with m whole number equal to or greater than one). Preferably the vehicle vibration control system controller 411 generates a rotating reference signal from the vehicle rotating machine member data correlating to the relative rotation of the vehicle rotating machine member 522 rotating relative to the nonrotating vehicle body 524. Preferably the first nonrotating vehicle body circular force generator 530 includes the first rotating mass (mass$_{1\_1}$) 534 controllably driven about a first rotating mass axis 534' with a first rotating mass controllable rotating imbalance phase $\Phi_{1\_1}$ and a second corotating mass (mass$_{1\_2}$) 536 controllably driven about a second rotating mass axis 536' with a second rotating mass controllable rotating imbalance phase $\Phi_{1\_2}$, the imbalance phase $\Phi_{1\_1}$ and the imbalance phase $\Phi_{1\_2}$ controlled in reference to the rotating reference signal. Preferably the m$^{th}$ nonrotating vehicle body circular force generator 530 including a first rotating mass (mass$_{m\_1}$) 534 controllably driven about a first rotating mass axis 534' with a first rotating mass controllable rotating imbalance phase $\Phi_{m\_1}$ and a second corotating mass (mass$_{m\_2}$) 536 controllably driven about a second rotating mass axis 536' with a second rotating mass controllable rotating imbalance phase $\Phi_{m\_2}$, the imbalance phase $\Phi_{m\_1}$ and the imbalance phase $\Phi_{m\_2}$ controlled in reference to the rotating reference signal, preferably the rotating reference signal based on the tach input of the rotating machine rotor head member 522.

Preferably the first nonrotating vehicle body circular force generator 530 includes a first rotating mass (mass$_{1\_1}$) 534 with a first rotating mass controllable rotating imbalance phase $\Phi_{1\_1}$ and a second corotating mass (mass$_{1\_2}$) 536 with a second rotating mass controllable rotating imbalance phase $\Phi_{1\_2}$. Preferably the first rotating mass (mass$_{1\_1}$) is driven with a first motor and the second corotating mass (mass$_{1\_2}$) is driven with a second motor. As shown in FIG. 5, nonrotating vehicle body circular force generator 530 preferably includes the first rotating mass (mass$_{1\_1}$) 534 is driven with a first motor 538 and the second corotating mass (mass$_{1\_2}$) 536 is driven with a second motor 540.

Figure 11D:
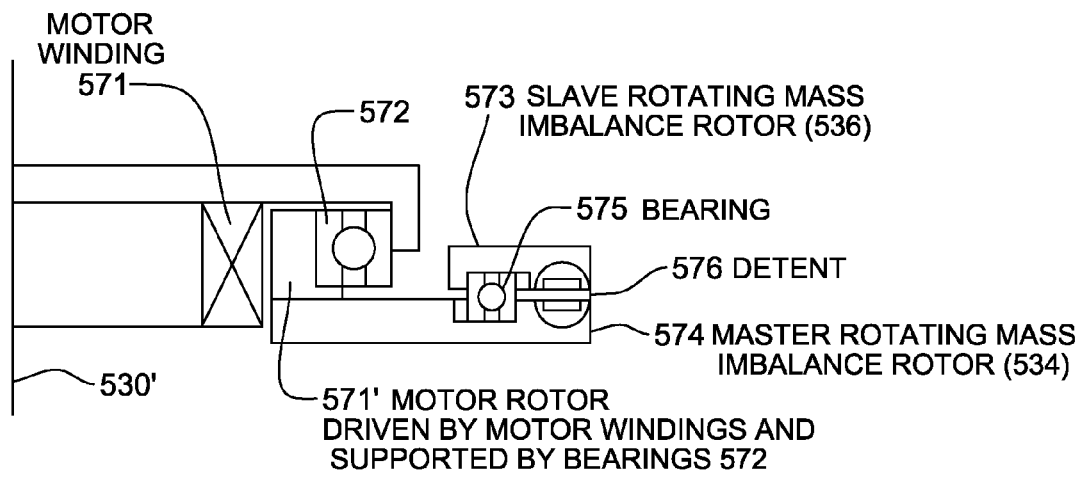
Figure 11G:
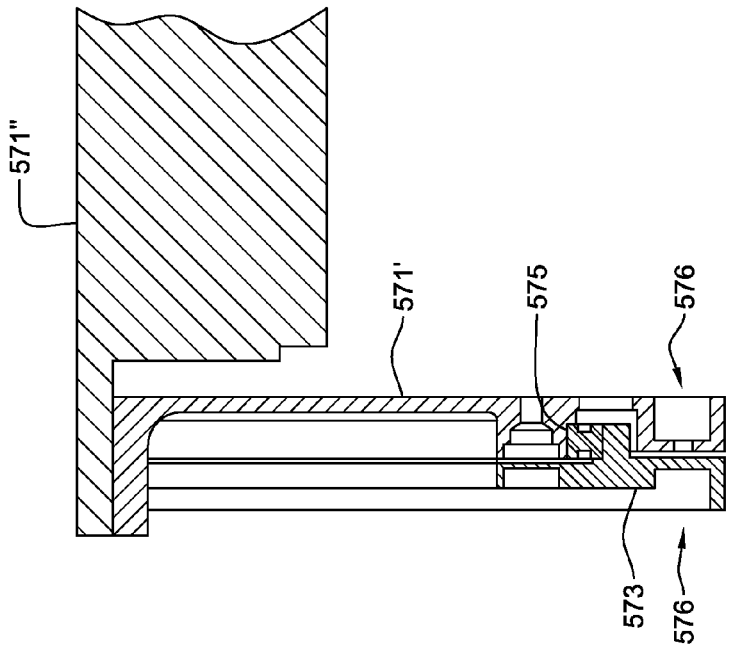
Figure 11F:
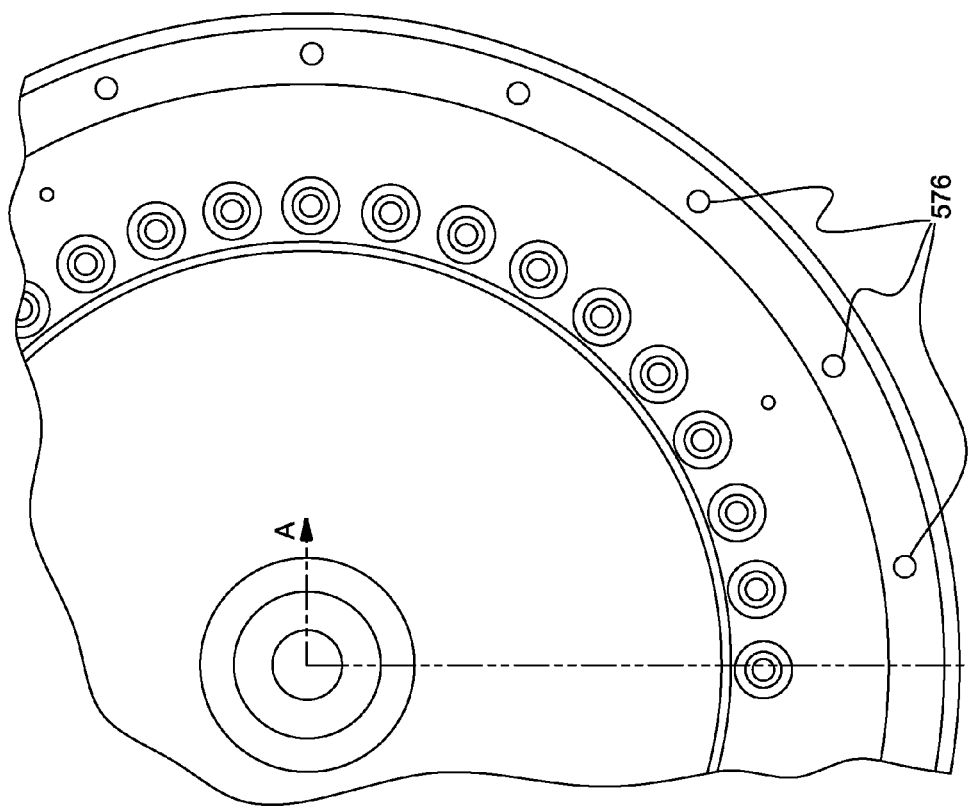
Figure 12A:
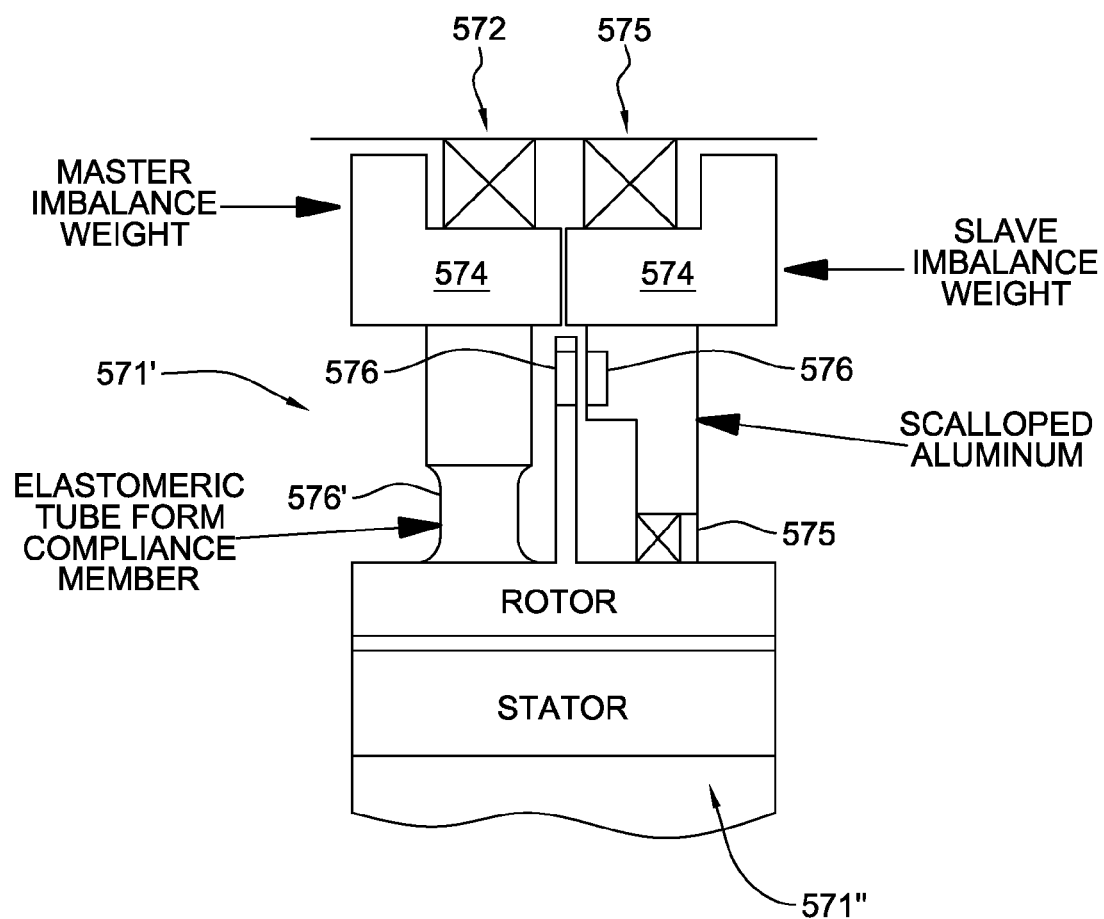
FIG. 12A-C illustrate CFGs (Circular Force Generators) with master rotating mass imbalance rotors and slave rotating mass imbalance rotors.
Figure 12B:
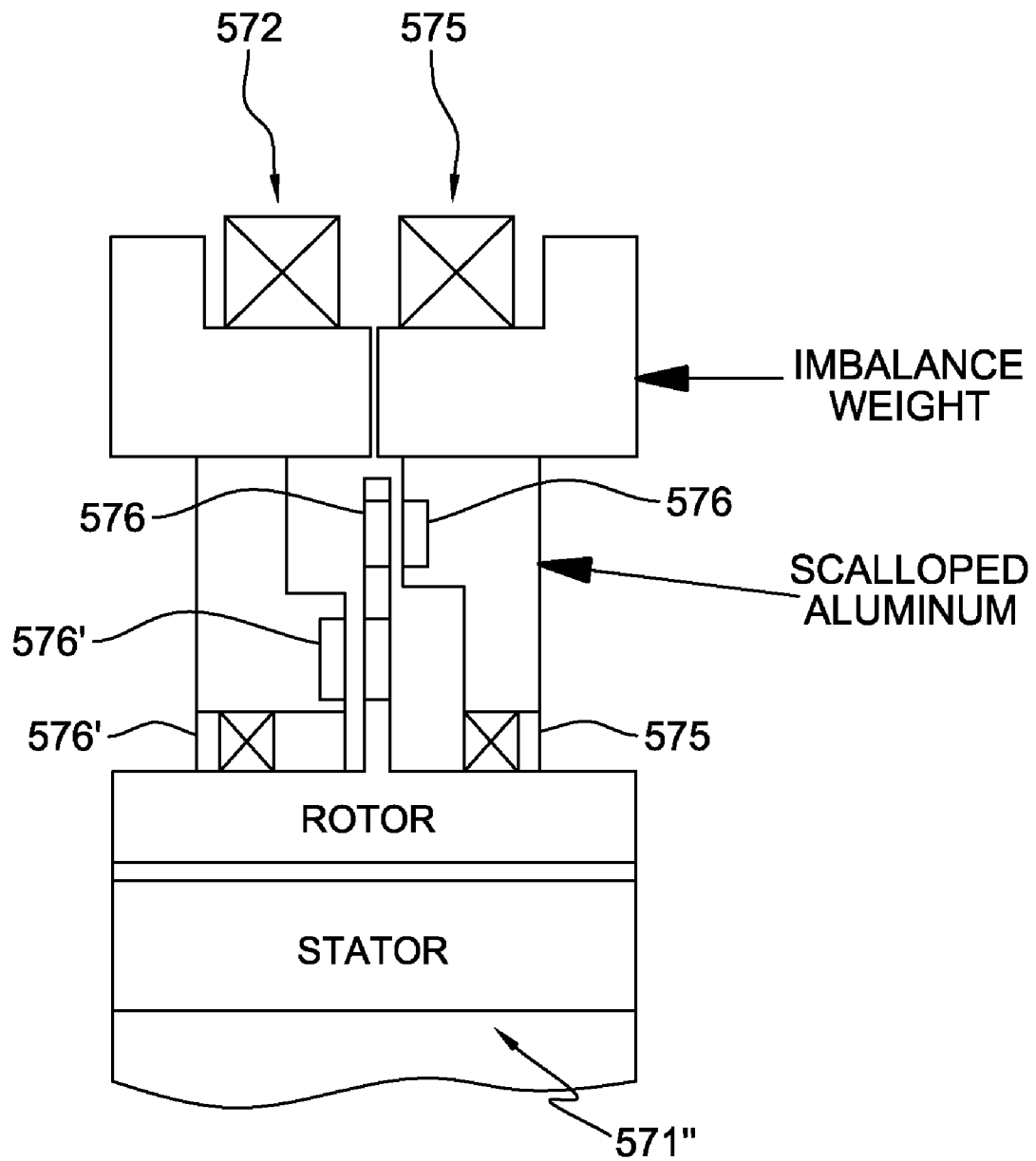
Figure 12C:
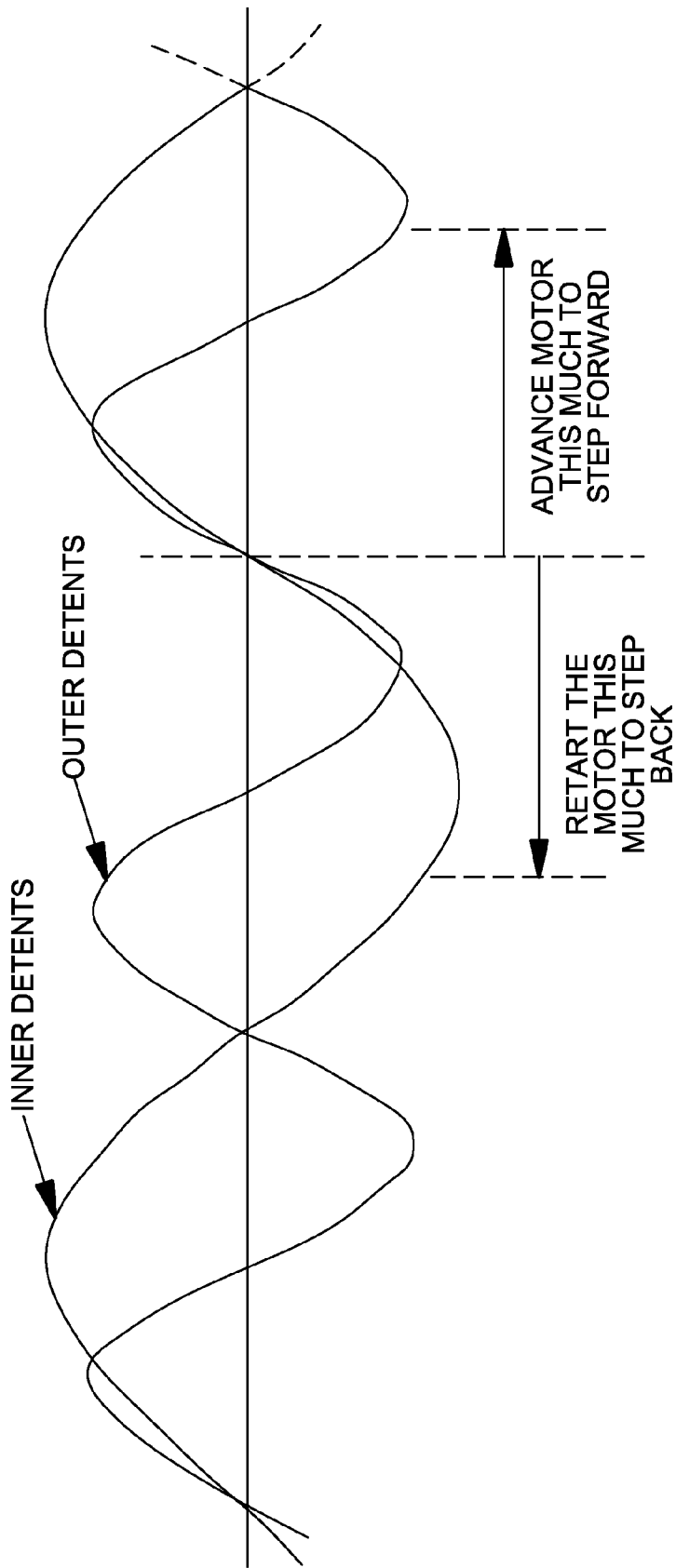

Preferably the first nonrotating vehicle body circular force generator 530 includes a first rotating mass (mass$_{1\_1}$) 534 with a first rotating mass controllable rotating imbalance phase $\Phi_{1\_1}$ and a second corotating mass (mass$_{1\_2}$) 536 with a second rotating mass controllable rotating imbalance phase $\Phi_{1\_2}$, with a detent 576 linking between the first rotating mass (mass$_{m\_1}$) and the second corotating mass (mass$_{m\_2}$), and a single motor for driving the first rotating mass (mass$_{m\_1}$), wherein the first rotating mass (mass$_{m\_1}$) comprises a master rotating mass (mass$_{m\_1}$) with a master rotating mass controllable rotating imbalance phase $\Phi_{1\_1}$, and the second corotating mass (mass$_{m\_2}$) comprises a slave corotating mass (mass$_{m\_2}$) with a slave rotating mass controllable rotating imbalance phase $\Phi_{1\_2}$ with the detent 576 controlling the slave rotating mass controllable rotating imbalance phase $\Phi_{1\_2}$ relative to the master rotating mass controllable rotating imbalance phase $\Phi_{1\_1}$. As illustrated in FIG. 11, preferably one motor 571" with motor windings 571 drives both the master rotating mass 574 and the slave rotating mass 574. The motor windings 571 drive a motor rotor 571' supported by bearings 572 with that motor rotor coupled with the master rotating mass imbalance rotor 574 (first rotating mass 534) with the second slave rotating mass imbalance rotor 573 coupled with the master rotor 574 with bearing 575 and detent 576 wherein the phase between the two rotors can be adjusted with controllably forcing slippage across the detent 576. Preferably the rotors are magnetically detented with a plurality of distributed magnets coupling the two rotors together, preferably with motor torque pulses controllably clocking the relative phases of the imbalance phases to control force magnitude with slipping of the detents 576. In embodiments detents 576 include magnetically detented magnets on magnets detent and magnets on steel. In embodiments the rotors are mechanically detented such as with mechanical ball detent, quill detent, and friction interface detent, preferably with elastomeric detents, preferably with engaging surface effect elastomers. FIG. 12 illustrates further embodiments of detented master and slave rotating masses. As shown in FIG. 12A-B, the master slave rotating mass rotor is preferably compliantly coupled and driven by the motor 571", preferably with a compliance member 576'. Preferably a compliance, preferably a compliance member 576', is provided between the motor and the master rotor imbalance. In preferred embodiments the compliance member 576' is a spring member. As shown in FIG. 12A, the compliance member 576' is an elastomeric spring member, preferably a elastomeric tubeform compliance member. As shown in FIG. 12B, the compliance member 576' is a magnetic detent spring and bearing member, preferably with the magnetic detents with lower step resolution than the above existing detents 576 between the master and slave rotating mass rotors or preferably with the magnetic detents with higher step maximum torque than the above existing detents 576 between the master and slave rotating mass rotors. In additional embodiments the the compliance member 576' is a metal spring member, such as a spoke style metal spring, or other flexing metal spring member. In additional embodiments the the compliance member 576' is a torsional spring member. Preferably the compliance member 576' is provided between the motor 571" and the master rotating imbalance rotor and then the detent 576 is provided between the compliant master rotating imbalance mass and the detented slave rotor. FIG. 12C show the detent torque versus relative angular displacement for two detents.

Preferably the vehicle 520 includes n nonrotating vehicle body vibration sensors 554 and m nonrotating vehicle body circular force generators 530, with m≧2 and wherein n>m. Preferably the vehicle vibration control system controller 411 calculates a rotating reference signal from the vehicle rotating machine member data correlating to the relative rotation of the vehicle rotating machine member 522 rotating relative to the nonrotating vehicle body 524, and the first nonrotating vehicle body circular force generator 530 includes a first rotating mass (mass$_{1\_1}$) 534 controllably driven about a first circular force generator axis 530' with a first rotating mass controllable rotating imbalance phase $\Phi_{1\_1}$ and a second corotating mass (mass$_{1\_2}$) 536 controllably driven about the first circular force generator axis 530' with a second rotating mass controllable rotating imbalance phase $\Phi_{1\_2}$, with the imbalance phase $\Phi_{1\_1}$ and the imbalance phase $\Phi_{1\_2}$ controlled in reference to the rotating reference signal. The vehicle 520 includes a second nonrotating vehicle body circular force generator 530 including a first rotating mass (mass$_{2\_1}$) 534 controllably driven about a second circular force generator axis 530" with a first rotating mass controllable rotating imbalance phase $\Phi_{2\_1}$ and a second corotating mass (mass$_{2\_2}$) 536 controllably driven about the second circular force generator axis 530" with a second rotating mass controllable rotating imbalance phase $\Phi_{2\_2}$, with the imbalance phase $\Phi_{2\_1}$ and the imbalance phase $\Phi_{2\_2}$ controlled in reference to the rotating reference signal, the second nonrotating vehicle body circular force generator 530 oriented relative to the first nonrotating vehicle body circular force generator 530 wherein the second circular force generator axis 530" is nonparallel with the first circular force generator axis 530'. In a preferred embodiment the second nonrotating vehicle body circular force generator 530 oriented relative to the first nonrotating vehicle body circular force generator 530 wherein the second circular force generator axis 530" is oriented orthogonally with the first circular force generator axis 530'. Preferably m≧3, and a third nonrotating vehicle body circular force generator 530 first rotating mass (mass$_{3\_1}$) 534 is controllably driven about a third circular force generator axis 530''' with a first rotating mass controllable rotating imbalance phase $\Phi_{3\_1}$ and a second corotating mass (mass$_{3\_2}$) 536 is controllably driven about the third circular force generator axis 530''' with a second rotating mass controllable rotating imbalance phase $\Phi_{3\_2}$, with the imbalance phase $\Phi_{3\_1}$ and the imbalance phase $\Phi_{3\_2}$ controlled in reference to the rotating reference signal, the third circular force generator axis oriented relative to the second circular force generator axis 530" and the first circular force generator axis 530'. In preferred embodiments the axis 530', 530", 530''' are nonparallel, and more preferably are oriented orthogonally. In embodiments at least two circular force generator axes are parallel, and preferably at least one nonparallel, preferably orthogonal. FIG. 6 illustrate embodiments of circular force generator axis 530', 530", 530''', 530'''' orientation. In embodiments preferrably the three axis 530', 530", 530''' form a three-dimensional basis whereby controllable force components are created in three dimensions.

Figure 7A:
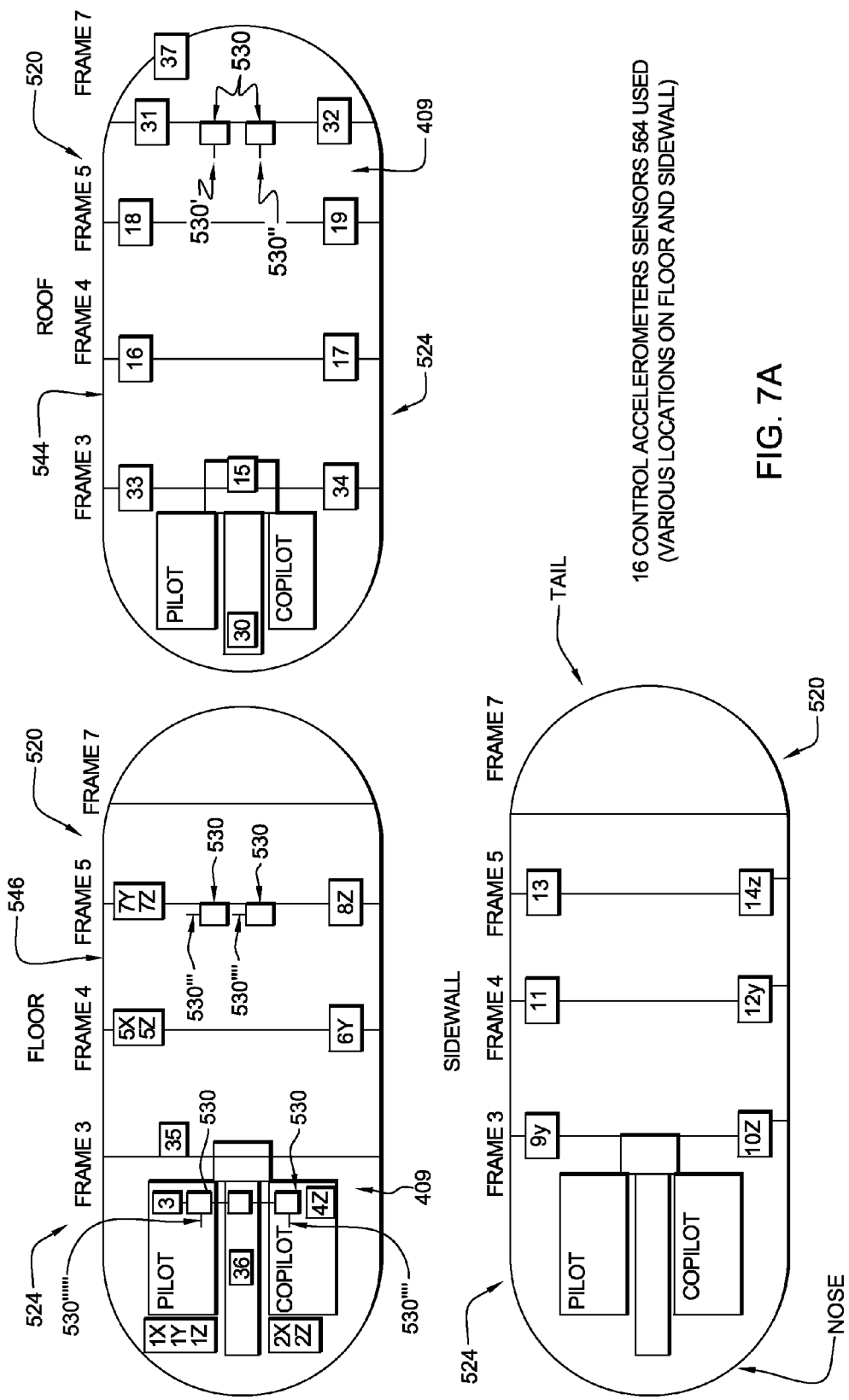
Figure 7C:
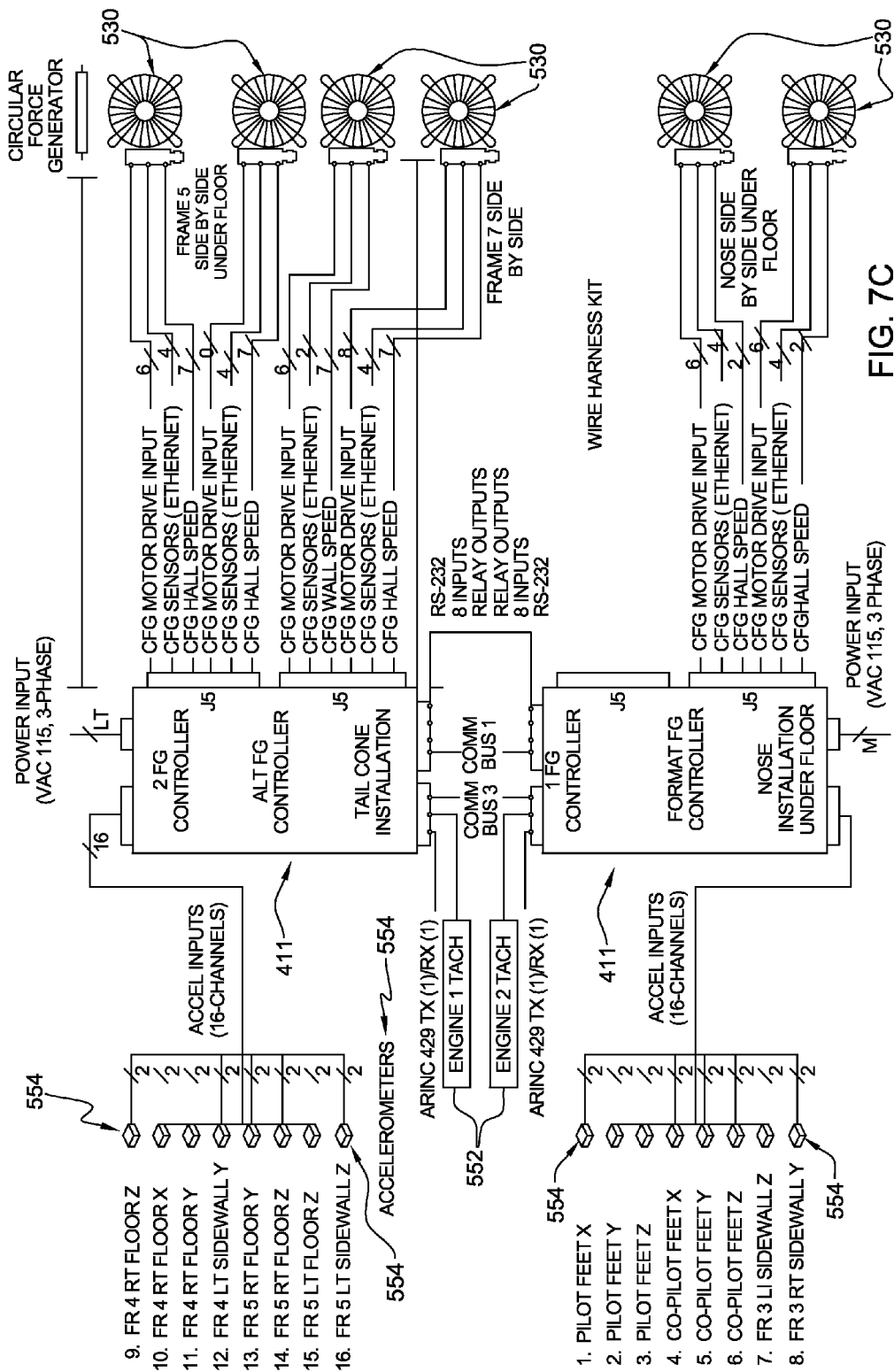
Figure 7E:
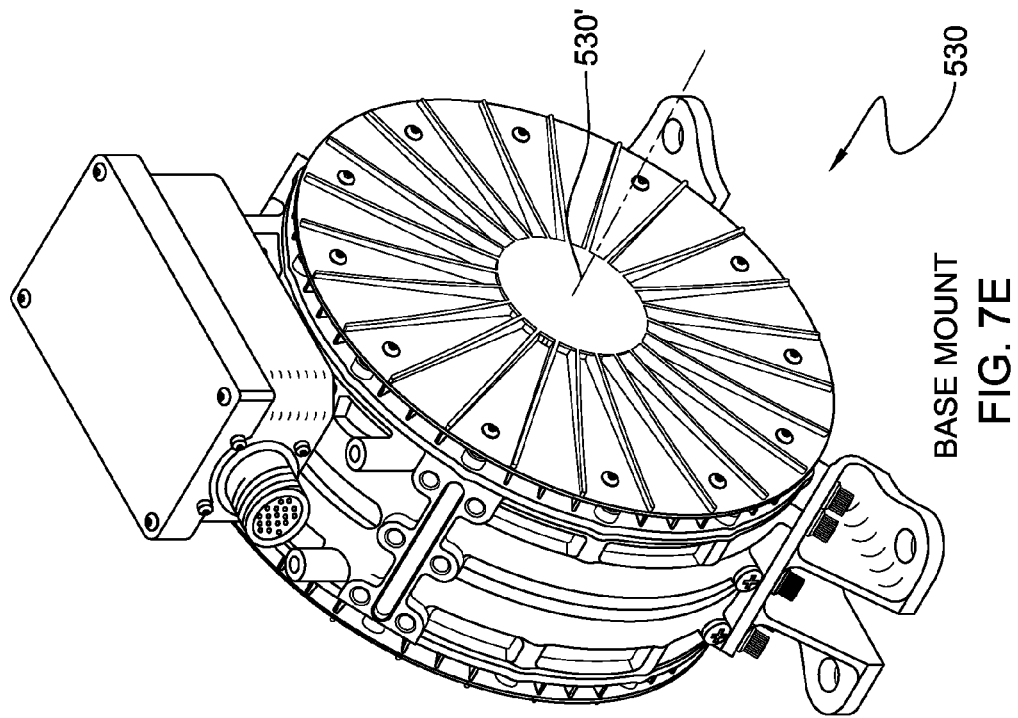
Figure 7D:
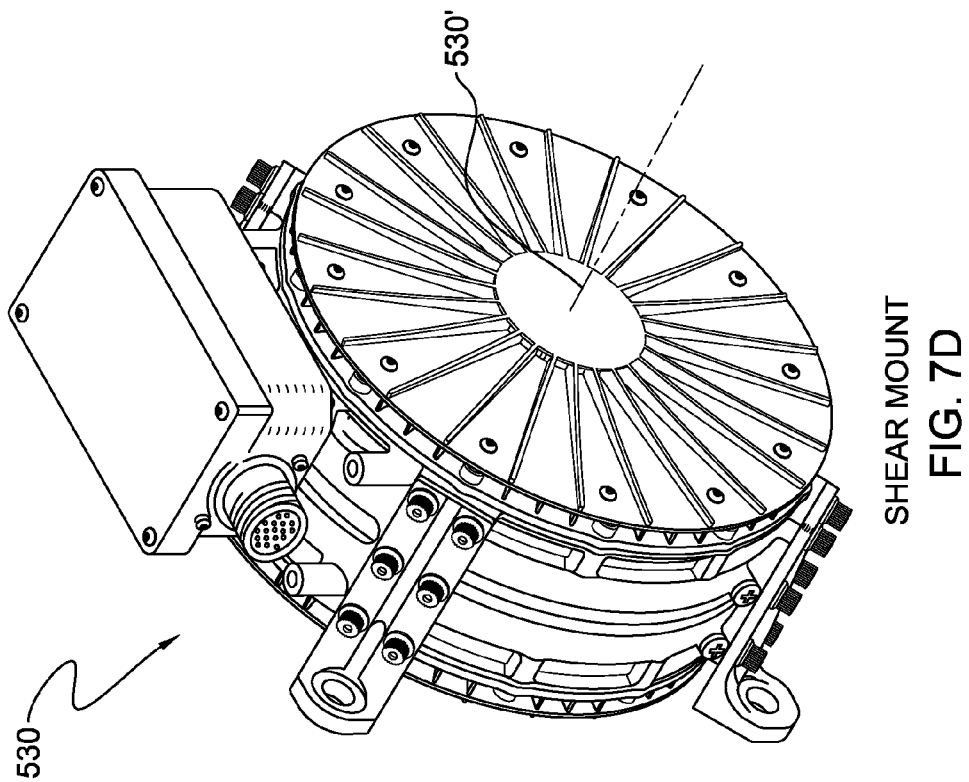

Preferably the vehicle 520 is a rotary wing aircraft with a vehicle ceiling and a vehicle floor. Preferably the vehicle nonrotating vehicle body 524 includes a vehicle ceiling 544 and a distal vehicle floor 546, the distal vehicle floor below 546 the vehicle ceiling 544 under normal parking, use and flight of the vehicle in the presence of gravity. Preferably the vehicle 520 includes n nonrotating vehicle body vibration sensors 554 and m nonrotating vehicle body circular force generators 530 with n>m. The vehicle vibration control system controller 411 calculates a rotating reference signal from the vehicle rotating machine member data correlating to the relative rotation of the vehicle rotating machine member 522 rotating relative to the nonrotating vehicle body 524. The first nonrotating vehicle body circular force generator 530 includes a first rotating mass (mass$_{1\_1}$) 534 controllably driven about a first rotating mass axis 534' with a first rotating mass controllable rotating imbalance phase $\Phi_{1\_1}$ and a second corotating mass (mass$_{1\_2}$) 536 controllably driven about a second rotating mass axis 536' with a second rotating mass controllable rotating imbalance phase $\Phi_{1\_2}$, the imbalance phase $\Phi_{1\_1}$ and the imbalance phase $\Phi_{1\_2}$ controlled in reference to the rotating reference signal, the first nonrotating vehicle body circular force generator mounted to the vehicle body 524 proximate the vehicle ceiling 544. The vehicle with nonrotating vehicle body circular force generator 530 including a first rotating mass (mass$_{m\_1}$) 534 controllably driven about a first rotating mass axis 534' with a first rotating mass controllable rotating imbalance phase $\Phi_{m\_1}$ and a second corotating mass (mass$_{m\_2}$) 536 controllably driven about a second rotating mass axis 536' with a second rotating mass controllable rotating imbalance phase $\Phi_{m\_2}$, the imbalance phase $\Phi_{m\_1}$ and the imbalance phase $\Phi_{m\_2}$ controlled in reference to the rotating reference signal, the $m^{th}$ nonrotating vehicle body circular force generator mounted to the vehicle body 524 proximate the vehicle floor 546. Preferably a plurality of circular force generators 530 are mounted to the vehicle body frame 524 proximate the floor 546, and preferably under the floor 546, and preferably proximate the vehicle nose, and preferably proximate the vehicle tail. Preferably a plurality of circular force generators 530 are mounted to the vehicle body frame 524 proximate the ceiling 544, and preferably above the ceiling 544, preferably proximate the vehicle tail, preferably mounted to a vehicle tailcone frame. FIG. 7 illustrates a vehicle vibration control system 409 with two force generators 530 mounted to the tailcone frame 7 proximate the ceiling 544 of a helicopter 520 and with two circular force generators 530 mounted under the floor 546 in the nose of the helicopter below the pilot and copilot area and with two circular force generators 530 mounted under the floor 546 to the helicopter frame 5. Preferably the two circular force generators 530 are mounted to the frame as shown in FIG. 7B with shear mounts as shown in FIG. 7D. In an embodiment the two circular force generators 530 in the nose area are mounted under the floor with base mounts as shown in FIG. 7E. In an embodiment such as illustrated in FIG. 7C, preferably a first forward controller 411 (1 FG Controller) controls the two circular force generators 530 which are mounted under the floor in the forward of the vehicle and a second aft controller 411 (2 FG Controller) controls the four circular force generators 530 mounted proximate the aft of the vehicle.

Figure 8:
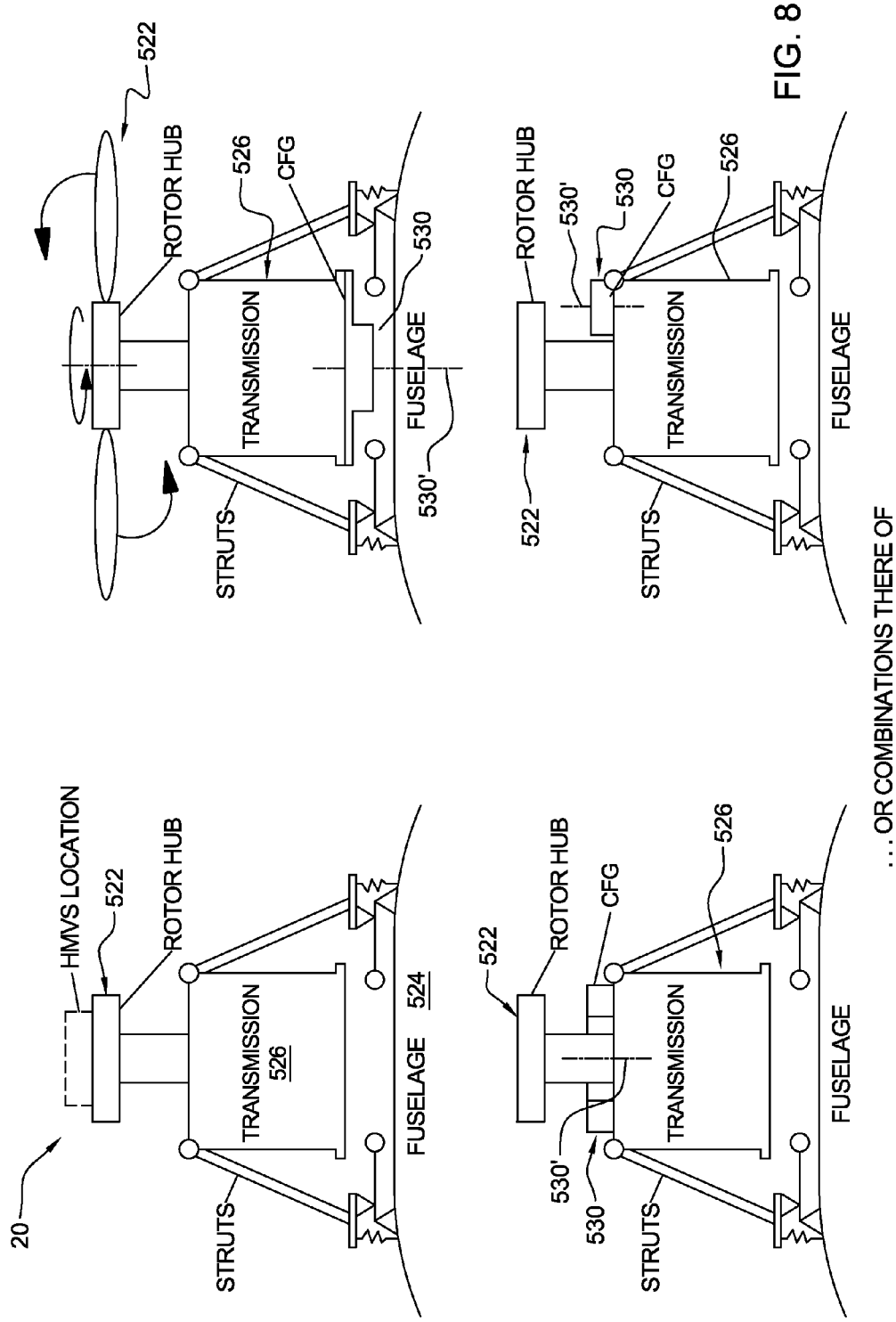
FIG. 8 illustrates helicopter Active Vibration Control with CFGs (Circular Force Generators) mounted on helicopter transmissions.

Preferably the vehicle 520 includes a vehicle transmission 526 for transmitting rotational power to the rotating machine member 522. Preferably vehicle engine energy force is transmitted through the transmission 526 to the vehicle motive force propeller helicopter rotor to move it and in turn move the vehicle, preferably with the transmission connected to rotor and transmitting rotating force to the rotor so the rotor turns at the relative rotation rate to the vehicle nonrotating body. The vehicle vibration control system controller 411 generates a rotating reference signal from the vehicle rotating machine member data correlating to the relative rotation of the vehicle rotating machine member 522 rotating relative to the nonrotating vehicle body 524. The first nonrotating vehicle body circular force generator 530 including a first rotating mass ($mass_{1\_1}$) 534 controllably driven about a first rotating mass axis 534' with a first rotating mass controllable rotating imbalance phase $\Phi_{1\_1}$ and a second corotating mass ($mass_{1\_2}$) 536 controllably driven about a second rotating mass axis 536' with a second rotating mass controllable rotating imbalance phase $\Phi_{1\_2}$, the imbalance phase $\Phi_{1\_1}$ and the imbalance phase $\Phi_{1\_2}$ controlled in reference to the rotating reference signal, the first nonrotating vehicle body circular force generator 530 mounted to the vehicle transmission 526. In an embodiment a plurality of nonrotating vehicle body circular force generators 530 are mounted to the transmission 526, and preferably the transmission is above the floor 546 and ceiling 544. FIG. 8 illustrates embodiments with nonrotating vehicle body circular force generators 530 mounted to the vehicle transmissions 526, preferably with the circular force generator axis 530' oriented relative to the rotation axis of the rotating machine member 522, most preferably with the circular force generator axis 530' oriented parallel with the rotating machine member rotor hub axis of rotation.

Figure 9:
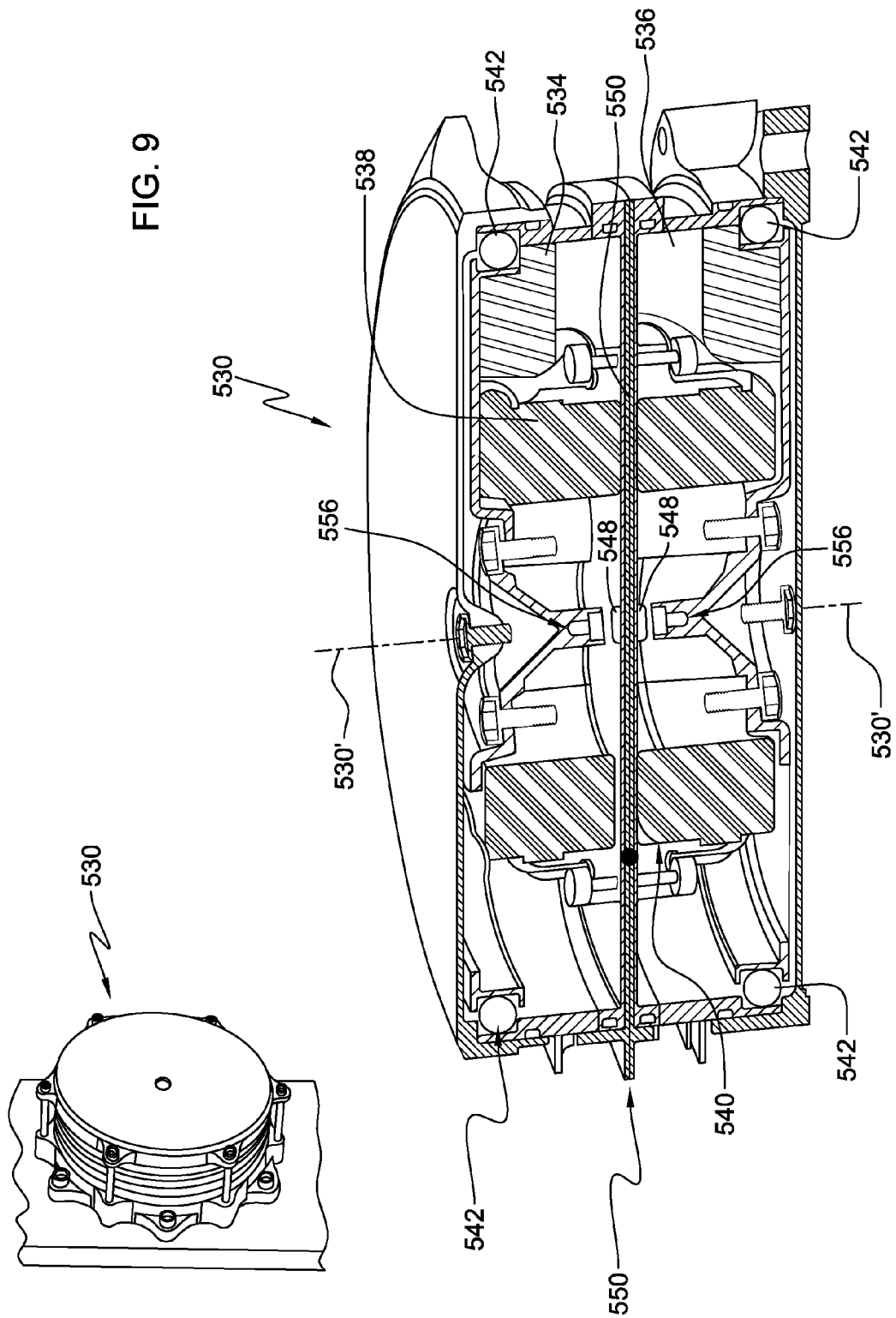
FIG. 9 illustrates a CFG (Circular Force Generator) with internal bearings, imbalance masses, motors, rotating mass sensor targets and sensors.

FIG. 5 illustrates preferred embodiments of a nonrotating vehicle body circular force generator 530 including first rotating mass ($mass_{1\_1}$) 534 controllably driven about a first rotating mass axis 534' colined with circular force generator axis 530' rotated by motor 538 (with the nonrotating motor winding preferably between the rotating motor rotor and the rotating mass 534) with first rotating mass controllable rotating imbalance phase $\Phi_{1\_1}$ and a second corotating mass ($mass_{1\_2}$) 536 controllably driven about a second rotating mass axis 536' colined with circular force generator axis 530' rotated by motor 540 (with the nonrotating motor winding preferably between the rotating motor rotor and the rotating mass 536) with first rotating mass controllable rotating imbalance phase $\Phi_{1\_2}$. Preferably a nonrotating vehicle body circular force generator circuit board 550 is positioned between the first rotating mass ($mass_{1\_1}$) 534 and the second corotating mass ($mass_{1\_2}$) 536, preferably a substantially planar is disposed and aligned between the rotating masses and motors, preferably with the circuit board comprised of a sealed circuit board with a sealed exterior overcoating, preferably with the circuit board plane oriented substantially normal to the circular force generator axis 530' with the board preferably equal distances between the first rotating mass ($mass_{1\_1}$) 534 and the second corotating mass ($mass_{1\_2}$) 536. Preferably the circular force generator circuit board 550 extends with an electric lead end into an electronic housing, with the electric lead end connecting the circuit board with at least a first system connector with the outside and the controller 411 and the system 409. Preferably the circuit board includes wiring paths to the motor windings and to first and second rotating mass sensors 548 mounted on the circuit board 550. The first and second rotating mass sensors 548 mounted on the circuit board monitor the rotational position of the rotating mass sensor target 556 on the rotor being driven by the motors 538, 540 such that the controller 411 knows the rotational phase position of the rotating masses 534, 536, in preferred embodiments the first and second rotating mass sensors 548 are comprised of Hall sensor integrated sensor chips for sensing the rotation of a magnetic rotating mass sensor target 556 to provide out through the circuit board to the system controller the rotational position of the rotating mass. In an embodiment the rotating moving mass electronic noncontacting magnetic sensor 548 preferably comprises an integrated circuit semiconductor sensor chip which outputs through the circuitboard 550 into the system 409 and controller 411 the rotational angle phase position of the rotating moving mass that the sensor target 556 is coupled with that the motor driven by the controller is driving. In a preferred embodiment the electronic noncontacting magnetic sensor integrated circuit semiconductor sensor chip has at least two dies, preferably the at least two dies are ASICs (Application Specific Integrated Circuits), in a preferred embodiment the at least two dies are side by side dies in the integrated circuit semiconductor sensor chip, in a preferred embodiment the at least two dies are vertically stacked dies in the integrated circuit semiconductor sensor chip. In a preferred embodiment the integrated circuit semiconductor sensor chip ASIC die include a magnetoresistive material, preferably with electrical resistance changes in the presence of the magnetic target magnetic field of target 556, preferably with magnetoresistive elements arranged in a Wheatstone bridge. In a preferred embodiment the integrated circuit semiconductor sensor chip ASIC die include a Hall Effect element, preferably a plurality of oriented Hall Effect elements, preferably silicon semiconductor Hall effect elements which detect the magnetic target magnetic field of target 556. The first electronic noncontacting magnetic sensor 548 sensor plane is integrated substantially normal to the circular force generator axis 530'. The second electronic noncontacting magnetic sensor 548 second sensor plane is integrated substantially normal to the circular force generator axis 530'. Preferably the motor driven rotor includes a fan magnetic coupling drive for driving air cooling fans, preferably with the magnetic coupling drive provided with a magnetic coupling drive ratio to drive the fan at a predetermined fan speed, preferably such as a 4/rev to provide forced air cooling of the force generator 530. FIG. 9 illustrates a further embodiment of a circular force generator axis 530' with the circuit board 550 oriented between the motor driven imbalance masses 534 and 536 with circuit board mounted axis oriented sensor plane chips 548 tracking the rotational position of the motor driven imbalance masses 534 and 536.

Figure 10:
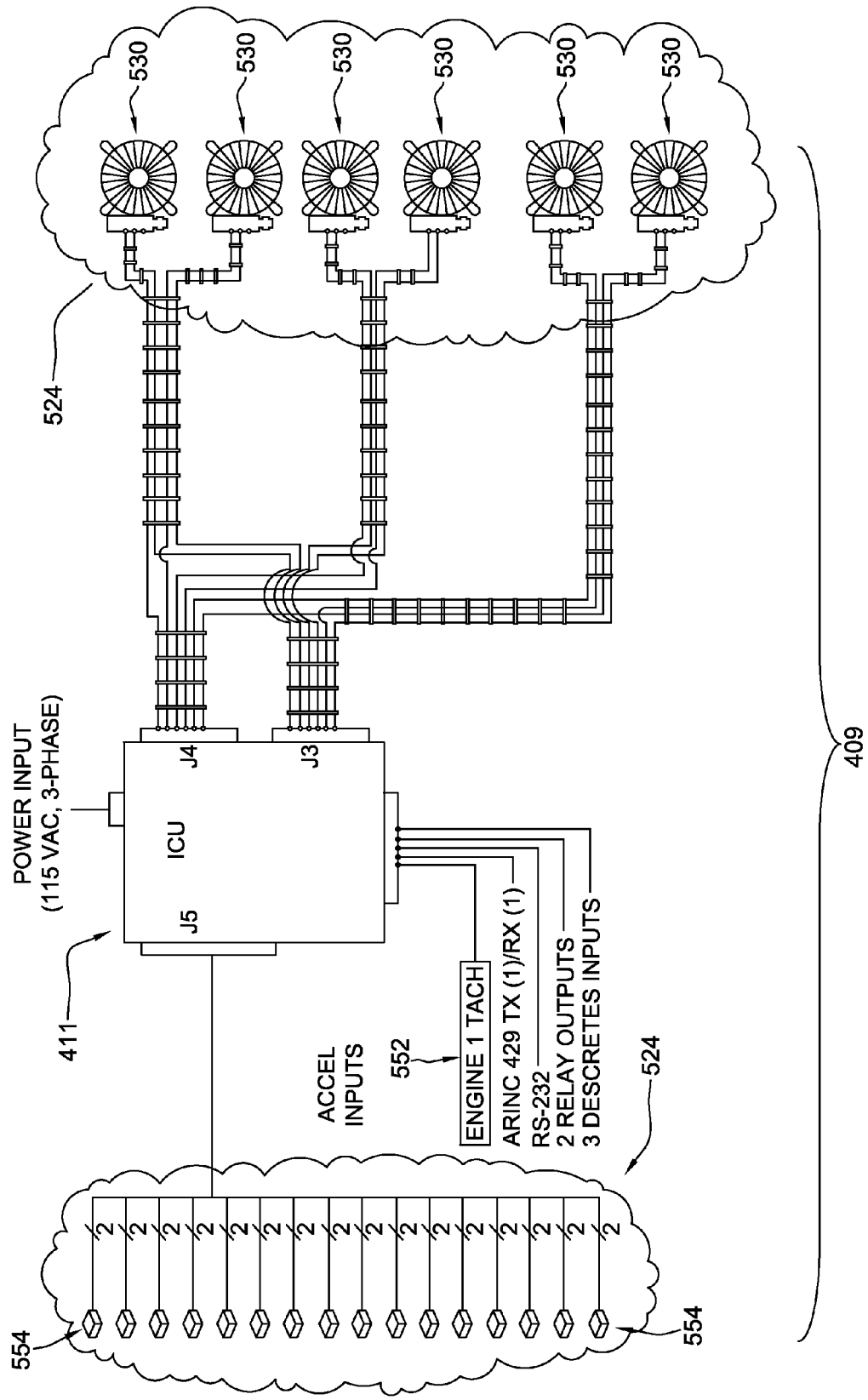
FIG. 10 illustrates methods/systems with multiple Circular Force Generators (CFGs) and accelerometers.

FIG. 10 illustrates a further vibration control system with a block diagram with six circular force generators 530 controlled by a controller 411 with a pluarity of accelerometer nonrotating body vibration sensors 554 and an engine tachometer input sensor 552 for the rotating machine member sensor for inputting vehicle rotating machine member data correlating to the relative rotation of the vehicle rotating machine member rotating relative to the nonrotating vehicle body into the vehicle vibration control system controller. The vehicle vibration control system controller 411 controls the rotation of the corotating masses rotating about circular force generator axes (530', 530", . . . , 530''''') to create the controllable rotating forces which rotationally emanate out from the nonrotating vehicle body circular force generators 530 to reduces the vehicle vibrations sensed by the nonrotating body vibration sensors 554.

In embodiments the vehicle 520 is a helicopter with the vehicle rotating machine member 522 the helicopter rotating rotary wing hub above the nonrotating vehicle body helicopter fuselage frame below, and the helicopter rotating rotary wing hub includes hub mounted vibration control system 20 with at least a first hub mounted motor driven hub mass and at least a second hub mounted motor driven hub mass housed within a hub housing 30, with the mounted vibration control system 20 at least a first hub mounted motor driven hub mass and at least a second hub mounted motor driven hub mass driven to rotate relative to the rotary wing hub while the system 409 generates rotating forces in the body 524 with the circular force generators 530.

Preferably the circular force generator 530 includes at least a first rotating externally housed cooling fan having a rotation motion for cooling said circular force generator, said cooling fan rotation motion linked with the rotation of said rotating force. Preferably the circular force generator 530 includes at least a first rotating externally housed cooling fan having a rotation motion for cooling the circular force generator 530, the cooling fan rotation motion linked with a rotation of said first rotating mass ($mass_{1\_1}$) or said second corotating mass ($mass_{1\_2}$). Preferably the circular force generator 530 includes a magnetically coupled forced air cooling fan magnetically coupled to the rotation of the mass rotor within the generator housing such that no external power is needed to rotate the fan, preferably with a plurality of spaced magnets providing a rotation coupling to power the fan rotation.

In an embodiment the invention includes a vehicle vibration control system for controlling troublesome vibrations in a nonrotating vehicle body having a rotating machine member. The vehicle vibration control system including a vehicle vibration control system controller. The vehicle vibration control system including a rotating machine member sensor, for inputting vehicle rotating machine member data correlating to a relative rotation of the rotating machine member rotating relative to the nonrotating body into the vehicle vibration control system controller. The vehicle vibration control system including at least a first nonrotating vehicle body vibration sensor, the at least first nonrotating vehicle body vibration sensor inputting at least first nonrotating vehicle body vibration sensor data correlating to vehicle vibrations into the vehicle vibration control system controller. The vehicle vibration control system including at least a first nonrotating vehicle body circular force generator, the at least a first nonrotating vehicle body circular force generator for fixedly mounting to the nonrotating vehicle body wherein the at least first nonrotating vehicle body circular force generator is controlled by the controller to produce a rotating force with a controllable rotating force magnitude and a controllable rotating force phase, the controllable rotating force magnitude controlled from a minimal force magnitude up to a maximum force magnitude, and with the controllable rotating force phase controlled in reference to the vehicle rotating machine member sensor data correlating to the relative rotation of the vehicle rotating machine member rotating relative to the nonrotating vehicle body with the vehicle vibration sensed by the at least first nonrotating vehicle body vibration sensor reduced by the controller.

The vehicle vibration control system 409 includes a rotary wing aircraft vehicle vibration control system for controlling troublesome vibrations in a nonrotating vehicle body 524 having a rotating machine member 522, preferably the aircraft vehicle structure frame. Preferably the rotating vehicle machine member rotating component 522 producing vibrations and the vibration disturbance at a vibration frequency in the nonrotating vehicle body 524 is preferably the aircraft rotating rotary wing hub. The vehicle vibration control system 409 includes a vehicle vibration control system controller 411 with a vehicle vibration control system processor, with a computer processor with inputs and outputs, and with the control system preferably comprised of multiple connected subsystems. The system includes a vehicle rotating machine member sensor 552, for inputting vehicle rotating machine member data correlating to a relative rotation of the vehicle rotating machine member rotating relative to the nonrotating vehicle body (tach input) into the vehicle vibration control system controller. Preferably the rotating machine member sensor 552 is a reference sensor for generating a persistent signal indicative of the vibration disturbance, and preferably senses a harmonic of the rotating speed of the rotating vehicle machine member 522 producing vibrations, and in preferred embodiments is a tachometer sensor providing a tach input. The system includes at least a first nonrotating vehicle body vibration sensor 554, the at least first nonrotating vehicle body vibration sensor inputting at least first nonrotating vehicle body vibration sensor data correlating to vehicle vibrations into the vehicle vibration control system controller, preferably with the system having a plurality of vibration sensors 554 distributed throughout the body 524, and in preferred embodiments the sensors 554 are accelerometers providing accel inputs. The system includes at least a first nonrotating vehicle body circular force generator 530, the at least a first nonrotating vehicle body circular force generator 530 for fixedly mounting to the nonrotating vehicle body 524 wherein the at least first nonrotating vehicle body circular force generator 530 is controlled by the controller 411 to produce a rotating force with a controllable rotating force magnitude and a controllable rotating force phase, the controllable rotating force magnitude controlled from a minimal force magnitude up to a maximum force magnitude, (preferably 0 magnitude force when masses have a 180° separation opposed position) (preferably maximum force magnitude when masses have a 0° separation position), and with the controllable rotating force phase controlled in reference to the vehicle rotating machine member sensor data correlating to the relative rotation of the vehicle rotating machine member rotating relative to the nonrotating vehicle body (preferably in reference to the tach input) with the vehicle vibration sensed by the at least first nonrotating vehicle body vibration sensor reduced by the controller. Preferably the system includes a plurality of nonrotating vehicle body circular force generators 530 controlled by the controller 411 to produce a plurality of rotating forces with the vibration preferably reduced at a frequency correlating to rotating machine member 522, with troublesome vibrations in the body 524 preferably reduced at harmonics of rotating machine member 522, preferably with the method and system controling harmonic vibrations of the rotating machine member 522 with the generated rotating forces emanating from the circular force generators 530, preferably with the circular force generators driven rotating moving masses 534 and 536 rotated at a harmonic of the vehicle rotating machine member 522. Preferably the system includes n nonrotating vehicle body vibration sensors 554 and m nonrotating vehicle body circular force generators 530 wherein n>m. Preferably wherein the rotating forces generates are controlled by the controller 411 to rotate at a harmonic of the rotating machine member 522 rotating speed, preferably with the system/method producing circular forces and not calculating for or intentionally producing linear forces, with the method/system preferably inhibiting and avoiding calculating linear forces and outputting such.

Preferably the vehicle vibration control system controller generates a rotating reference signal from the vehicle rotating machine member data correlating to the relative rotation of the vehicle rotating machine member rotating relative to the nonrotating vehicle body. Preferably the vehicle vibration control system controller 411 calculates in reference to a rotating reference signal the rotating force to be generated with a real part $\alpha$ and an imaginary part $\beta$. Preferably the vibe control subsystem calculates real parts $\alpha_m$ and imaginary parts $\beta_m$ in generating circular force command signals which command/describe desired rotating force vectors, such circular force command signals $\alpha_m$ $\beta_m$ are preferably sent to the rotor phase compute subsystem which in turn preferably computes mass phase signals, which are preferably sent to the motor control/motor drive subsystem which generates motor drive signals that drive the masses around their rotating circular paths, preferably motor drive signals that drive the masses to generate the circular forces preferably motor drive signals for motors 538, 540 to drive the masses 534, 536.

Preferably the at least first nonrotating vehicle body circular force generator 530 including at least a first rotating mass (mass$_{1\_1}$) 534 controllably driven about a first rotating mass axis 534' with a first rotating mass controllable rotating imbalance phase $\Phi_{1\_1}$ and at least a second corotating mass (mass$_{1\_2}$) 536 controllably driven about a second rotating mass axis 536' with a second rotating mass controllable rotating imbalance phase $\Phi_{1\_2}$, preferably with the axes are overlapping, with masses adjacent each other, preferably duplicate mass arcs of duplicate arcuate shape and arcuate size oriented about the overlapping axes. Preferably the system includes n nonrotating vehicle body vibration sensors 554 and m nonrotating vehicle body circular force generators 530 with n>m, the vehicle vibration control system controller generating a rotating reference signal from the vehicle rotating machine member data correlating to the relative rotation of the vehicle rotating machine member 522 rotating relative to the nonrotating vehicle body 524, and the first nonrotating vehicle body circular force generator 530 includes a first rotating mass (mass$_{1\_1}$) 534 controllably driven about a first rotating mass axis 534' with a first rotating mass controllable rotating imbalance phase $\Phi_{1\_1}$ and a second corotating mass (mass$_{1\_2}$) 536 controllably driven about a second rotating mass axis 536' with a second rotating mass controllable rotating imbalance phase $\Phi_{1\_2}$, the imbalance phase $\Phi_{1\_1}$ and the imbalance phase $\Phi_{1\_2}$ controlled in reference to the rotating reference signal. Preferably the m$^{th}$ nonrotating vehicle body circular force generator 530 includes a first rotating mass (mass$_{m\_1}$) 534 controllably driven about a first rotating mass axis 534' with a first rotating mass controllable rotating imbalance phase $\Phi_{m\_1}$ and a second corotating mass (mass$_{m\_2}$) 536 controllably driven about a second rotating mass axis 536' with a second rotating mass controllable rotating imbalance phase $\Phi_{m\_2}$, the imbalance phase $\Phi_{m\_1}$ and the imbalance phase $\Phi_{m\_2}$ controlled in reference to the rotating reference signal.

Preferably the first nonrotating vehicle body circular force generator 530 includes a first rotating mass (mass$_{1\_1}$) 534 with a first rotating mass controllable rotating imbalance phase $\Phi_{1\_1}$ and a second corotating mass (mass$_{1\_2}$) 536 with a second rotating mass controllable rotating imbalance phase $\Phi_{1\_2}$. Preferably the first rotating mass (mass$_{1\_1}$) 534 is driven with a first motor 538 and the second corotating mass (mass$_{1\_2}$) is driven with a second motor 540.

Preferably the first nonrotating vehicle body circular force generator 530 includes a first rotating mass (mass$_{1\_1}$) 534 with a first rotating mass controllable rotating imbalance phase $\Phi_{1\_1}$ and a second corotating mass (mass$_{1\_2}$) 536 with a second rotating mass controllable rotating imbalance phase $\Phi_{1\_2}$ with a detent 576 linking between the first rotating mass (mass$_{m\_1}$) and the second corotating mass (mass$_{m\_2}$), and a single motor for driving the first rotating mass (mass$_{m\_1}$), wherein the first rotating mass (mass$_{m\_1}$) comprises a master rotating mass (mass$_{m\_1}$) with a master rotating mass controllable rotating imbalance phase $\Phi_{1\_1}$, and the second corotating mass (mass$_{m\_2}$) comprises a slave corotating mass (mass$_{m\_2}$) with a slave rotating mass controllable rotating imbalance phase $\Phi_{1\_2}$ with the detent controlling the slave rotating mass controllable rotating imbalance phase $\Phi_{1\_2}$ relative to the master rotating mass controllable rotating imbalance phase $\Phi_{1\_1}$.

Preferably the system includes n nonrotating vehicle body vibration sensors 554 and m nonrotating vehicle body circular force generators 530, with m$\geq$2 and n>m, and preferably the vehicle vibration control system controller calculates a rotating reference signal from the vehicle rotating machine member data correlating to the relative rotation of the vehicle rotating machine member 522 rotating relative to the nonrotating vehicle body 524. The first nonrotating vehicle body circular force generator 530 includes a first rotating mass (mass$_{1\_1}$) 534 controllably driven about a first circular force generator axis 530' with a first rotating mass controllable rotating imbalance phase $\Phi_{1\_1}$ and a second corotating mass (mass$_{1\_2}$) 536 controllably driven about the first circular force generator axis 530' with a second rotating mass controllable rotating imbalance phase $\Phi_{1\_2}$, with the imbalance phase $\Phi_{1\_1}$ and the imbalance phase $\Phi_{1\_2}$ controlled in reference to the rotating reference signal. The system includes a second nonrotating vehicle body circular force generator 530 including a first rotating mass (mass$_{2\_1}$) 534 controllably driven about a second circular force generator axis 530" with a first rotating mass controllable rotating imbalance phase $\Phi_{2\_1}$ and a second corotating mass (mass$_{2\_2}$) 536 controllably driven about the second circular force generator axis 530" with a second rotating mass controllable rotating imbalance phase $\Phi_{2\_2}$, with the imbalance phase $\Phi_{2\_1}$ and the imbalance phase $\Phi_{2\_2}$ controlled in reference to the rotating reference signal, with the second nonrotating vehicle body circular force generator 530 oriented relative to the first nonrotating vehicle body circular force generator 530 wherein the second circular force generator axis 530" is nonparallel with the first circular force generator axis 530'. In preferred embodiments the axes 530' and 530" are oriented orthogonally. Preferably m$\geq$3, and a third nonrotating vehicle body circular force generator 530 including a first rotating mass (mass$_{3\_1}$) 534 controllably driven about a third circular force generator axis 530''' with a first rotating mass controllable rotating imbalance phase $\Phi_{3\_1}$ and a second corotating mass (mass$_{3\_2}$) 536 controllably driven about the third circular force generator axis 530''' with a second rotating mass controllable rotating imbalance phase $\Phi_{3\_2}$, with the imbalance phase $\Phi_{3\_1}$ and the imbalance phase $\Phi_{3\_2}$ controlled in reference to the rotating reference signal, the third circular force generator axis oriented relative to the second circular force generator axis and the first circular force generator axis.

Preferably the system provides for the placement of nonrotating vehicle body circular force generators 530 proximate the vehicle ceiling and floor. Preferably the vehicle nonrotating vehicle body 524 includes a vehicle ceiling 544 and a distal vehicle floor 546, the distal vehicle floor below 546 the vehicle ceiling 544 under normal parking, use and flight of the vehicle in the presence of gravity. Preferably the system includes n nonrotating vehicle body vibration sensors 554 and m nonrotating vehicle body circular force generators 530 with n>m. The vehicle vibration control system controller 411 calculates a rotating reference signal from the vehicle rotating machine member data correlating to the relative rotation of the vehicle rotating machine member 522 rotating relative to the nonrotating vehicle body 524. The first nonrotating vehicle body circular force generator 530 includes a first rotating mass (mass$_{1\_1}$) 534 controllably driven about a first rotating mass axis 534' with a first rotating mass controllable rotating imbalance phase $\Phi_{1\_1}$ and a second corotating mass (mass$_{1\_2}$) 536 controllably driven about a second rotating mass axis 536' with a second rotating mass controllable rotating imbalance phase $\Phi_{1\_2}$, the imbalance phase $\Phi_{1\_1}$ and the imbalance phase $\Phi_{1\_2}$ controlled in reference to the rotating reference signal, the first nonrotating vehicle body circular force generator 530 preferably provided for mounting to the vehicle body 524 proximate the vehicle ceiling 544. The vehicle m$^{th}$ nonrotating vehicle body circular force generator 530 including a first rotating mass (mass$_{m\_1}$) 534 controllably driven about a first rotating mass axis 534' with a first rotating mass controllable rotating imbalance phase $\Phi_{m\_1}$ and a second corotating mass (mass$_{m\_2}$) 536 controllably driven about a second rotating mass axis 536' with a second rotating mass controllable rotating imbalance phase $\Phi_{m\_2}$, the imbalance phase $\Phi_{m\_1}$ and the imbalance phase $\Phi_{m\_2}$ controlled in reference to the rotating reference signal, the m$^{th}$ nonrotating vehicle body circular force generator 530 preferably provided for mounting to the vehicle body 524 proximate the vehicle floor 546. Preferably a plurality of circular force generators 530 are provided for mounting to the vehicle body frame 524 proximate the floor 546, and preferably under the floor 546, and preferably proximate the vehicle nose, and preferably proximate the vehicle tail. Preferably a plurality of circular force generators 530 are preferably provided for mounting to the vehicle body frame 524 proximate the ceiling 544, and preferably above the ceiling 544, preferably proximate the vehicle tail, preferably to a vehicle tailcone frame.

Preferably the system includes controlling vehicle transmission 526 vibrations. Preferably the vehicle vibration control system controller 411 generates a rotating reference signal from the vehicle rotating machine member data correlating to the relative rotation of the vehicle rotating machine member 522 rotating relative to the nonrotating vehicle body 524. The first nonrotating vehicle body circular force generator 530 including a first rotating mass (mass$_{1\_1}$) 534 controllably driven about a first rotating mass axis 534' with a first rotating mass controllable rotating imbalance phase $\Phi_{1\_1}$ and a second corotating mass (mass$_{1\_2}$) 536 controllably driven about a second rotating mass axis 536' with a second rotating mass controllable rotating imbalance phase $\Phi_{1\_2}$, the imbalance phase $\Phi_{1\_1}$ and the imbalance phase $\Phi_{1\_2}$ controlled in reference to the rotating reference signal, the first nonrotating vehicle body circular force generator 530 mounted to the vehicle transmission 526. In an embodiment a plurality of nonrotating vehicle body circular force generators 530 are mounted to the transmission 526, and preferably the transmission is above the floor 546 and ceiling 544. Preferably the nonrotating vehicle body circular force generators 530 are mounted to the vehicle transmissions 526, preferably with the circular force generator axis 530' oriented relative to the rotation axis of the rotating machine member 522, most preferably with the circular force generator axis 530' oriented parallel with the rotating machine member rotor hub axis of rotation.

In an embodiment the invention includes a method of controlling helicopter vibrations. The method includes providing a nonrotating helicopter body below a rotating helicopter rotor member. The method includes providing a vibration control system controller. The method includes providing a rotating helicopter rotor member sensor for inputting rotating member data correlating to a relative rotation of the rotating member rotating relative to the nonrotating body into the vibration control system controller. The method includes providing at least a first nonrotating body vibration sensor, the at least first nonrotating vehicle body vibration sensor inputting at least first nonrotating body vibration sensor data correlating to vehicle vibrations into the vibration control system controller. The method includes providing at least a first nonrotating vehicle body circular force generator. The method includes coupling the at least first nonrotating vehicle body circular force generator to the nonrotating helicopter body. The method includes controlling with the controller the coupled at least first nonrotating vehicle body circular force generator to produce a rotating force upon the nonrotating helicopter body with a controllable rotating force magnitude and a controllable rotating force phase, the controllable rotating force magnitude controlled from a minimal force magnitude up to a maximum force magnitude, and with the controllable rotating force phase controlled in reference to the rotating member sensor data correlating to the relative rotation of the rotating member rotating relative to the nonrotating body with the vibration sensed by the at least first nonrotating vehicle body vibration sensor reduced by the controller.

The method of controlling helicopter vibrations includesproviding a nonrotating helicopter body 524 below a rotating helicopter rotor member 522, preferably the helicopter rotating rotary wing hub. The method preferably includes providing a vehicle vibration control system controller 411, preferably with control system subsystems communicating within the vibration control system 409. The method preferably includesproviding a vehicle rotating helicopter rotor member sensor 552, for inputting vehicle rotating member data correlating to a relative rotation of the vehicle rotating member rotating relative to the nonrotating vehicle body (preferably a tach input) into the vibration control system controller 411. The method preferably includes providing at least a first nonrotating body vibration sensor 554, the at least first nonrotating vehicle body vibration sensor inputting at least first nonrotating body vibration sensor data correlating to vibrations into the vibration control system controller 411. The method preferably includes providing at least a first nonrotating vehicle body circular force generator 530. The method preferably includes coupling the at least first nonrotating vehicle body circular force generator 530 to the nonrotating helicopter body 524. The method preferably includes controlling with the controller 411 the coupled at least first nonrotating vehicle body circular force generator 530 to produce a rotating force upon the nonrotating helicopter body 524 with a controllable rotating force magnitude and a controllable rotating force phase, the controllable rotating force magnitude controlled from a minimal force magnitude up to a maximum force magnitude (preferably 0 magnitude force when masses 180° separation opposed position and maximum force magnitude when masses 0° separation), and with the controllable rotating force phase controlled in reference to the rotating member sensor data correlating to the relative rotation of the rotating member 522 rotating relative to the nonrotating body 524 with the vibration sensed by the at least first nonrotating vehicle body vibration sensor 554 reduced by the controller 411.

The method preferably includes providing then nonrotating vehicle body vibration sensors 554 and m nonrotating vehicle body circular force generators 530 with n>m.

The method preferably includes the controlling of the rotating force to rotate at a harmonic of the rotating machine member rotating speed, preferably with the system/method producing circular forces while avoiding the calculation and generation of linear forces.

The method preferably includes generating a rotating reference signal from the vehicle rotating machine member data correlating to the relative rotation of the vehicle rotating machine member 522 rotating relative to the nonrotating vehicle body 524.

The method preferably includes calculating, with the controller, in reference to a rotating reference signal, the rotating force with a real part α and an imaginary part β. Preferably the method avoids and inhibits calculating linear forces for controlling the vibrations, preferably with the vibe control subsystem calculating real parts $α_m$ and imaginary parts $β_m$ in generating circular force command signals which command/describe desired rotating force vectors, such circular force command signals $α_m$ $β_m$ are preferably sent to the rotor phase compute subsystem which in turn preferably computes mass phase signals, which are preferably sent to motor control/motor drive subsystem which generates motor drive signals that drive the masses around their circular paths, preferably motor drive signals that drive the masses to generate the circular forces with the motor drive signals driving the motors 538, 540 of the circular force generator 530.

The method preferably includes providing the at least first nonrotating vehicle body circular force generator 530 with at least a first rotating mass ($mass_{1\_1}$) 534 controllably driven about a first rotating mass axis 534' with a first rotating mass controllable rotating imbalance phase $Φ_{1\_1}$ and at least a second corotating mass ($mass_{1\_2}$) 536 controllably driven about a second rotating mass axis 536' with a second rotating mass controllable rotating imbalance phase $Φ_{1\_2}$.

The method preferably includes providing the n nonrotating vehicle body vibration sensors 554 and m nonrotating vehicle body circular force generators 530 with n>m, with the vehicle vibration control system controller 411 generating a rotating reference signal from the vehicle rotating machine member data correlating to the relative rotation of the vehicle rotating machine member rotating relative to the nonrotating vehicle body. The first nonrotating vehicle body circular force generator 530 including first rotating mass ($mass_{1\_1}$) 534 controllably driven about a first rotating mass axis 534' with a first rotating mass controllable rotating imbalance phase $Φ_{1\_1}$ and a second corotating mass ($mass_{1\_2}$) 536 controllably driven about a second rotating mass axis 536' with a second rotating mass controllable rotating imbalance phase $Φ_{1\_2}$, the imbalance phase $Φ_{1\_1}$ and the imbalance phase $Φ_{1\_2}$ controlled in reference to the rotating reference signal. The $m^{th}$ nonrotating vehicle body circular force generator 530 including a first rotating mass ($mass_{m\_1}$) 534 controllably driven about a first rotating mass axis 534' with a first rotating mass controllable rotating imbalance phase $Φ_{m\_1}$ and a second corotating mass ($mass_{m\_2}$) 536 controllably driven about a second rotating mass axis 536' with a second rotating mass controllable rotating imbalance phase $Φ_{m\_2}$, the imbalance phase $Φ_{m\_1}$ and the imbalance phase $Φ_{m\_2}$ controlled in reference to the rotating reference signal.

The method preferably includes providing the first nonrotating vehicle body circular force generator 530 which includes the first rotating mass ($mass_{1\_1}$) 534 with a first rotating mass controllable rotating imbalance phase $Φ_{1\_1}$ and the second corotating mass ($mass_{1\_2}$) 536 with a second rotating mass controllable rotating imbalance phase $Φ_{1\_2}$. Preferably the the first rotating mass ($mass_{1\_1}$) 534 is driven with the first motor 538 and the second corotating mass ($mass_{1\_2}$) 536 is driven with the second motor 540.

In an embodiment, preferably the circular force generator 530 which includes the first rotating mass ($mass_{1\_1}$) 534 with a first rotating mass controllable rotating imbalance phase $Φ_{1\_1}$ and the second corotating mass ($mass_{1\_2}$) 536 with a second rotating mass controllable rotating imbalance phase $Φ_{1\_2}$, with a detent 576 linking between the first rotating mass ($mass_{m\_1}$) and the second corotating mass ($mass_{m\_2}$), and a motor for driving the first rotating mass ($mass_{m\_1}$), wherein the first rotating mass ($mass_{m\_1}$) comprises a master rotating mass ($mass_{m\_1}$) with a master rotating mass controllable rotating imbalance phase $Φ_{1\_1}$, and the second corotating mass ($mass_{m\_2}$) comprises a slave corotating mass ($mass_{m\_2}$) with a slave rotating mass controllable rotating imbalance phase $Φ_{1\_2}$ with the detent controlling the slave rotating mass controllable rotating imbalance phase $Φ_{1\_2}$ relative to the master rotating mass controllable rotating imbalance phase $Φ_{1\_1}$.

Preferably the method includes providing the n nonrotating vehicle body vibration sensors 554 and m nonrotating vehicle body circular force generators 530, with m≧2 and n>m, with the vehicle vibration control system controller generating a rotating reference signal from the vehicle rotating machine member data correlating to the relative rotation of the vehicle rotating machine member rotating relative to the nonrotating vehicle body, with the first nonrotating vehicle body circular force generator 530 including a first rotating mass ($mass_{1\_1}$) 534 controllably driven about a first circular force generator axis 530' with a first rotating mass controllable rotating imbalance phase $Φ_{1\_1}$ and a second corotating mass ($mass_{1\_2}$) 536 controllably driven about the first circular force generator axis 530' with a second rotating mass controllable rotating imbalance phase $Φ_{1\_2}$, with the imbalance phase $Φ_{1\_1}$ and the imbalance phase $Φ_{1\_2}$ controlled in reference to the rotating reference signal. Preferably a second nonrotating vehicle body circular force generator 530 is provided including a first rotating mass ($mass_{2\_1}$) 534 controllably driven about a second circular force generator axis 530" with a first rotating mass controllable rotating imbalance phase $Φ_{2\_1}$ and a second corotating mass ($mass_{2\_2}$) 536 controllably driven about the second circular force generator axis 530" with a second rotating mass controllable rotating imbalance phase $Φ_{2\_2}$, with the imbalance phase $Φ_{2\_1}$ and the imbalance phase $Φ_{2\_2}$ controlled in reference to the rotating reference signal, with the second nonrotating vehicle body circular force generator 530 oriented relative to the first nonrotating vehicle body circular force generator 530 wherein the second circular force generator axis 530" is nonparallel with the first circular force generator axis 530'. In embodiments the axes are preferably oriented orthogonally. Preferably m≧3, and a third nonrotating vehicle body circular force generator 530 is provided including a first rotating mass ($mass_{3\_1}$) 534 controllably driven about a third circular force generator axis 530''' with a first rotating mass controllable rotating imbalance phase $Φ_{3\_1}$ and a second corotating mass ($mass_{3\_2}$) 536 controllably driven about the third circular force generator axis 530''' with a second rotating mass controllable rotating imbalance phase $Φ_{3\_2}$, with the imbalance phase $Φ_{3\_1}$ and the imbalance phase $Φ_{3\_2}$ controlled in reference to the rotating reference signal, the third circular force generator axis oriented relative to the second circular force generator axis and the first circular force generator axis.

Preferably the method includes mounting the circular force generators proximate the vehicle ceiling 544 and the floor 546. Preferably the method mounts the nonrotating vehicle body circular force generators 530 proximate the vehicle ceiling and floor. Preferably the vehicle nonrotating vehicle body 524 includes a vehicle ceiling 544 and a distal vehicle floor 546, the distal vehicle floor below 546 the vehicle ceiling 544 under normal parking, use and flight of the vehicle in the presence of gravity. Preferably n nonrotating vehicle body vibration sensors 554 and m nonrotating vehicle body circular force generators 530 are provided with n>m. The controller 411 preferably calculates a rotating reference signal from the vehicle rotating machine member data correlating to the relative rotation of the vehicle rotating machine member 522 rotating relative to the nonrotating vehicle body 524. The first nonrotating vehicle body circular force generator 530 includes a first rotating mass $(mass_{1\_1})$ 534 controllably driven about a first rotating mass axis 534' with a first rotating mass controllable rotating imbalance phase $\Phi_{1\_1}$ and a second corotating mass $(mass_{1\_2})$ 536 controllably driven about a second rotating mass axis 536' with a second rotating mass controllable rotating imbalance phase $\Phi_{1\_2}$, the imbalance phase $\Phi_{1\_1}$ and the imbalance phase $\Phi_{1\_2}$ controlled in reference to the rotating reference signal, the first nonrotating vehicle body circular force generator 530 preferably mounted to the vehicle body 524 proximate the vehicle ceiling 544. The vehicle $m^{th}$ nonrotating vehicle body circular force generator 530 including a first rotating mass $(mass_{m\_1})$ 534 controllably driven about a first rotating mass axis 534' with a first rotating mass controllable rotating imbalance phase $\Phi_{m\_1}$ and a second corotating mass $(mass_{m\_2})$ 536 controllably driven about a second rotating mass axis 536' with a second rotating mass controllable rotating imbalance phase $\Phi_{m\_2}$, the imbalance phase $\Phi_{m\_1}$ and the imbalance phase $\Phi_{m\_2}$ controlled in reference to the rotating reference signal, the $m^{th}$ nonrotating vehicle body circular force generator 530 mounted to the vehicle body 524 proximate the vehicle floor 546. Preferably a plurality of circular force generators 530 are mounted to the vehicle body frame 524 proximate the floor 546, and preferably under the floor 546, and preferably proximate the vehicle nose, and preferably proximate the vehicle tail. Preferably a plurality of circular force generators 530 are mounted to the vehicle body frame 524 proximate the ceiling 544, and preferably above the ceiling 544, preferably proximate the vehicle tail, preferably to a vehicle tailcone frame.

Preferably the method includes controlling vehicle transmission 526 vibrations. Preferably the vehicle vibration control system controller 411 generates a rotating reference signal from the vehicle rotating machine member data correlating to the relative rotation of the vehicle rotating machine member 522 rotating relative to the nonrotating vehicle body 524. The first nonrotating vehicle body circular force generator 530 including a first rotating mass $(mass_{1\_1})$ 534 controllably driven about a first rotating mass axis 534' with a first rotating mass controllable rotating imbalance phase $\Phi_{1\_1}$ and a second corotating mass $(mass_{1\_2})$ 536 controllably driven about a second rotating mass axis 536' with a second rotating mass controllable rotating imbalance phase $\Phi_{1\_2}$, the imbalance phase $\Phi_{1\_1}$ and the imbalance phase $\Phi_{1\_2}$ controlled in reference to the rotating reference signal, method including mounting the first nonrotating vehicle body circular force generator 530 to the vehicle transmission 526. In an embodiment a plurality of nonrotating vehicle body circular force generators 530 are mounted to the transmission 526, and preferably the transmission is above the floor 546 and ceiling 544. Preferably the nonrotating vehicle body circular force generators 530 are mounted to the vehicle transmissions 526, preferably with the circular force generator axis 530' oriented relative to the rotation axis of the rotating machine member 522, most preferably with the circular force generator axis 530' oriented parallel with the rotating machine member rotor hub axis of rotation.

In an embodiment the invention includes a method of controlling vibrations. The method includes providing a nonrotating structure body having a rotating machine member. The method includes providing a vibration control system controller. The method includes providing a rotating machine member sensor, for inputting rotating member data correlating to a relative rotation of the rotating member rotating relative to the nonrotating body into the vibration control system controller. The method includes providing at least a first nonrotating body vibration sensor, the at least first nonrotating body vibration sensor inputting at least first nonrotating body vibration sensor data correlating to vibrations into the vibration control system controller. The method includes providing at least a first nonrotating body circular force generator. The method includes coupling the at least first nonrotating vehicle body circular force generator to the nonrotating structure body. The method includes controlling with the controller the coupled at least first nonrotating body circular force generator to produce a rotating force with a controllable rotating force magnitude and a controllable rotating force phase, the controllable rotating force magnitude controlled from a minimal force magnitude up to a maximum force magnitude, and with the controllable rotating force phase controlled relative to the rotating member sensor data correlating to the relative rotation of the rotating member rotating relative to the nonrotating body with the vibration sensed by the at least first nonrotating vehicle body vibration sensor reduced by the controller.

The method of controlling vibrations, includes providing nonrotating structure body 524 having a rotating machine member 522. The method includes providing vibration control system controller 411 with a vibration control system processor, a computer with inputs and outputs, to control the control system preferably with communicating subsystems. The method includesproviding the rotating machine member sensor 552 for inputting rotating member data correlating to a relative rotation of the vehicle rotating member rotating relative to the nonrotating vehicle body (preferably a tach input) into the vibration control system controller 411. The method includes providing the nonrotating body vibration sensors 554, the first nonrotating body vibration sensors 554 inputting at vibration sensor data correlating to vehicle vibrations into the vehicle vibration control system controller 411. The method includes providing at least a first nonrotating vehicle body circular force generator 530. The method includes coupling the nonrotating vehicle body circular force generator 530 to the nonrotating structure body 524. The method includes controlling with the controller 411 the coupled at least first nonrotating body circular force generators 530 to produce rotating forces with controllable rotating force magnitude and controllable rotating force phase, the controllable rotating force magnitude controlled from a minimal force magnitude up to a maximum force magnitude (0 magnitude force when masses 180° separation opposed position, maximum force magnitude when masses 0° separation), and with the controllable rotating force phase controlled relative to the rotating member sensor data correlating to the relative rotation of the rotating member rotating relative to the nonrotating body (tach input) with the vibration sensed by the at least first nonrotating vehicle body vibration sensor reduced by the controller 411.

The method includes providing then nonrotating vehicle body vibration sensors and m nonrotating vehicle body circular force generators wherein n>m.

The method includes controlling the rotating force to rotate at a harmonic of the rotating machine member rotating speed.

The method includes generating a rotating reference signal from the vehicle rotating machine member data correlating to the relative rotation of the vehicle rotating machine member rotating relative to the nonrotating vehicle body. The method preferably includes calculating in reference to a rotating reference signal the rotating force with a real part $\alpha$ and an imaginary part $\beta$. Preferably the method avoids and inhibits calculating linear forces for controlling vibrations, preferably with vibe control subsystem, preferably within the controller 411, calculating real parts $\alpha_m$ and imaginary parts $\beta_m$ in generating circular force command signals which command/describe desired rotating force vectors, such circular force command signals $\alpha_m$ $\beta_m$ are preferably sent to the rotor phase compute subsystem which in turn preferably computes mass phase signals, which are preferably sent to motor control/motor drive subsystem which generates motor drive signals that drive the masses around their circular paths, preferably motor drive signals that drive the motors 538, 540 that drive the masses 534, 536 to generate the circular forces.

Preferably providing the at least first nonrotating vehicle body circular force generators 530 includes providing the at least first rotating mass (mass$_{1\_1}$) 534 controllably driven about a first rotating mass axis 534' with a first rotating mass controllable rotating imbalance phase $\Phi_{1\_1}$ and the at least second corotating mass (mass$_{1\_2}$) 536 controllably driven about second rotating mass axis 536' with a second rotating mass controllable rotating imbalance phase $\Phi_{1\_2}$.

Preferably n nonrotating vehicle body vibration sensors 554 and m nonrotating vehicle body circular force generators 530 with n>m are provided, the first nonrotating vehicle body circular force generator 530 including first rotating mass (mass$_{1\_1}$) 534 controllably driven about a first rotating mass axis 534' with a first rotating mass controllable rotating imbalance phase $\Phi_{1\_1}$ and second corotating mass (mass$_{1\_2}$) 536 controllably driven about a second rotating mass axis 536' with a second rotating mass controllable rotating imbalance phase $\Phi_{1\_2}$, the imbalance phase $\Phi_{1\_1}$ and the imbalance phase $\Phi_{1\_2}$ controlled in reference to a rotating reference signal, and the m$^{th}$ nonrotating vehicle body circular force generator 530 including first rotating mass (mass$_{m\_1}$) 534 controllably driven about a first rotating mass axis 534' with a first rotating mass controllable rotating imbalance phase $\Phi_{m\_1}$ and a second corotating mass (mass$_{m\_2}$) 536 controllably driven about a second rotating mass axis 536' with a second rotating mass controllable rotating imbalance phase $\Phi_{m\_2}$, the imbalance phase $\Phi_{m\_1}$ and the imbalance phase $\Phi_{m\_2}$ controlled in reference to the rotating reference signal.

Preferably the method includes providing nonrotating vehicle body circular force generators 530 with the first rotating mass (mass$_{1\_1}$) 534 with a first rotating mass controllable rotating imbalance phase $\Phi_{1\_1}$ and a second corotating mass (mass$_{1\_2}$) 536 with a second rotating mass controllable rotating imbalance phase $\Phi_{1\_2}$. Preferably the method includes providing the motor 538 with the first rotating mass (mass$_{1\_1}$) 534 driven with the first motor 538 and providing the second motor 540 with the second corotating mass (mass$_{1\_2}$) 536 driven with the second motor 540.

Preferably the method includes providing nonrotating vehicle body circular force generators 530 with the first rotating mass (mass$_{1\_1}$) 534 with a first rotating mass controllable rotating imbalance phase $\Phi_{1\_1}$ and a second corotating mass (mass$_{1\_2}$) 536 with a second rotating mass controllable rotating imbalance phase $\Phi_{1\_2}$ with a detent 576 linking between the first rotating mass (mass$_{m\_1}$) and the second corotating mass (mass$_{m\_2}$), and a motor for driving the first rotating mass (mass$_{m\_1}$), wherein the first rotating mass (mass$_{m\_1}$) comprises a master rotating mass (mass$_{m\_1}$) with a master rotating mass controllable rotating imbalance phase $\Phi_{1\_1}$, and the second corotating mass (mass$_{m\_2}$) comprises a slave corotating mass (mass$_{m\_2}$) with a slave rotating mass controllable rotating imbalance phase $\Phi_{1\_2}$ with the detent controlling the slave rotating mass controllable rotating imbalance phase $\Phi_{1\_2}$ relative to the master rotating mass controllable rotating imbalance phase $\Phi_{1\_1}$ with the one motor driving both, preferably magnetically detented.

Preferably the method includes providing the n nonrotating vehicle body vibration sensors 554 and m nonrotating vehicle body circular force generators 530, with m≧2 and n>m, with the vehicle vibration control system controller generating a rotating reference signal from the vehicle rotating machine member data correlating to the relative rotation of the vehicle rotating machine member rotating relative to the nonrotating vehicle body, with the first nonrotating vehicle body circular force generator 530 including a first rotating mass (mass$_{1\_1}$) 534 controllably driven about a first circular force generator axis 530' with a first rotating mass controllable rotating imbalance phase $\Phi_{1\_1}$ and a second corotating mass (mass$_{1\_2}$) 536 controllably driven about the first circular force generator axis 530' with a second rotating mass controllable rotating imbalance phase $\Phi_{1\_2}$, with the imbalance phase $\Phi_{1\_1}$ and the imbalance phase $\Phi_{1\_2}$ controlled in reference to the rotating reference signal. Preferably a second nonrotating vehicle body circular force generator 530 is provided including a first rotating mass (mass$_{2\_1}$) 534 controllably driven about a second circular force generator axis 530" with a first rotating mass controllable rotating imbalance phase $\Phi_{2\_1}$ and a second corotating mass (mass$_{2\_2}$) 536 controllably driven about the second circular force generator axis 530" with a second rotating mass controllable rotating imbalance phase $\Phi_{2\_2}$, with the imbalance phase $\Phi_{2\_1}$ and the imbalance phase $\Phi_{2\_2}$ controlled in reference to the rotating reference signal, with the second nonrotating vehicle body circular force generator 530 oriented relative to the first nonrotating vehicle body circular force generator 530 wherein the second circular force generator axis 530" is nonparallel with the first circular force generator axis 530'. In embodiments the axes are preferably oriented orthogonally. Preferably m≧3, and a third nonrotating vehicle body circular force generator 530 is provided including a first rotating mass (mass$_{3\_1}$) 534 controllably driven about a third circular force generator axis 530''' with a first rotating mass controllable rotating imbalance phase $\Phi_{3\_1}$ and a second corotating mass (mass$_{3\_2}$) 536 controllably driven about the third circular force generator axis 530''' with a second rotating mass controllable rotating imbalance phase $\Phi_{3\_2}$, with the imbalance phase $\Phi_{3\_1}$ and the imbalance phase $\Phi_{3\_2}$ controlled in reference to the rotating reference signal, the third circular force generator axis oriented relative to the second circular force generator axis and the first circular force generator axis.

Preferably the method includes mounting the circular force generators proximate the vehicle ceiling 544 and the floor 546. Preferably the method mounts the nonrotating vehicle body circular force generators 530 proximate the vehicle ceiling and floor. Preferably the vehicle nonrotating vehicle body 524 includes a vehicle ceiling 544 and a distal vehicle floor 546, the distal vehicle floor below 546 the vehicle ceiling 544 under normal parking, use and flight of the vehicle in the presence of gravity. Preferably n nonrotating vehicle body vibration sensors 554 and m nonrotating vehicle body circular force generators 530 are provided with n>m. The controller 411 preferably calculates a rotating reference signal from the vehicle rotating machine member data correlating to the relative rotation of the vehicle rotating machine member 522 rotating relative to the nonrotating vehicle body 524. The first nonrotating vehicle body circular force generator 530 includes a first rotating mass (mass$_{1\_1}$) 534 controllably driven about a first rotating mass axis 534' with a first rotating mass controllable rotating imbalance phase $\Phi_{1\_1}$ and a second corotating mass (mass$_{1\_2}$) 536 controllably driven about a second rotating mass axis 536' with a second rotating mass controllable rotating imbalance phase $\Phi_{1\_2}$, the imbalance phase $\Phi_{1\_1}$ and the imbalance phase $\Phi_{1\_2}$ controlled in reference to the rotating reference signal, the first nonrotating vehicle body circular force generator 530 preferably mounted to the vehicle body 524 proximate the vehicle ceiling 544. The vehicle $m^{th}$ nonrotating vehicle body circular force generator 530 including a first rotating mass (mass$_{m\_1}$) 534 controllably driven about a first rotating mass axis 534' with a first rotating mass controllable rotating imbalance phase $\Phi_{m\_1}$ and a second corotating mass (mass$_{m\_2}$) 536 controllably driven about a second rotating mass axis 536' with a second rotating mass controllable rotating imbalance phase $\Phi_{m\_2}$, the imbalance phase $\Phi_{m\_1}$ and the imbalance phase $\Phi_{m\_2}$ controlled in reference to the rotating reference signal, the $m^{th}$ nonrotating vehicle body circular force generator 530 mounted to the vehicle body 524 proximate the vehicle floor 546. Preferably a plurality of circular force generators 530 are mounted to the vehicle body frame 524 proximate the floor 546, and preferably under the floor 546, and preferably proximate the vehicle nose, and preferably proximate the vehicle tail. Preferably a plurality of circular force generators 530 are mounted to the vehicle body frame 524 proximate the ceiling 544, and preferably above the ceiling 544, preferably proximate the vehicle tail, preferably to a vehicle tailcone frame.

Preferably the method includes controlling vehicle transmission 526 vibrations. Preferably the vehicle vibration control system controller 411 generates a rotating reference signal from the vehicle rotating machine member data correlating to the relative rotation of the vehicle rotating machine member 522 rotating relative to the nonrotating vehicle body 524. The first nonrotating vehicle body circular force generator 530 including a first rotating mass (mass$_{1\_1}$) 534 controllably driven about a first rotating mass axis 534' with a first rotating mass controllable rotating imbalance phase $\Phi_{1\_1}$ and a second corotating mass (mass$_{1\_2}$) 536 controllably driven about a second rotating mass axis 536' with a second rotating mass controllable rotating imbalance phase $\Phi_{1\_2}$, the imbalance phase $\Phi_{1\_1}$ and the imbalance phase $\Phi_{1\_2}$ controlled in reference to the rotating reference signal, method including mounting the first nonrotating vehicle body circular force generator 530 to the vehicle transmission 526. In an embodiment a plurality of nonrotating vehicle body circular force generators 530 are mounted to the transmission 526, and preferably the transmission is above the floor 546 and ceiling 544. Preferably the nonrotating vehicle body circular force generators 530 are mounted to the vehicle transmissions 526, preferably with the circular force generator axis 530' oriented relative to the rotation axis of the rotating machine member 522, most preferably with the circular force generator axis 530' oriented parallel with the rotating machine member rotor hub axis of rotation.

In an embodiment the invention includes a computer program product for a vibration control system. The computer program product comprising a computer readable medium. The computer program product comprising program instructions to monitor rotating machine member data correlating to a relative rotation of a rotating machine member rotating relative to a nonrotating body structure. The computer program product comprising program instructions to monitor nonrotating body structure vibration sensor data correlating to nonrotating body structure vibrations. The computer program product comprising program instructions to control a circular force generator mounted to the nonrotating body structure to control the circular force generator to output into the nonrotating body structure a rotating force with a controllable rotating force magnitude controlled from a minimal force magnitude up to a maximum force magnitude and a controllable rotating force phase controlled in reference to the monitored rotating machine member data to minimize nonrotating body structure vibrations.

Preferably the vibration control system computer program product includes a computer readable medium and first program instructions to monitor rotating machine member data correlating to a relative rotation of the rotating machine member 522 rotating relative to a nonrotating body structure 524. Preferably the vibration control system computer program product includes second program instructions to monitor nonrotating body structure vibration sensor data correlating to nonrotating body structure vibrations. Preferably the vibration control system computer program product includes third program instructions to control a circular force generator 530 mounted to the nonrotating body structure 524 to control the circular force generator 530 to output into the nonrotating body structure 524 a rotating force with a controllable rotating force magnitude controlled from a minimal force magnitude up to a maximum force magnitude and a controllable rotating force phase controlled in reference to the monitored rotating machine member data to minimize nonrotating body structure vibrations.

Preferably the second program instructions to monitor nonrotating body structure vibration sensor data correlating to nonrotating body structure vibrations, include instructions to monitor a plurality of nonrotating vehicle body vibration sensors's outputs from a plurality of nonrotating vehicle body vibration sensors 554 distributed about the nonrotating body structure 524.

Preferably the third program instructions to control the circular force generator 530 include rotating the rotating force at a harmonic vibration disturbance frequency which is a harmonic of the rotating machine member rotating speed.

Preferably the third program instructions to control the circular force generator 530 include instructions to calculate in reference to the rotating machine member 522 the rotating force with a real part $\alpha$ and an imaginary part $\beta$.

Preferably the program instructions avoid and inhibit calculating linear forces for controlling vibration.

Preferably vibe control subsystem includes instructions for calculating real parts $\alpha_m$ and imaginary parts $\beta_m$ in generating circular force command signals which command/describe desired rotating force vectors, and instructions for sending such circular force command signals $\alpha_m$ $\beta_m$ to rotor phase compute subsystem which in turn preferably includes instructions for computing mass phase signals, which are preferably includes instructions for sending such mass phase signals to the motor control/motor drive subsystem which generates motor drive signals that drive the masses around their circular paths, preferably motor drive signals that drive the masses to generate the circular forces.

Preferably the system includes instructions for rotating the rotating force at a harmonic vibration disturbance frequency which is a harmonic of the rotating machine member rotating speed.

Preferably the system includes instructions for controling rotation of the first rotor mass 534 and a rotation of the second rotor mass 536.

In an embodiment the invention includes a computer system for reducing vibrations in a vehicle with a nonrotating body structure and a rotating machine member rotating relative to the nonrotating body structure. The computer system comprising computer media with computer program instructions including program instructions to monitor rotating machine member data correlating to the relative rotation of the rotating machine member rotating relative to the nonrotating body structure. The computer system comprising computer media with computer program instructions including program instructions to monitor nonrotating body structure vibration sensor data correlating to nonrotating body structure vibrations measured by a plurality of nonrotating vehicle body vibration sensors. The computer system comprising computer media with computer program instructions including program instructions to control a circular force generator mounted to the nonrotating body structure to control the circular force generator to produce a rotating force with a controllable rotating force magnitude controlled from a minimal force magnitude up to a maximum force magnitude and a controllable rotating force phase controlled in reference to the monitored rotating machine member data to minimize nonrotating body structure vibrations measured by the plurality of nonrotating vehicle body vibration sensors.

Preferably the computer system for reducing vibrations in the vehicle 520 with nonrotating body structure 524 and the rotating machine member 522 rotating relative to the nonrotating body structure 524 includes computer media with computer program instructions including first program instructions to monitor rotating machine member data correlating to the relative rotation of the rotating machine member 522 rotating relative to the nonrotating body structure 524. The system includes second program instructions to monitor nonrotafing body structure vibration sensor data correlating to nonrotating body structure vibrations measured by a plurality of nonrotating vehicle body vibration sensors 554. The system third program instructions to control a circular force generator 530 mounted to the nonrotating body structure 524 to control the circular force generator 530 to produce a rotating force with a controllable rotating force magnitude controlled from a minimal force magnitude up to a maximum force magnitude and a controllable rotating force phase controlled in reference to the monitored rotating machine member data to minimize nonrotating body structure vibrations measured by the plurality of nonrotating vehicle body vibration sensors 554.

Preferably the system includes program instructions to rotate the rotating force at a harmonic vibration disturbance frequency which is a harmonic of the rotating machine member rotating speed.

Preferably the system includes program instructions to control the circular force generator 530 and to calculates in reference to the rotating machine member 522 the rotating force with a real part $\alpha$ and an imaginary part $\beta$.

Preferably the system includes program instructions to control the circular force generator 530 and to generate a plurality of circular force command signals, preferably with the vibe control subsystem generating circular force command signals which command/describe desired rotating force vectors, the circular force command signals $\alpha_m$ $\beta_m$ are preferably sent to rotor phase compute subsystem.

Preferably the system includes program instructions to control the circular force generator 530 and to generate a plurality of mass phase signals ($\Phi_{m\_1}$, $\Phi_{m\_2}$, rotating mass controllable rotating imbalance phase signals $\Phi_{m\_1}$ $\Phi_{m\_2}$, and imbalance phase $\Phi_{m\_1}$ and imbalance phase $\Phi_{m\_2}$ controlled in reference to rotating machine member reference signal, preferably rotor phase compute subsystem receives circular force command signals $\alpha_m$ $\beta_m$, and generates the mass phase signals $\Phi_{m\_1}$, $\Phi_{m\_2}$ for the two corotating mass imbalances 534, 536).

Preferably the system includes program instructions to control the circular force generator 530 and to generate a plurality of motor drive signals to drive a first mass 534 and a second mass 536 (rotating mass controllable rotating imbalance phase signals $\Phi_{m\_1}$ $\Phi_{m\_2}$ preferably received into motor control/motor drive subsystem from rotor phase compute subsystem receives, with motor drive signals driving the circular force generator mass imbalances 534, 536 to controllably rotate to produce the rotating force).

In an embodiment the invention includes a computer data signal. The computer data signal transmitted in a vibration reducing computer system for a vehicle with a nonrotating body structure and a rotating machine member rotating relative to the nonrotating body structure. The computer data signal comprising a circular force command signal including information for producing a rotating force with a controllable rotating force magnitude controlled from a minimal force magnitude up to a maximum force magnitude into the nonrotating body structure and a controllable rotating force phase controlled in reference to the rotating machine member to minimize nonrotating body structure vibrations in the nonrotating body structure.

Preferably the computer data signals are transmitted in the vibration reducing computer system 409 for the vehicle 520 with the nonrotating body structure 524 and rotating machine member 522 rotating relative to the nonrotating body structure 524. Preferably the computer data signal includes a circular force command signal with information for producing a rotating force with a controllable rotating force magnitude controlled from a minimal force magnitude up to a maximum force magnitude into the nonrotating body structure 524 and a controllable rotating force phase controlled in reference to the rotating machine member 522 to minimize nonrotating body structure vibrations in the nonrotating body structure 524. Preferably the vibe control subsystem generates the circular force command data signals which command/describe desired rotating force vectors, circular force command data signals $\alpha_m$ $\beta_m$ are preferably sent to rotor phase compute subsystem. Preferably the circular force command signal includes a real part $\alpha$ and an imaginary part $\beta$.

In an embodiment the invention includes a vibration control system for controlling vibration on a structure responsive to a vibration disturbance at a given frequency. The vibration control system preferably includes a circular force generator for creating a controllable rotating force with controllable magnitude and phase. The vibration control system preferably includes a vibration sensor for generating a vibration signal indicative of vibration of the structure. The vibration control system preferably includes a controller that receives the vibration signal from the vibration sensor and commands the force generator to create said rotating force wherein such vibration of the structure sensed by the sensor is reduced. Preferably the vibration control system includes multiple circular force generators and multiple vibration sensors distributed throughout the structure, most preferably with the quantity of vibration sensors greater than the quantity of circular force generators. Preferably the vibration control system includes a reference sensor for generating a persistent signal indicative of the vibration disturbance, preferably wherein the reference sensor monitors a rotating machine member that is rotating relative to the structure and producing the vibrations. Preferably the controllable rotating force rotates at a given harmonic circular force generating frequency, preferably a harmonic of a rotating machine member that is rotating relative to the structure and producing the vibrations. Preferably the controllable rotating force is determined and calculated as circular force described as a real and imaginary part $\alpha$ and $\beta$, preferably with a circular force command signal generated with $\alpha$ and $\beta$. Preferably the controllable rotating force is generated with two corotating imbalance moving masses, which are preferably controlled with imbalance phasing $\Phi_1$, $\Phi_2$ with the actual imbalance phasing $\Phi_1$, $\Phi_2$ realizing the commanded $\alpha$, $\beta$ circular force.

Preferably the vibration control system 409 for controlling vibration on structure 524 responsive to a vibration disturbance at a given frequency includes a force generator 530 for creating a controllable rotating force with controllable magnitude and phase, a vibration sensor 554 for generating a vibration signal indicative of vibration of the structure 524, a controller 411 that receives the vibration signal from the vibration sensor 554 and commands the force generator 530 to create a rotating force such that vibration is reduced. Preferably the system include the plurality of force generator 530 and vibration sensor 554, with the number of sensors 554 greater than the number of force generators 530. Preferably the system includes a reference sensor for generating a persistent signal indicative of the vibration disturbance. Preferably the controllable rotating force rotates at the given frequency.

In an embodiment the invention include a vibration control system for controlling a vibration on a structure responsive to a vibration disturbance at a given frequency, said vibration control system including a circular force generator for creating a controllable rotating force with a controllable magnitude and controllable magnitude phase, said vibration control system including a vibration sensor for generating a vibration signal indicative of said vibration of said structure, said vibration control system including a controller that receives said vibration signal from said vibration sensor and commands said circular force generator to create said rotating force wherein such vibration of said structure sensed by said sensor is reduced. Preferably the vibration control system 409 includes a plurality of m circular force generators 530 and a plurality n vibration sensors 554 distributed throughout the structure 524, preferably n>m. Preferably the vibration control system 409 includes a reference sensor 552 for generating a persistent signal indicative of said vibration disturbance, preferably the reference sensor 552 monitors a rotating machine member 522 that is rotating relative to said structure 524 and producing said vibration. Preferably the controllable rotating force rotates at a given harmonic circular force generating frequency. Preferably the vibration control system 409 includes a reference sensor 552 which monitors a rotating machine member 522 that is rotating relative to the structure 524, and the given harmonic circular force generating frequency is a harmonic of a harmonic of the monitored rotating machine member 522. Preferably the controllable rotating force is determined and calculated with a real and a imaginary part ($\alpha$ and $\beta$). Preferably a circular force command signal is generated with a real and a imaginary part ($\alpha$ and $\beta$). Preferably the controllable rotating force is generated with two corotating imbalance moving masses 534 and 536.

The methods of controlling vibrations preferably avoids creating linear forces, and instead creates rotating forces, preferably with the methods and systems including the calculation of rotating forces and avoiding the calculation of linear forces. The active vibration control systems preferably include a pair of co-rotating masses, preferably imbalanced rotors that are individually motorized or motorized as a master/slave phased pair, preferably a detented phase pair.

Figure 1A:
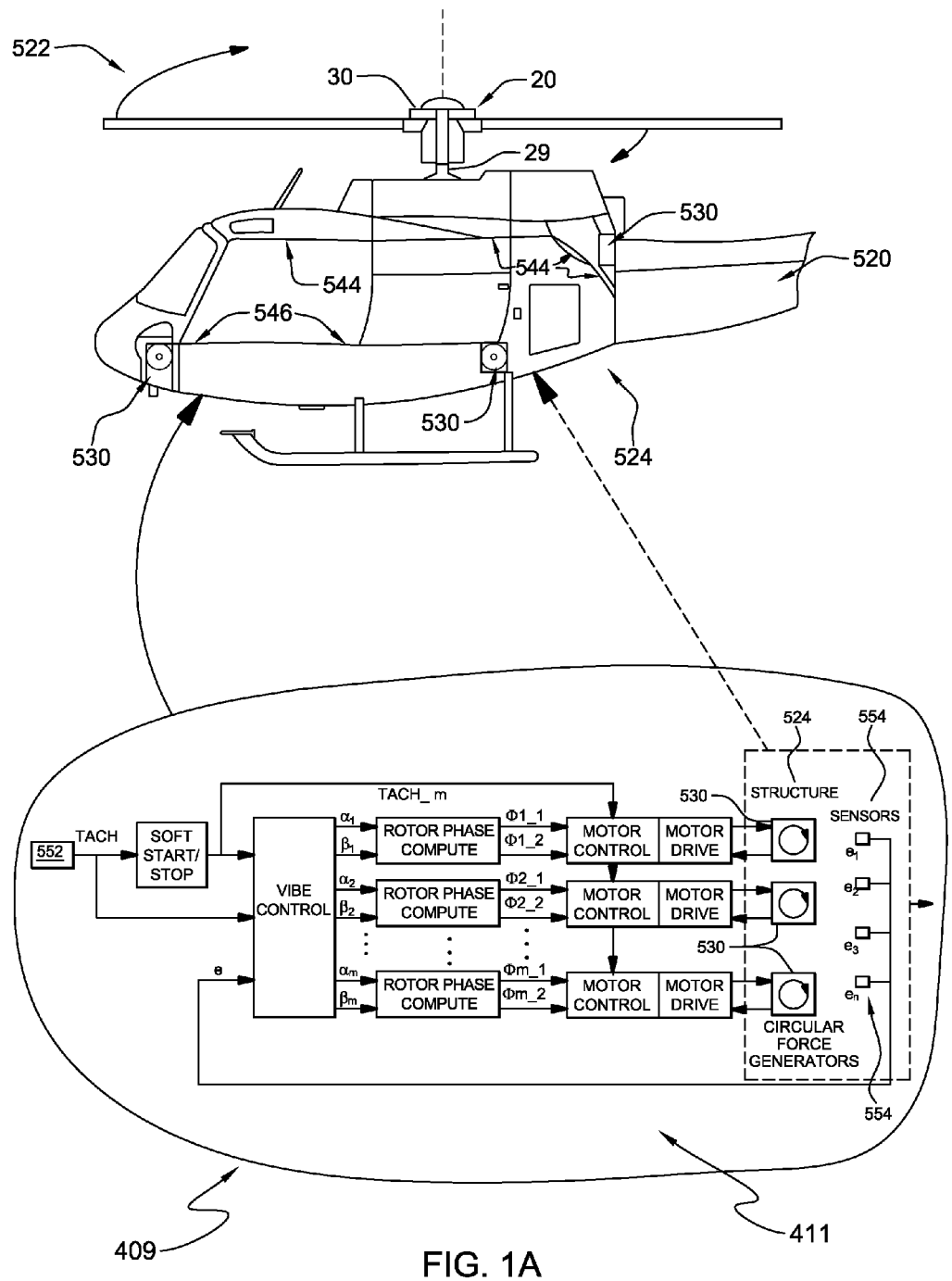
FIG. 1A-B illustrates methods/systems for controlling helicopter vibrations.
Figure 1B:
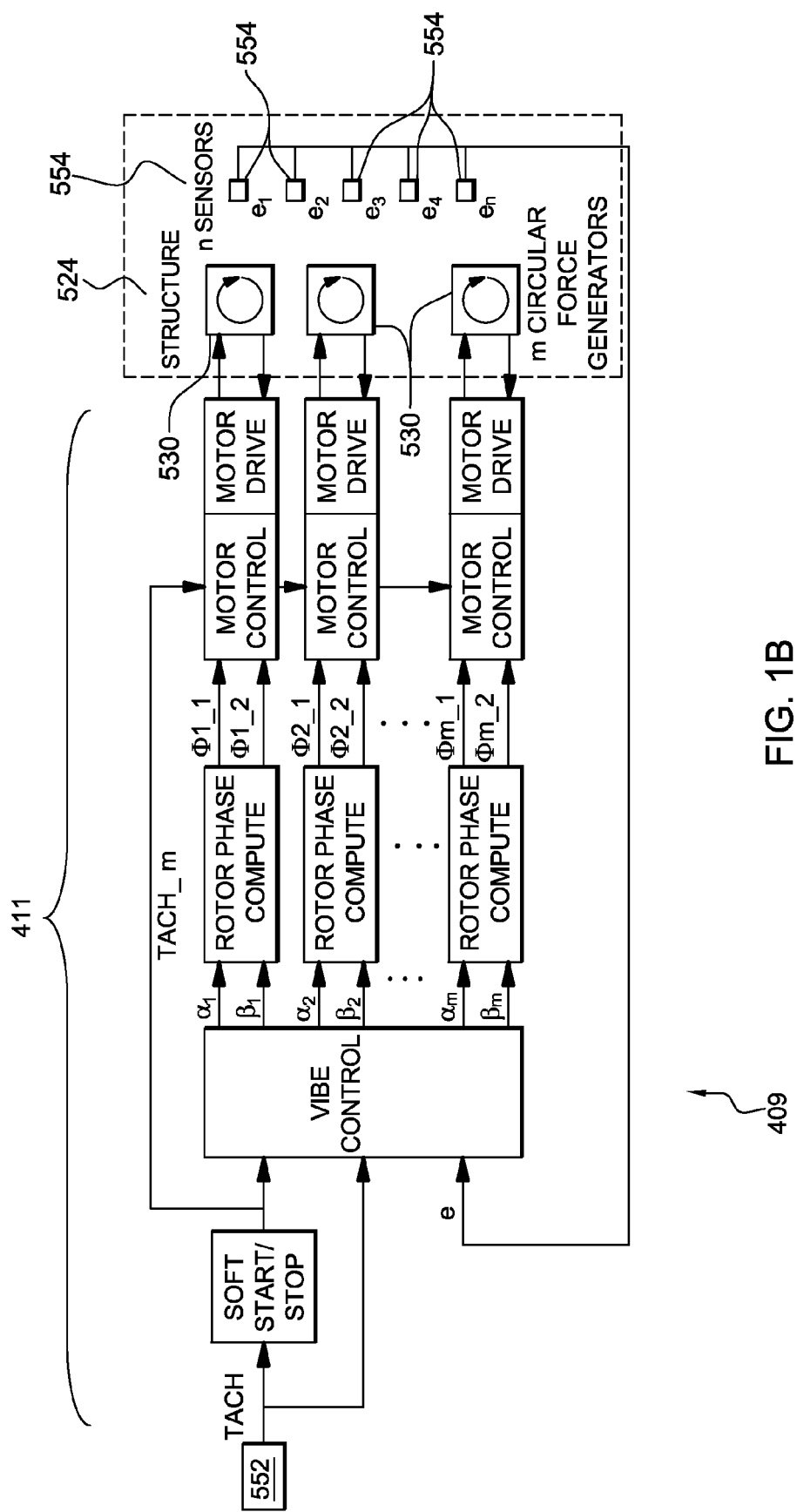

The vibration control actuators of the system/method create circular forces of controllable magnitude and temporal phase. Preferably system identification is conducted with circular forces, with parameters that describe a circular force propagating thru the control algorithm of the systems/methods. For example, as shown in FIG. 1, the parameters $\alpha$ and $\beta$ describe the in-phase and out-of-phase components of a circular force. The parameters that describe a circular force are converted into two rotor phases before being sent to the motor control. The methods preferably computationally convert rotary forces into rotor phases. The control structure using circular force generators is shown in FIG. 1, with FIG. 1B the adaptive circular force algorithm illustrating the operation of the systems and methods. Preferably the circular force generator acuators are distributed throughout the vehicle structure, with the circular force generators inputting circular forces into the vehicle nonrotating body structure to reduce vibration.

Consider two co-rotating, co-axial rotors (a circular force generator) with imbalance masses of magnitude m located at a radial distance r from the center of rotation. The angular positions of the masses are given by $\theta_i(t)$ which are measured counter-clockwise from the positive x-axis. The rotors are independently controllable but are synchronized to rotate at the same speed, $\omega$.

The net forces in the x and y directions are:

$$F_x(t) = F_0[\cos(\theta_1(t)) + \cos(\theta_2(t))]$$

$$F_y(t) = F_0[\sin(\theta_1(t)) + \sin(\theta_2(t))]$$

where $F_0 = mr\omega^2$.

Since the imbalances rotate at the same speed $\omega$ but different phase angles, their angular positions can be written as:

$$\theta_1 = \omega t + \phi_1 \text{ and } \theta_2 = \omega t + \phi_2$$

Because the actuator generates a circular force of varying magnitude, it is preferred to write the force output as a circular force. The angle, $\theta_{12}$, and magnitude, $F_{12}$, of this force can be independently controlled. The resultant force components in the x and y directions from this circular force can be written as:

$$F_x(t) = F_{12} \cos(\theta_{12}(t))$$

$$F_y(t) = F_{12} \sin(\theta_{12}(t))$$

where $0 \leq F_{12} \leq 2mr\omega^2$.

The above two formulations for the resultant x and y forces are equivalent. Setting them equal, yields:

$$\alpha = F_{12} \cos(\phi_{12}) = F_0[\cos(\phi_1) + \cos(\phi_2)]$$

$$\beta = F_{12} \sin(\phi_{12}) = F_0[\sin(\phi_1) + \sin(\phi_2)]$$

The new parameters, $\alpha$ and $\beta$, are the in-phase and out-of-phase components, respectfully, of the circular force. Preferably in these systems/methods, these components are the values that are adapted in the gradient-descent algorithm, preferably with resulting vehicle vibrations reduced. Adaptations are preferably conducted using these $\alpha$ and $\beta$ force components associated with the circular force actuators.

The method/system preferably includes a saturation control algorithm method and system for saturation conditions when operating the circular force generators. The maximum magnitude of the force generated by a circular actuator is limited to $2F_0$. This limitation is placed within the LMS algorithm to prevent the forces from going beyond the limit of what the actuators can deliver. The magnitude of the force from each circular actuator is calculated as:

$$F_{12} = \sqrt{\alpha^2 + \beta^2}$$

The force components are then limited to what the actuator can actually output using the following equations:

$$\alpha_{out} = \frac{\min(F_{12}, 2F_0)}{F_{12}} \alpha_{in}$$

$$\beta_{out} = \frac{\min(F_{12}, 2F_0)}{F_{12}} \beta_{in}$$

The method/system preferably includes a computing rotor phases algorithm method and system for computing rotor phases when operating the circular force generators. Preferably given alpha and beta from adaptation, the corresponding rotor phase angles must be calculated. This calculation is done in the [Rotor Phase Compute] block in FIG. 1. To calculate these two phase angles, the following equations are preferably solved in the inverse.

$$\alpha = F_0[\cos(\phi_1) + \cos(\phi_2)]$$

$$\beta = F_0[\sin(\phi_1) + \sin(\phi_2)]$$

Squaring both sides and adding the equations yields:

$$\alpha^2 + \beta^2 = F_0^2(2 + 2(\cos(\phi_1)\cos(\phi_2) + \sin(\phi_1)\sin(\phi_2)))$$

$$\alpha^2 + \beta^2 = 4F_0^2\left(\frac{1}{2} + \frac{1}{2}(\cos(\phi_1 - \phi_2))\right)$$

$$\alpha^2 + \beta^2 = 4F_0^2\cos^2\left(\frac{\phi_1 - \phi_2}{2}\right)$$

Another equation can be found by dividing the equations as shown below:

$$\frac{\beta}{\alpha} = \frac{\sin(\phi_1) + \sin(\phi_2)}{\cos(\phi_1) + \cos(\phi_2)} = \frac{2\sin\left(\frac{\phi_1 + \phi_2}{2}\right)\cos\left(\frac{\phi_1 - \phi_2}{2}\right)}{2\cos\left(\frac{\phi_1 + \phi_2}{2}\right)\cos\left(\frac{\phi_1 - \phi_2}{2}\right)}$$

$$\frac{\beta}{\alpha} = \tan\left(\frac{\phi_1 - \phi_2}{2}\right)$$

Rewriting these equations gives:

$$\frac{1}{2}\begin{bmatrix} 1 & -1 \\ 1 & 1 \end{bmatrix}\begin{bmatrix} \phi_1 \\ \phi_2 \end{bmatrix} = \begin{bmatrix} \cos^{-1}\sqrt{\frac{\alpha^2 + \beta^2}{2F_0}} \\ \tan^{-1}\frac{\beta}{\alpha} \end{bmatrix}$$

The solution to the inverse problem is then:

$$\begin{bmatrix} \phi_1 \\ \phi_2 \end{bmatrix} = \begin{bmatrix} 1 & -1 \\ 1 & 1 \end{bmatrix}\begin{bmatrix} \cos^{-1}\sqrt{\frac{\alpha^2 + \beta^2}{2F_0}} \\ \tan^{-1}\frac{\beta}{\alpha} \end{bmatrix}$$

The active vibration control system preferably uses actuators with two co-rotating imbalanced rotors, to create circular forces of controllable magnitude and temporal phase.

In embodiments the vehicle 520 is a helicopter with the vehicle rotating machine member 522 the helicopter rotating rotary wing hub above the nonrotating vehicle body helicopter fuselage frame below, and the helicopter rotating rotary wing hub includes hub mounted vibration control system (HMVS) 20 with at least a first hub mounted motor driven hub mass and at least a second hub mounted motor driven hub mass housed within a hub housing 30, with the mounted vibration control system 20 at least a first hub mounted motor driven hub mass and at least a second hub mounted motor driven hub mass driven to rotate relative to the rotary wing hub while the system 409 generates rotating forces in the below rotating hub helicopter aerostructure body 524 with the circular force generators 530. FIG. 1A-8 illustrate embodiments with helicopters having force generators 530 and the hub mounted vibration control system (HMVS) 20. FIG. 13A-D illustrate further preferred embodiments of the rotary wing aircraft vehicle vibration control system with the circular force generators 530 and the hub mounted vibration control system 20 with a communication bus (COM. BUS) 150 for preferably communicating and sending data, control system functions and functionality signals. Preferably the communications bus 150 is established to provided a communications link interconnection between the circular force generators 530 generating the circular forces in the nonrotating body 524 and the rotating hub mounted vibration control system at least first hub mounted motor driven hub mass and at least second hub mounted motor driven hub mass. In preferred embodiments the communication bus is a serial communication bus, preferred embodiments the communication bus is chosen from the communication bus group comprised of ARINC-429, ARINC-825(CANbus), and MIL-S-1553. Preferably vibration sensor accelerometers are mounted in both the airframe and the HMVS, and preferably vibration sensor demodulated acceleration data is shared and communicated on the communication bus. Preferably power for airframe body circular force generators 530 and the HMVS 20 does not come through a single power supply, and preferably the power to the circular force generators 530 and the HMVS 20 is provided separately with the communication bus communicating data separated from such electrical power supply delivery. Preferably a single system computer controlled controller coordinates both the rotating HMVS rotating hub mounted vibration control system and the airframe body circular force generators 530. Preferably the rotating HMVS includes local rotating hub mounted failure control computer controlled electronics for preventing local hub failure, preferably preventing over-speed control. Preferably the rotating HMVS and the airframe body circular force generators include local drive electronics, with the local drive electronics preferably acting as nodes on the communications bus. In preferred embodiments with the HMVS, including a dual frequency HMVS with four hub mounted motor driven hub masses, with two rotating clock-wise and two rotating counter-clock-wise, preferably the clock-wise rotating masses are a node on the bus and the counter-clock-wise rotating masses are another separate note on the bus. Preferably the HMVS system controller and the airframe body circular force generators system controllers each have their own system control capability, such that one system can operate without the other. In preferred embodiments the HMVS receives tachometer information signals from the communication bus, and preferably the HMVS includes a local tachometer signal sensor for locally sensing the tachometer as a backup to loss of the communication bus signal. Further preferred embodiments of the rotary wing aircraft vehicle vibration control system with the circular force generators 530 and the hub mounted vibration control system 20 with a communication bus (COM. BUS) 150 are shown in FIG. 14-19. The rotary wing aircraft helicopter preferably includes an active vibration control system power converter source 26' for outputting electromagnetic force generator power outputs. The aerostructure nonrotating frame 524 includes a plurality of distributed active vibration control system nodal sites 28' for mounting of force generators wherein generated forces are inputted into the aerostructure to suppress the troublesome vibrations. Preferably the aircraft includes at least a first distributed active vibration electromagnetic force generator 530, the first distributed active vibration electromagnetic force generator 530 including a first distributed electronic control system 32 and a first electromagnetically driven mass 34, the first distributed active vibration electromagnetic force generator 530 fixed to the frame aerostructure 524 at a first distributed active vibration control system nodal site 28'. The aircraft includes a plurality of electrical power distribution lines 140, the electrical power distribution lines 140 connecting the electromagnetic force generators 530 with the power source 26' with the electromagnetic force generator power outputs outputted to the electromagnetic force generators. The aircraft includes a distributed expandable force generator data communications network 150, the distributed force generator data communications network 150 linking together the at least first and second distributed electronic control systems 32 wherein the distributed electronic control systems 32 communicate force generator vibration control data through the distributed force generator data communications network 150 independently of the electrical power distribution lines 140 to minimize the troublesome vibrations. Preferably each node has a unique address on the network 150, with the force generating data distributed through the network 150 with the unique network address, preferably the unique node address# along with the force data, such as a magnitude and phase of a force to be generated by the electromagnetic force generator 530 having the unique data communications node network address (or the unique data communications node network address with a real and imaginary force generation values). In preferred embodiments the distributed expandable force generator data communications network 150 is a wired data communications network, and preferably is comprised of a communication bus and with a harness interface connector connecting each electromagnetic force generator's distributed electronic control system 32 with the network 150, with the distributed electronic control systems 32 both sending and receiving force generating system data through the network 150. In preferred embodiments the distributed expandable force generator data communications network 150 is a Controller Area Network, with the distributed electronic control systems 32 including microcontrollers communicating with each other through the network along with the microcontrollers in the system controller. Preferably the distributed electronic control systems 32 also communicate system health data such as whether a force generator 530 is healthy or not healthy. Preferably the force generator network node address and its accompanying force generation data (network node#_magnitude_phase) flows throughout the network 150 and is shared on the network with all network nodes and all electromagnetic force generators 530. In an embodiment the aircraft includes a master system controller 52, the master system controller 52 connected to the distributed force generator data communications network 150 wherein the master system controller 52 provides a plurality of authority commands to the at least first and second distributed electronic control systems 32, with the at least first and second distributed electronic control systems 32 executing a plurality of subordinate local force generator operation commands. Preferably the subordinate local force generator operation commands depend on the type of force generator. In preferred embodiments the force generators 530, are rotating mass force generators, preferably with the subordinate local force generator operation commands commanding electromagnetic motor rotations of corotating electromagnetically driven masses 34 and 36. In preferred embodiments an electromagnetic force generator's distributed electronic control system 32 receive its network node address and its accompanying force generation data (network node#_magnitude_phase) from which its microcontroller computes electromagnetic motor rotations for the corotating electromagnetically driven masses 34 and 36 to output a desired circular force into aerostructure 524 through the fixing base 38, with the force generators 530 preferably comprised of circular force generators outputting circular forces into aerostructure 524 at their respective fixing base nodal sites 28'. In an embodiment the aircraft includes a migrating master system control authority, the migrating master system control authority movable between the at least first and second distributed electronic control systems 32 of the plurality of force generators 530, with the migrating master system control authority providing a plurality of authority commands to the distributed electronic control systems 32 to execute a plurality of subordinate local force generator operation commands such as with a Migrating Master System Control Authority, preferably without a separate distinct physical head master System Controller. With the migrating master system control authority at any one point in time preferably the system has a master control authority taking up temporary residence in a distributed electronic control system 32, which includes executable software and/or firmware commands that provide a physically headless control system with distributed control of the system with the ability of backup command with migration movement of authority. Preferably the system includes distributed networked accelerometers 54, with the distributed networked accelerometers including microcontrollers having accelerometer network links 56 with the distributed expandable force generator data communications network 150. The accelerometers input and output vibration measurement data into the force generator data communications network, preferably with the plurality of accelerometers inputting data into the network (and receiving data from the network) with the accelerometers each having a unique network node address #, with the accelerometers including an accelerometer distributed network electronic control system for data interfacing with the network. In a preferred embodiment the accelerometer network links 56 are wired links, and preferably the accelerometers are powered through the communications bus wired network links 56. In an alternative embodiment the accelerometers are wireless networked accelerometers providing wireless transmission of accelerometer data measurements sent to the network 150 for determination on how to minimize troublesome vibrations with the accelerometers powered by alternative means such as with batteries or with power supplied from aircraft power supply outlets or power supply 26'. In an embodiment the aircraft includes a distributed master system control authority. The distributed master system control authority is distributed among the at least first and second distributed electronic control systems 32 utilizing the network 150 with the distributed master system control authority providing a plurality of authority commands to the individual distributed electronic control systems 32 to execute a plurality of subordinate local force generator operation commands, such as with a Distributed Master System Control Authority. Preferably at any one point in time the system has a master control authority spread out in at least two distributed electronic control systems 32, and includes executable software and/or firmware commands that provide a physically headless system with distributed control of the system with backup control with the plurality of distributed electronic control systems 32 on the network 150. Preferably the system includes distributed networked accelerometers 54, with the distributed networked accelerometers including microcontrollers having accelerometer network links 56 with the distributed expandable force generator data communications network 150. The accelerometers input and output vibration measurement data into the force generator data communications network, preferably with the plurality of accelerometers inputting data into the network (and receiving data from the network) with the accelerometers each having a unique network node address #, with the accelerometers including an accelerometer distributed network electronic control system for data interfacing with the network. In a preferred embodiment the accelerometer network links 56 are wired links, and preferably the accelerometers are powered through the communications bus wired network links 56. In an alternative embodiment the accelerometers are wireless networked accelerometers providing wireless transmission of accelerometer data measurements sent to the network 150 for determination on how to minimize troublesome vibrations with the accelerometers powered by alternative means such as with batteries or with power supplied from aircraft power supply outlets or power supply 26'. In an embodiment the aircraft includes at least a first distributed networked accelerometer 54. The accelerometer outputs can be inputted directly into the network 150 or into system controller 52. Preferably the at least first distributed networked accelerometer 54 has an accelerometer network link 56 with the distributed expandable force generator data communications network 150. The accelerometers are fixed to the aircraft, preferably fixed to the aerostructure 524, and measure vibrations in the aerostructure. The accelerometers sense and measure the troublesome vibrations created by the rotating machinery and the forces generated by the actuators and are measurable by the accelerometer. The accelerometer measurements of vibrations are used as control inputs to drive down and minimize the troublesome vibrations. The accelerometers input and output vibration measurement data into the force generator data communications network, preferably with the plurality of accelerometers inputting data into the network (and receiving data from the network) with the accelerometers each having a unique network node address #, with the accelerometers including an accelerometer distributed network electronic control system for data interfacing with the network. In a preferred embodiment the accelerometer network links 56 are wired links, and preferably the accelerometers are powered through the communications bus wired network links 56. In an alternative embodiment the accelerometers are wireless networked accelerometers providing wireless transmission of accelerometer data measurements sent to the network 150 for determination on how to minimize troublesome vibrations with the accelerometers powered by alternative means such as with batteries or with power supplied from aircraft power supply outlets or power supply 26'. The accelerometer data measurements are shared through the network 150 and used in the system controllers, processors, and electronic control systems in the determination of controlling the electromagnetic driving of the moving masses to generate the forces to minimize the troublesome vibrations. In preferred embodiments the first distributed electronic control system 32 executes a plurality of local force generator operation rotating motor commands to rotate at least its first electromagnetic motor to move its at least first mass, and the second distributed electronic control system 32 executes a plurality of local force generator operation rotating motor commands to rotate at least its first electromagnetic motor to move its at least first mass. Preferably the plurality of distributed active vibration force generators 530 are circular force generating distributed active vibration force generators with the distributed electronic control systems 32 executing a plurality of local force generator operation rotating motor control commands. Preferably the distributed electronic control systems have a network bus interface with the data communications network bus through which force generation data is communicated, with the distributed electronic control systems executing a plurality of local force generator operation commands.

Figure 13A:
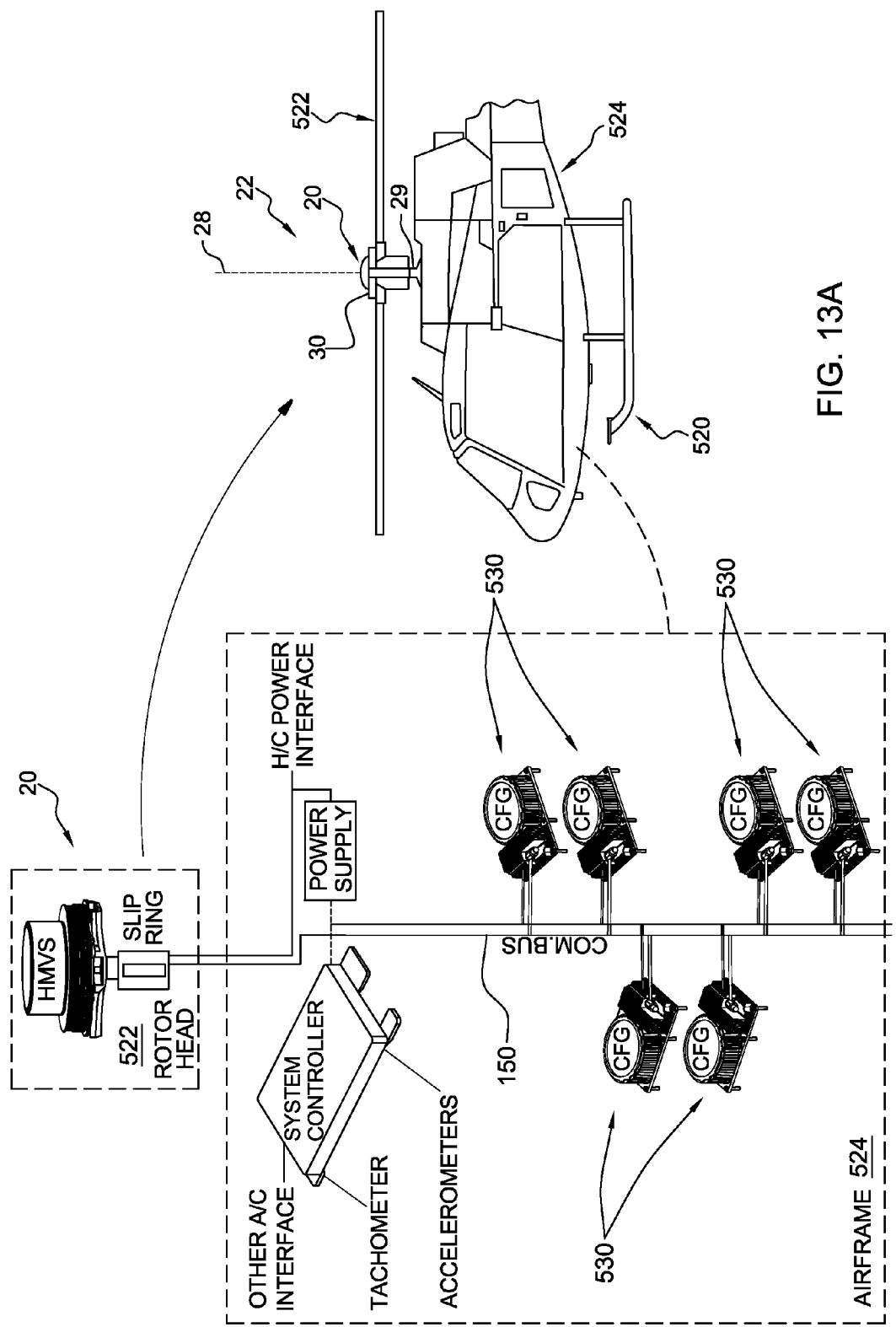
FIG. 13A-D illustrates methods/systems for controlling helicopter vibrations with a rotating Hub Mounted Vibration control System (HMVS), a communications bus and CFGs (Circular Force Generators).
Figure 13C:
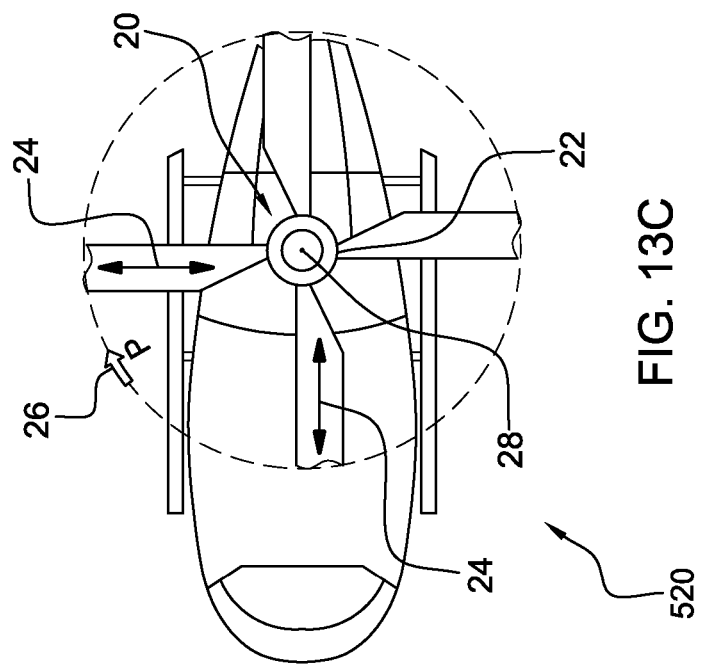
Figure 13B:
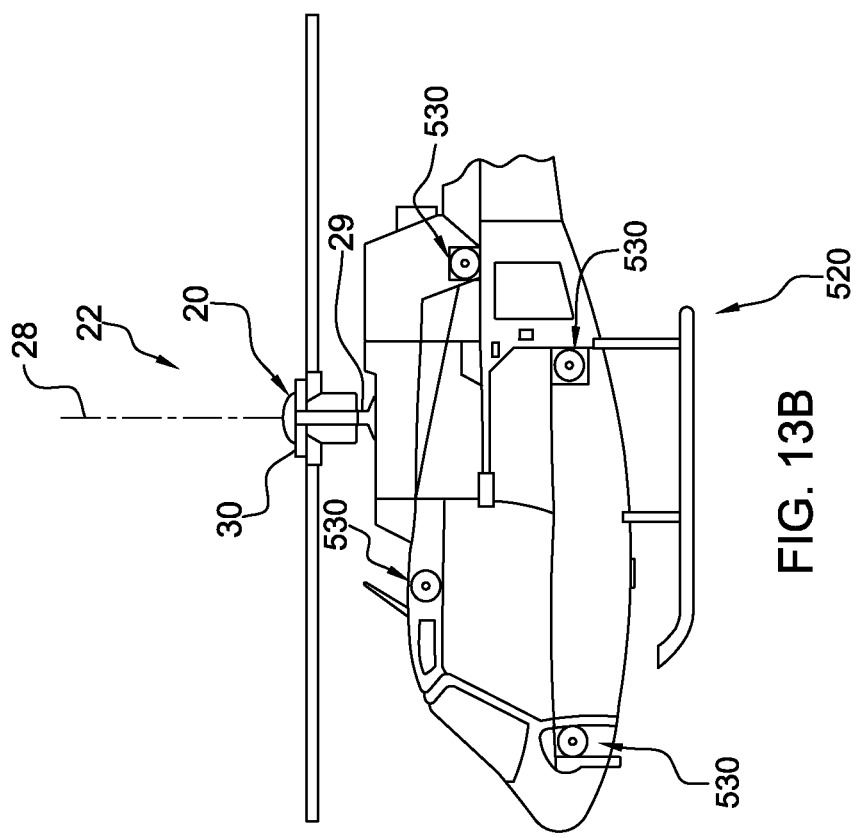
Figure 13D:
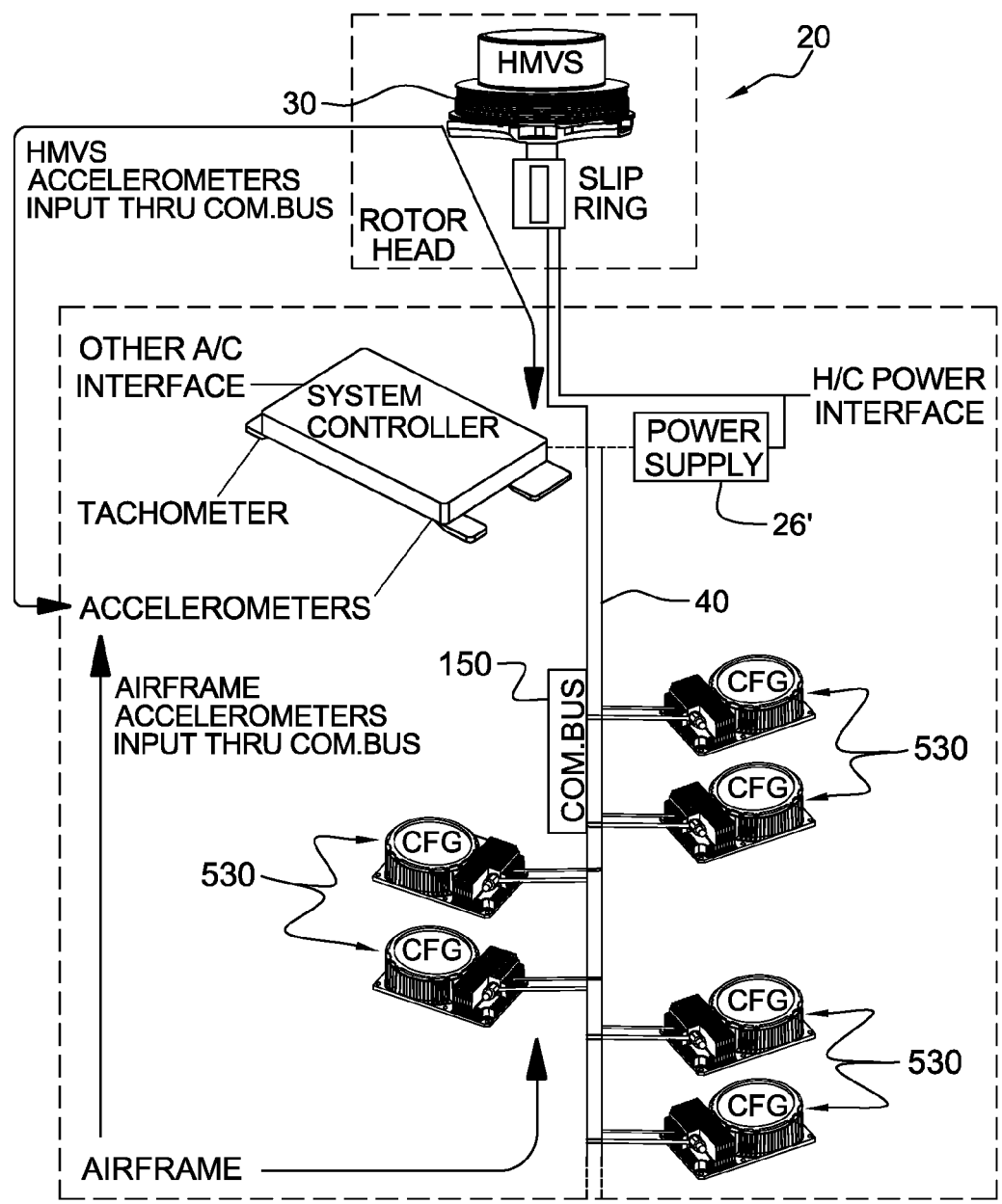
Figure 14:
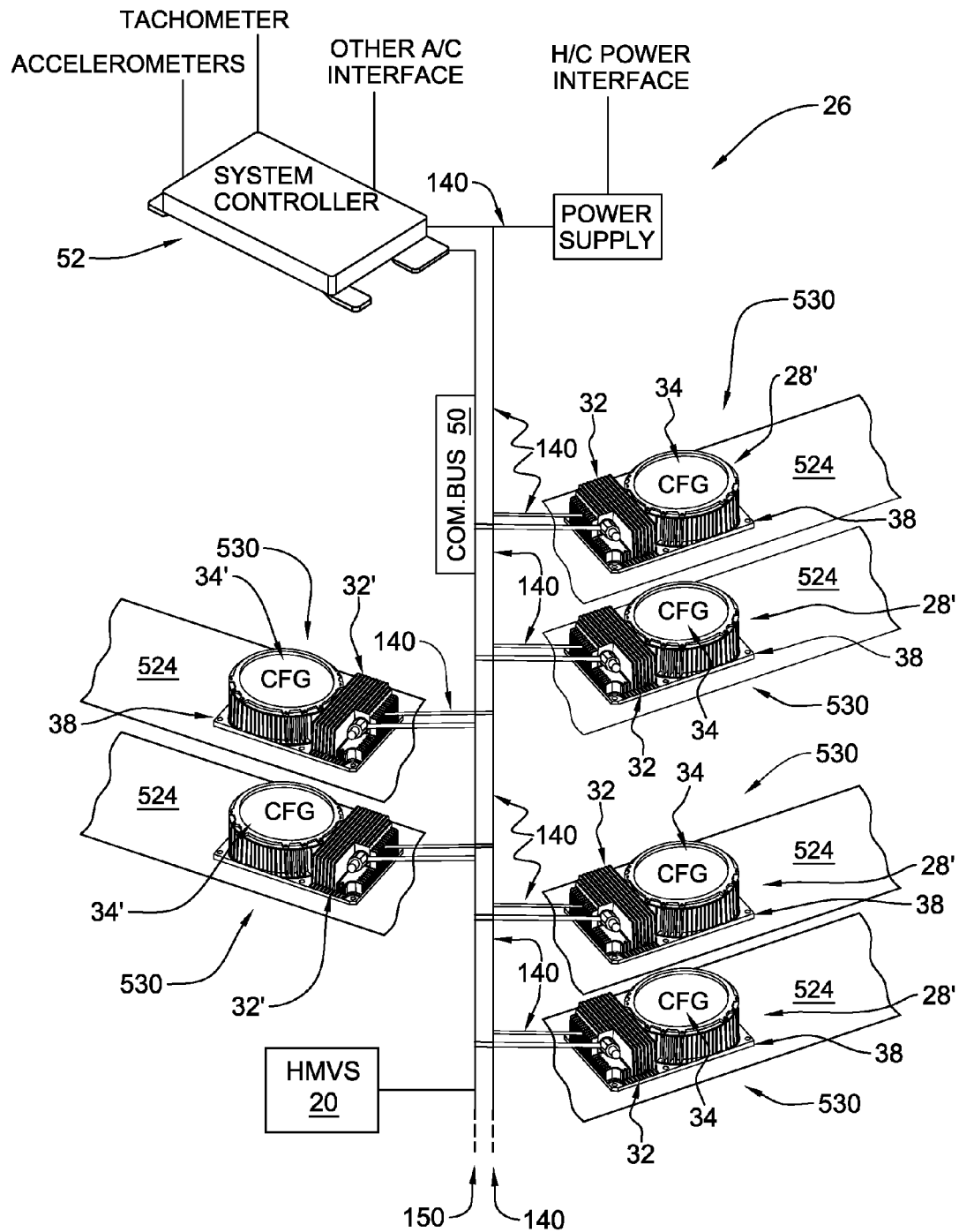
FIG. 14 illustrates methods/systems for controlling helicopter vibrations with a HMVS, a communications bus and CFGs (Circular Force Generators).
Figure 15:
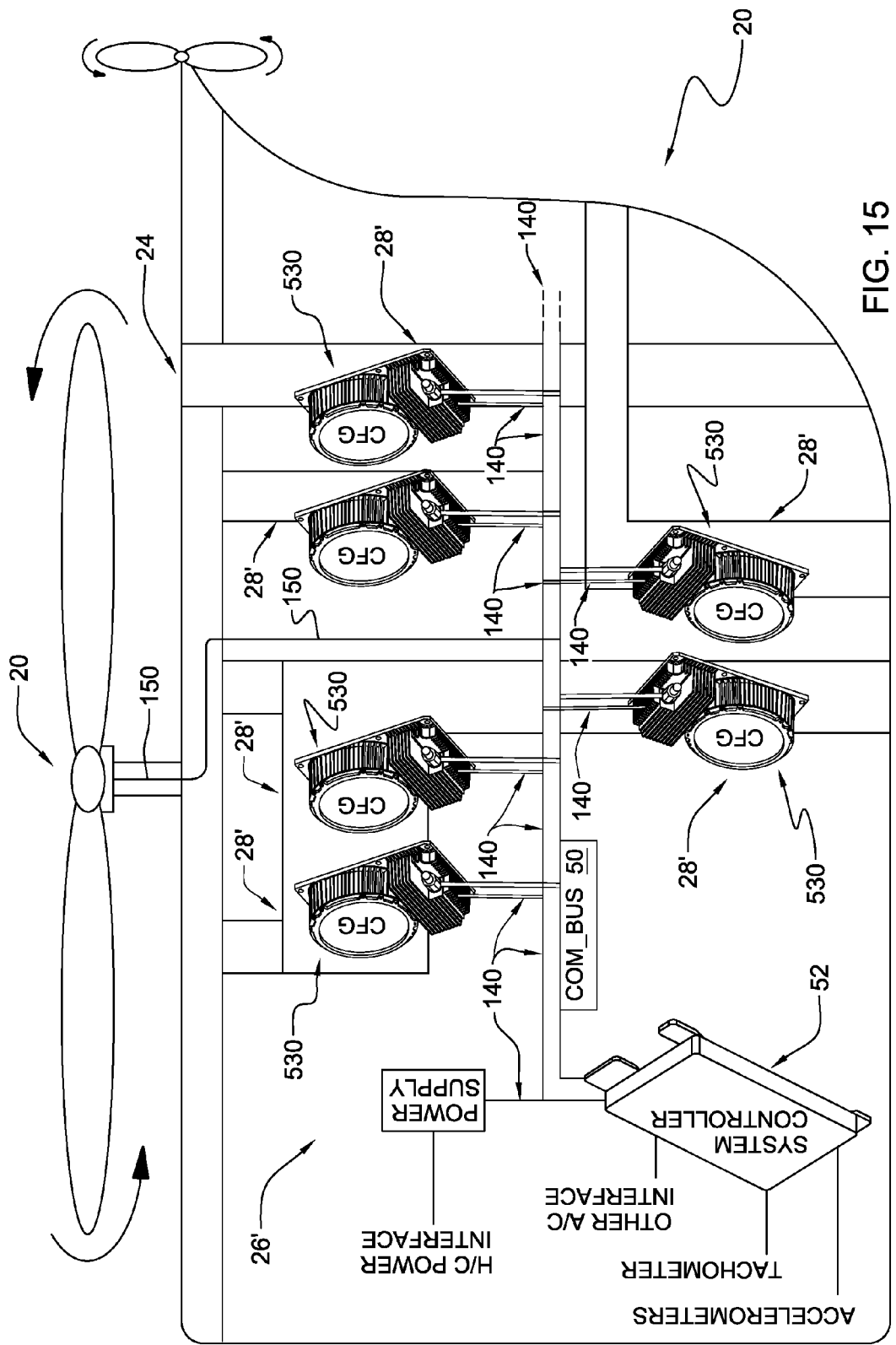
FIG. 15 illustrates methods/systems for controlling helicopter vibrations with a HMVS, a communications bus and CFGs (Circular Force Generators).
Figure 16:
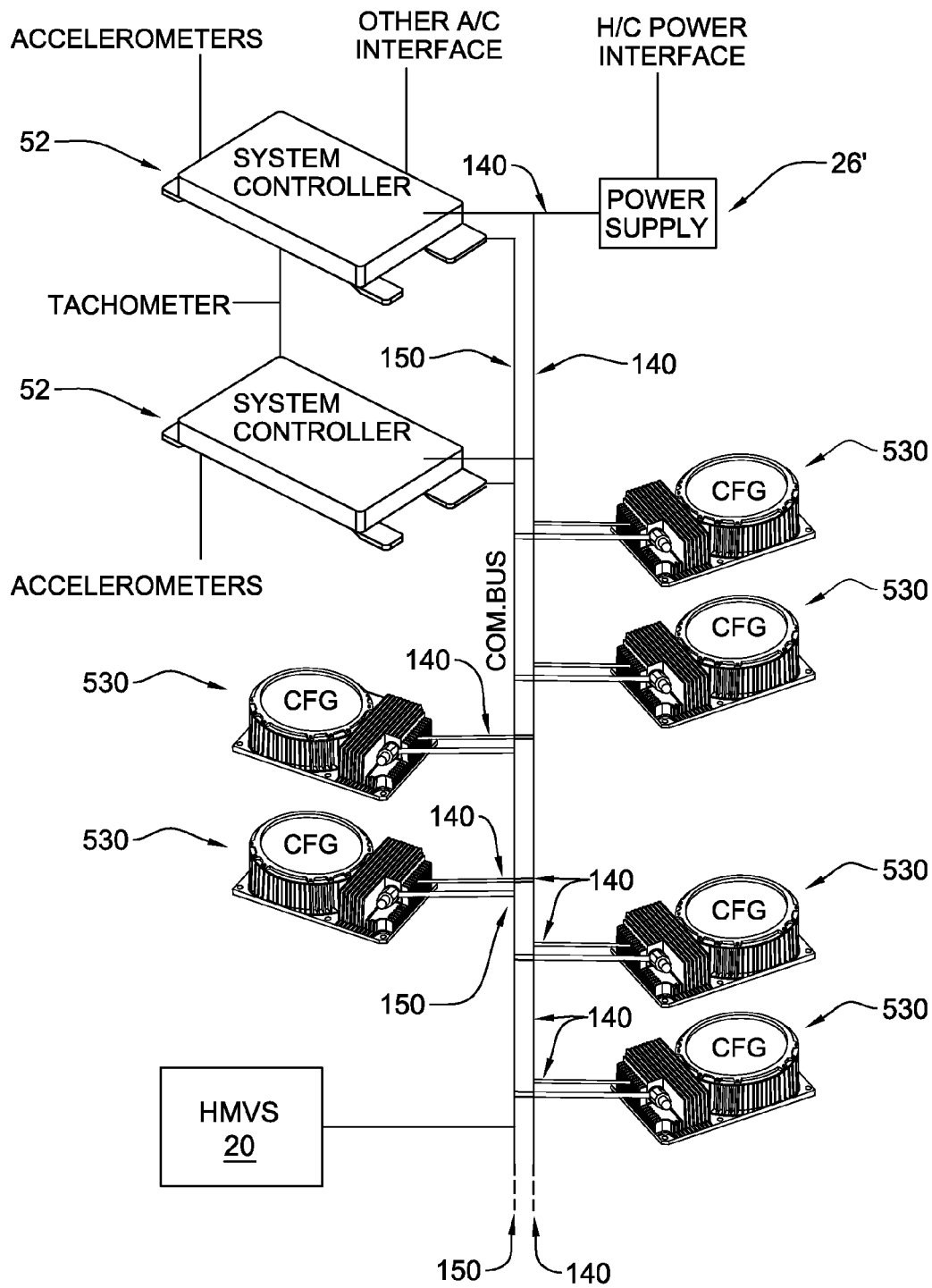
FIG. 16 illustrates methods/systems for controlling helicopter vibrations with a HMVS, a communications bus and CFGs (Circular Force Generators).
Figure 17:
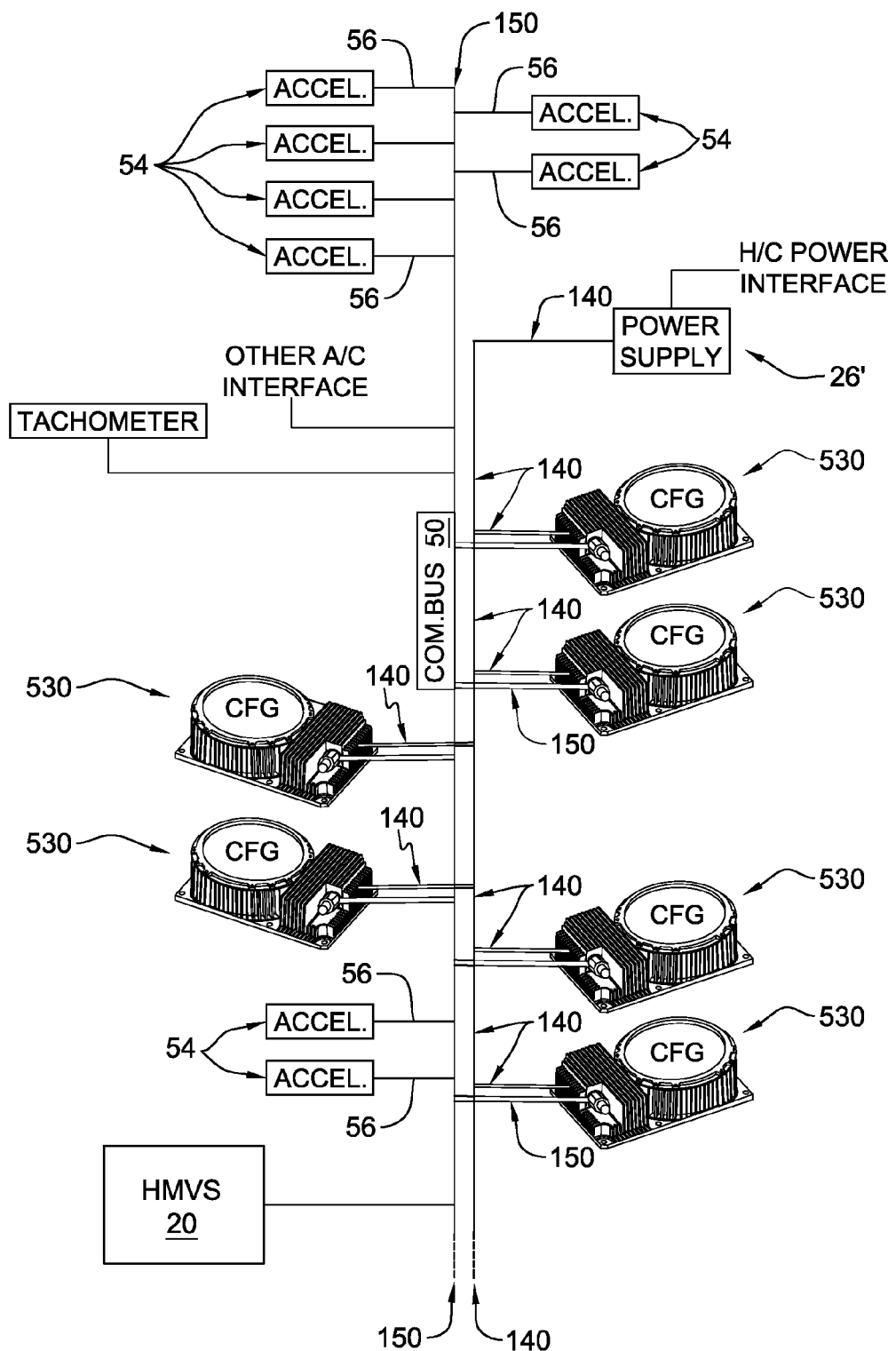
FIG. 17 illustrates methods/systems for controlling helicopter vibrations with a HMVS, a communications bus and CFGs (Circular Force Generators) with a distributed master system control authority.
Figure 18:
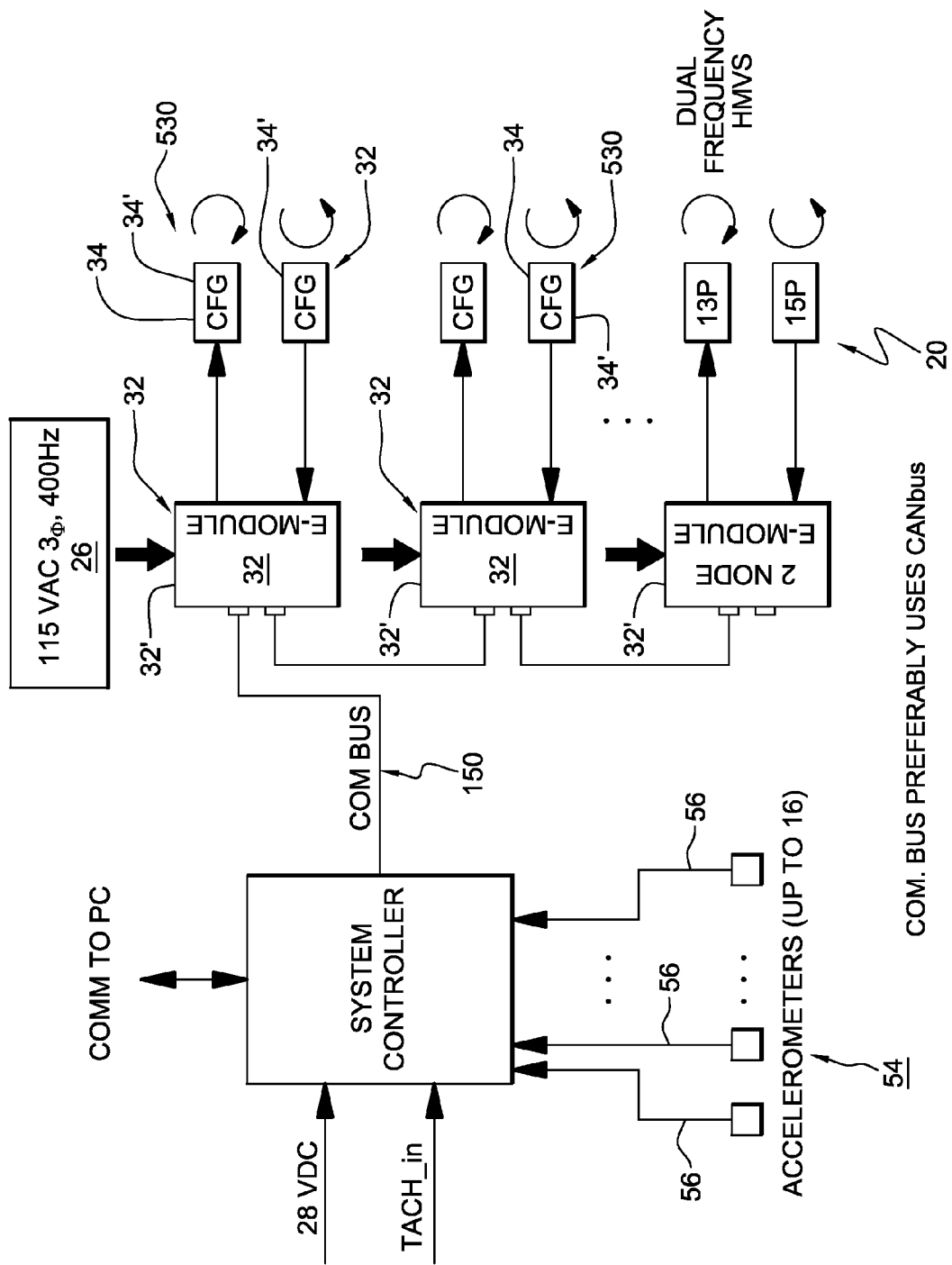
FIG. 18 illustrates methods/systems for controlling helicopter vibrations with a Dual Frequency HMVS, a communications bus and CFGs (Circular Force Generators).
Figure 19A:
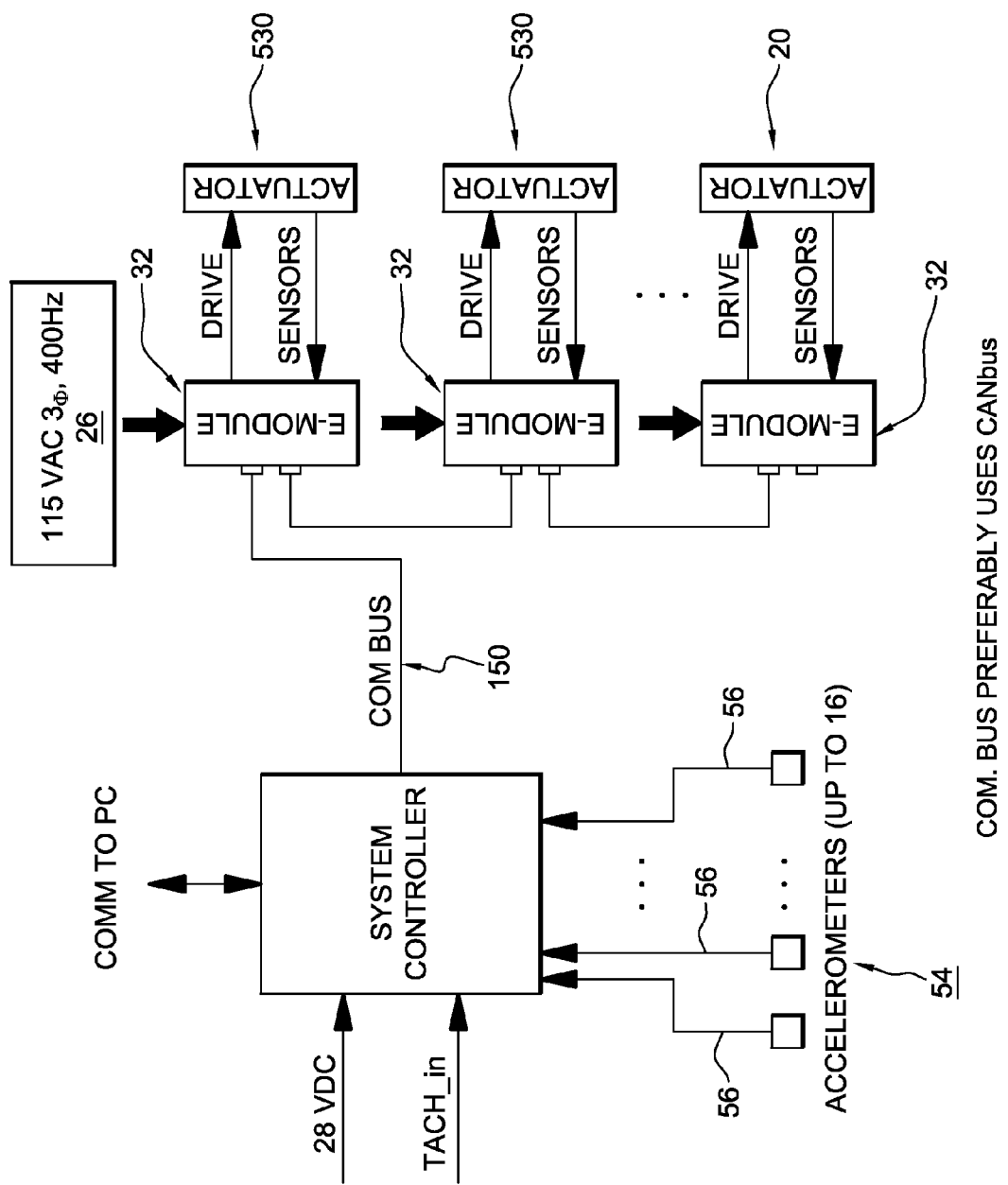
FIG. 19A-B illustrates methods/systems for controlling helicopter vibrations with a communications bus and actuators.
Figure 19B:
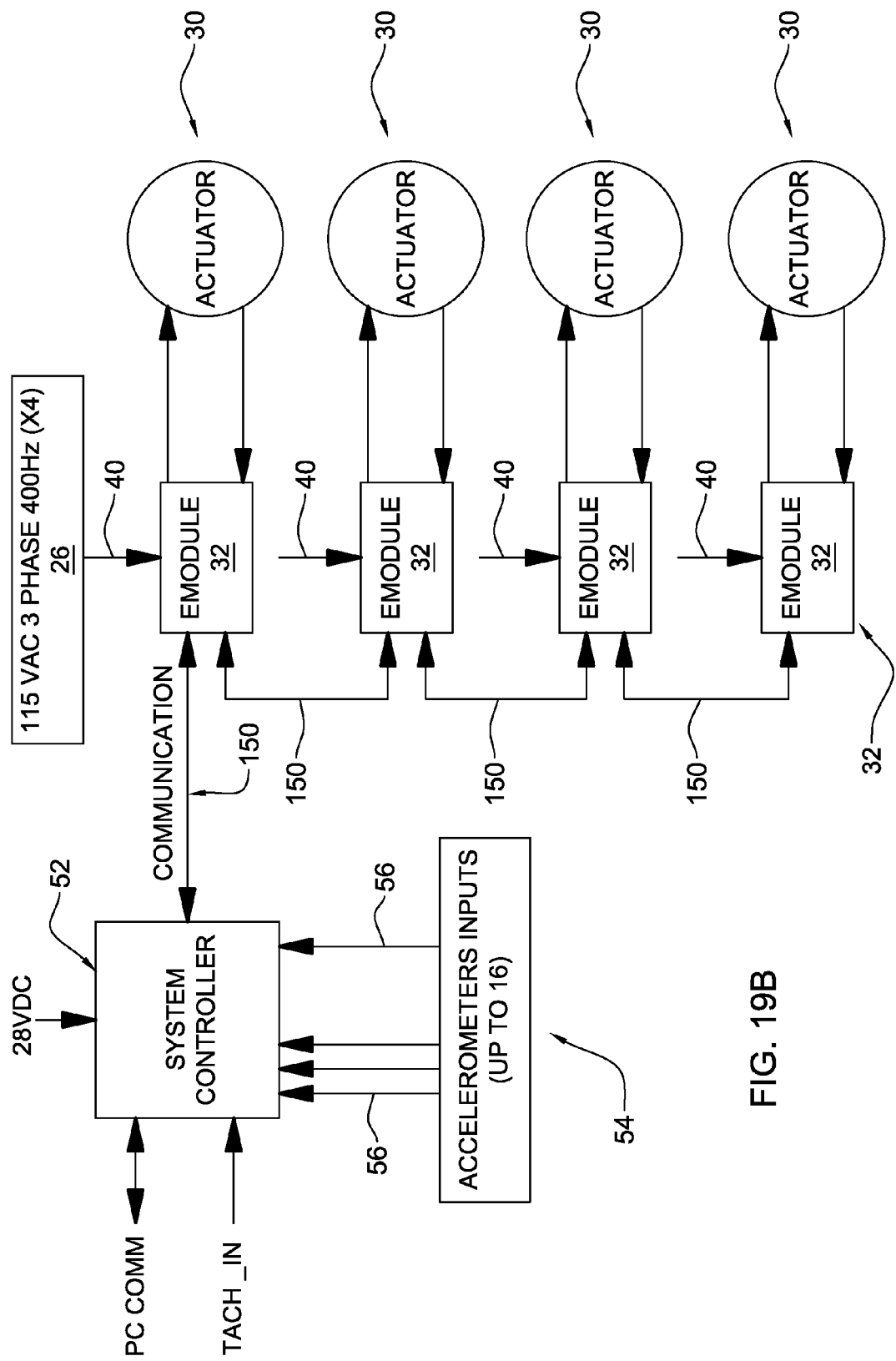

In an embodiment the invention includes a rotary blade rotary wing aircraft rotating hub mounted rotating assembly vibration control system for a rotary blade rotary wing aircraft rotating hub assembly experiencing a vibration of a plurality of vibration frequencies while rotating at an operational rotation frequency about a rotating assembly center axis of rotation. FIG. 13A-B illustrate a preferred rotary blade rotary wing aircraft rotating hub mounted rotating assembly vibration control system HMVS 20 for a rotary blade rotary wing aircraft rotating hub assembly 22 experiencing a vibration 24 of a plurality of vibration frequencies while rotating at an operational rotation frequency 26 (1 P) about a rotating assembly center axis of rotation 28. (As illustrated and labeled the rotating hub assembly is rotating at 1 P in a clockwise direction relative to non-rotating aircraft body/ground references).

Figure 20A:
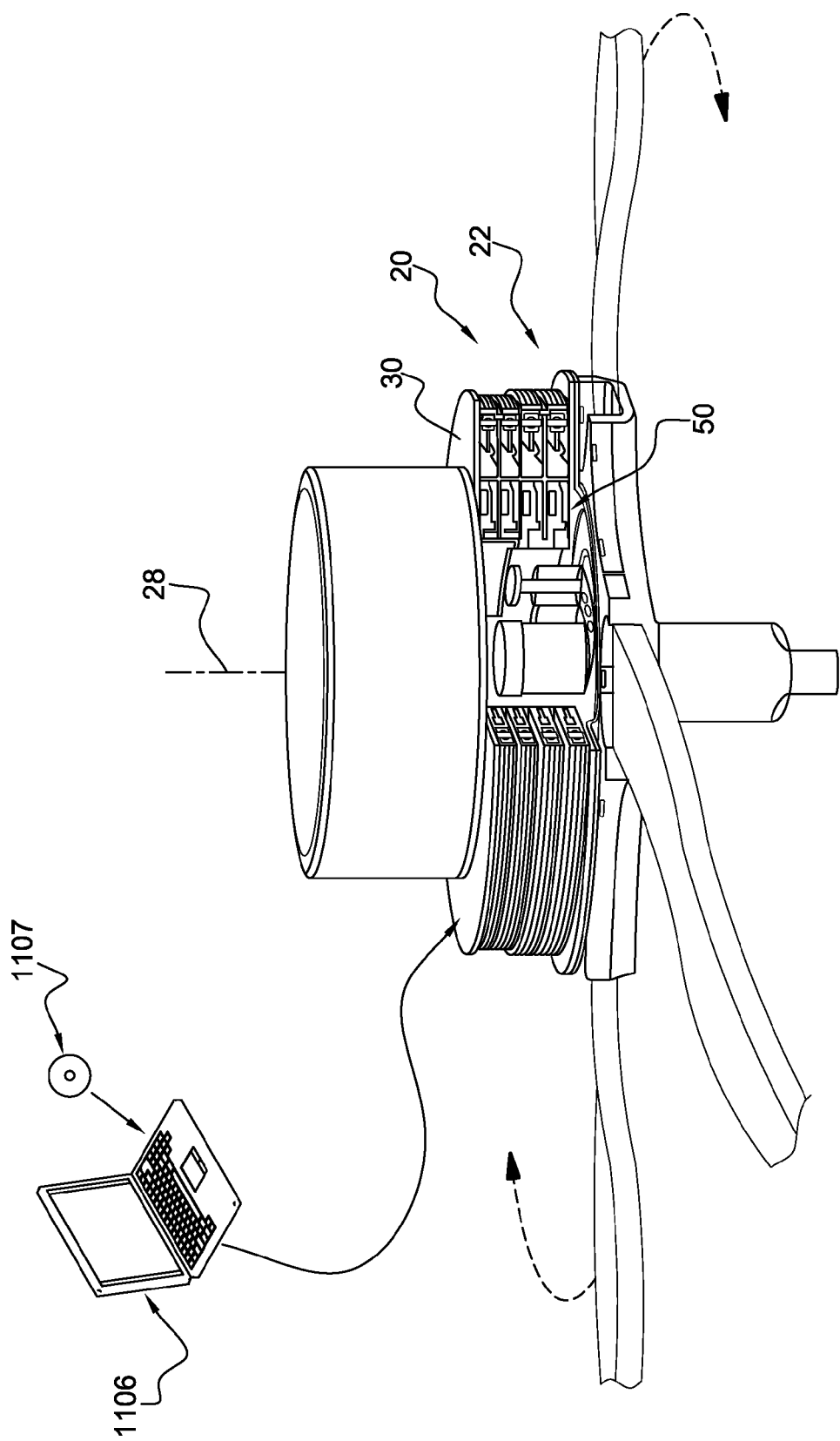
FIG. 20A-C illustrates a dual frequency Hub Mounted Vibration control System (HMVS) with a 3 P frequency stage and a 5 P frequency stage.
Figure 20B:
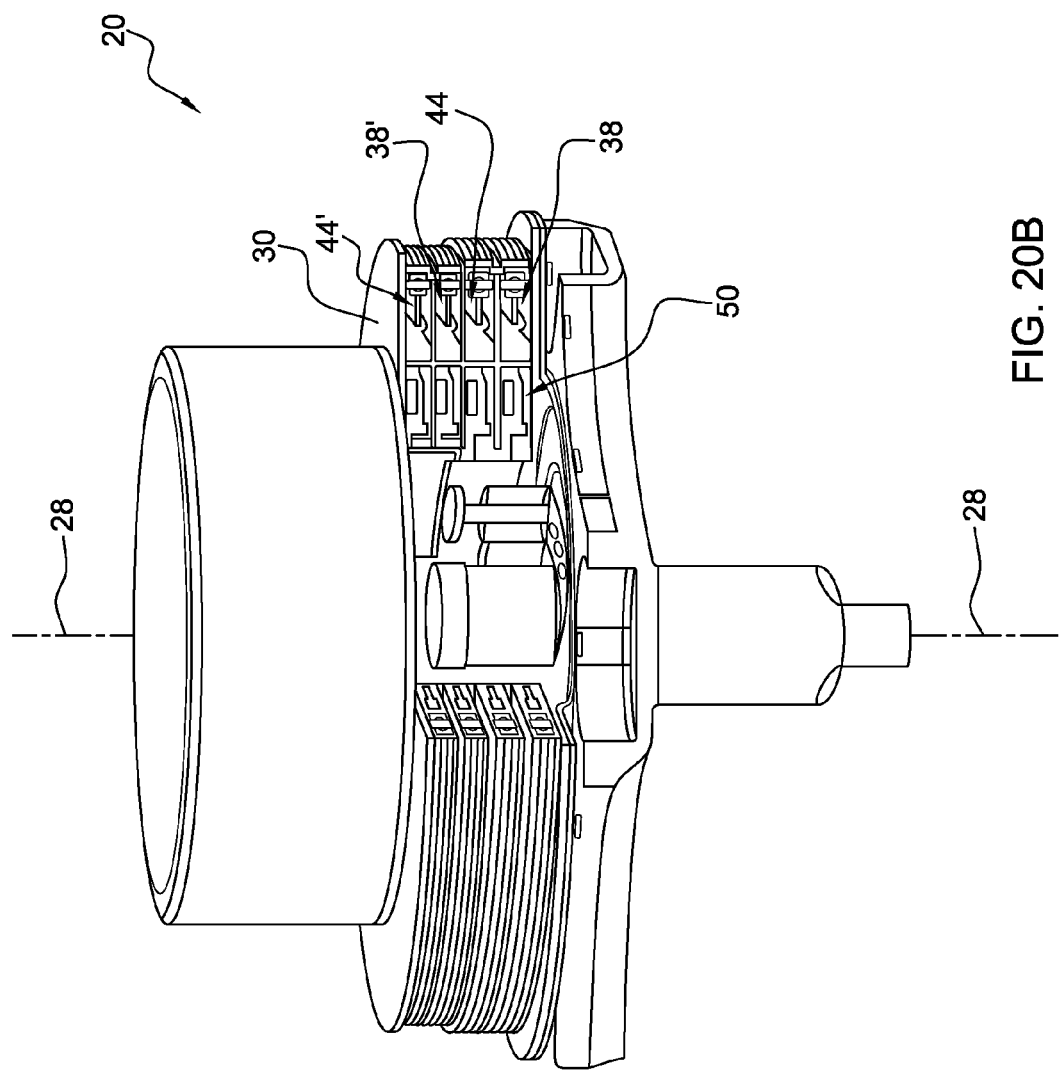
Figure 20C:
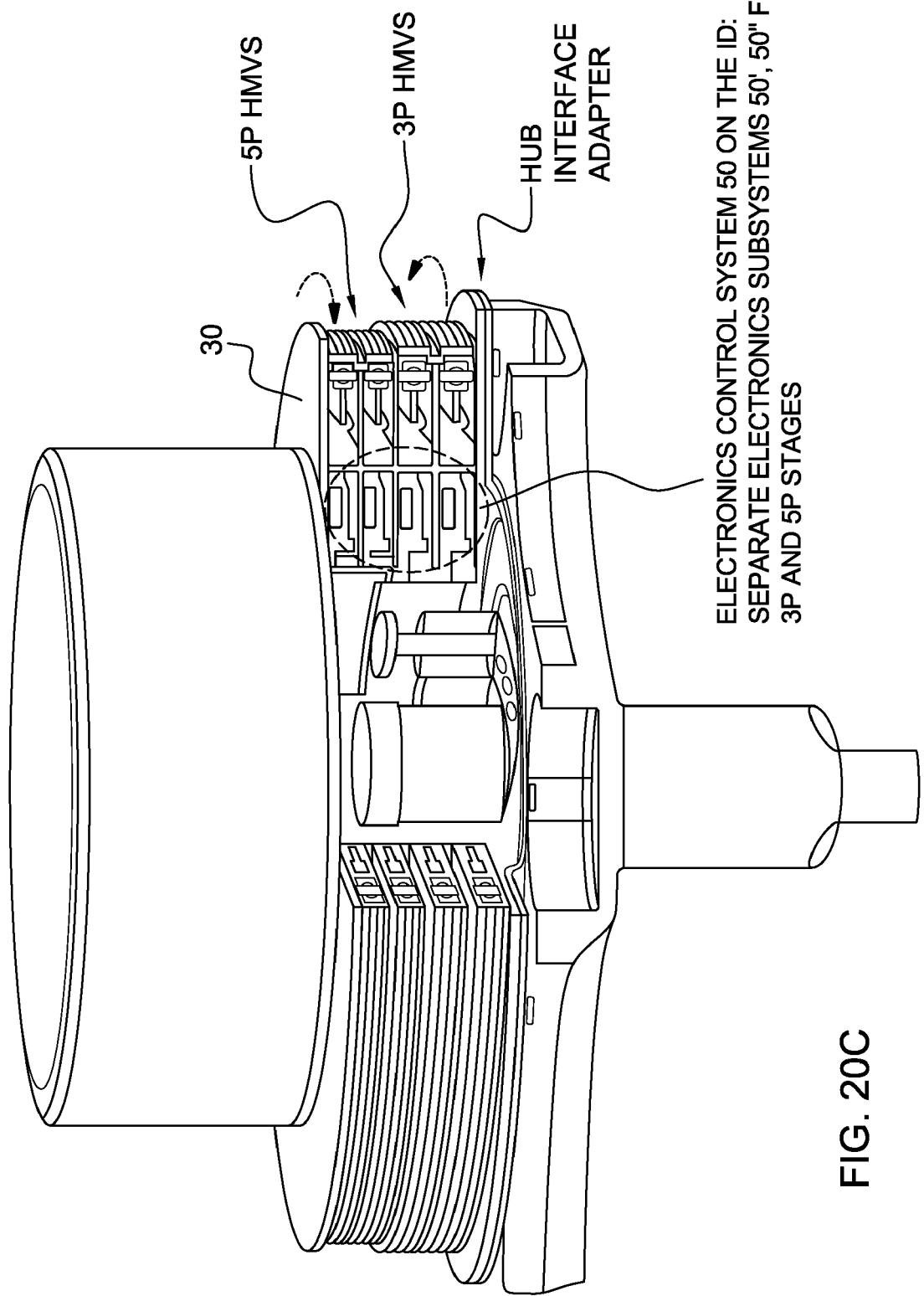
Figure 21:
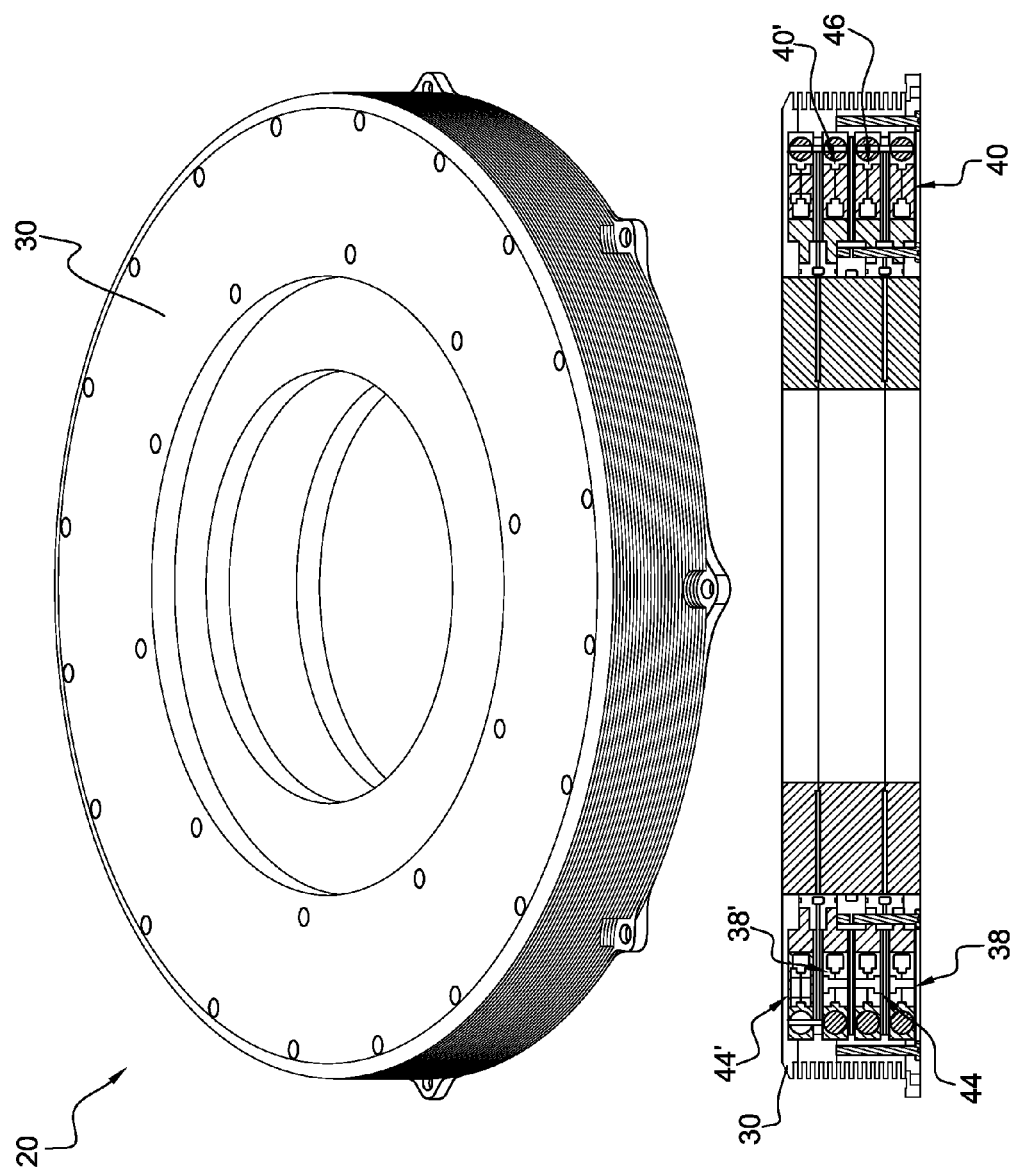
FIG. 21 illustrates a dual frequency Hub Mounted Vibration control System (HMVS).
Figure 22A:
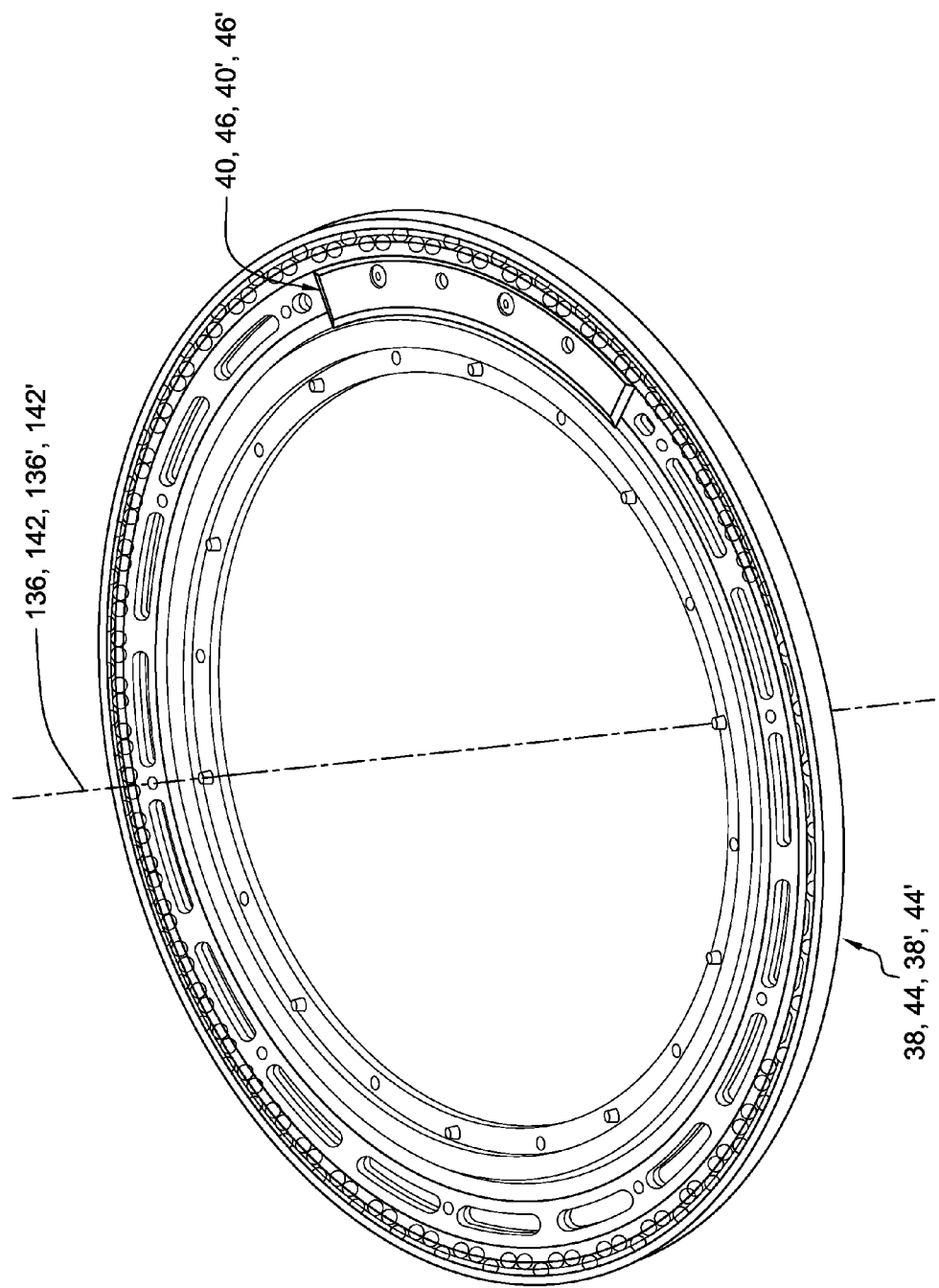
FIG. 22A-B illustrates HMVS imbalance rotors for generating a first rotating net force vector and a second rotating net force vector.
Figure 22B:
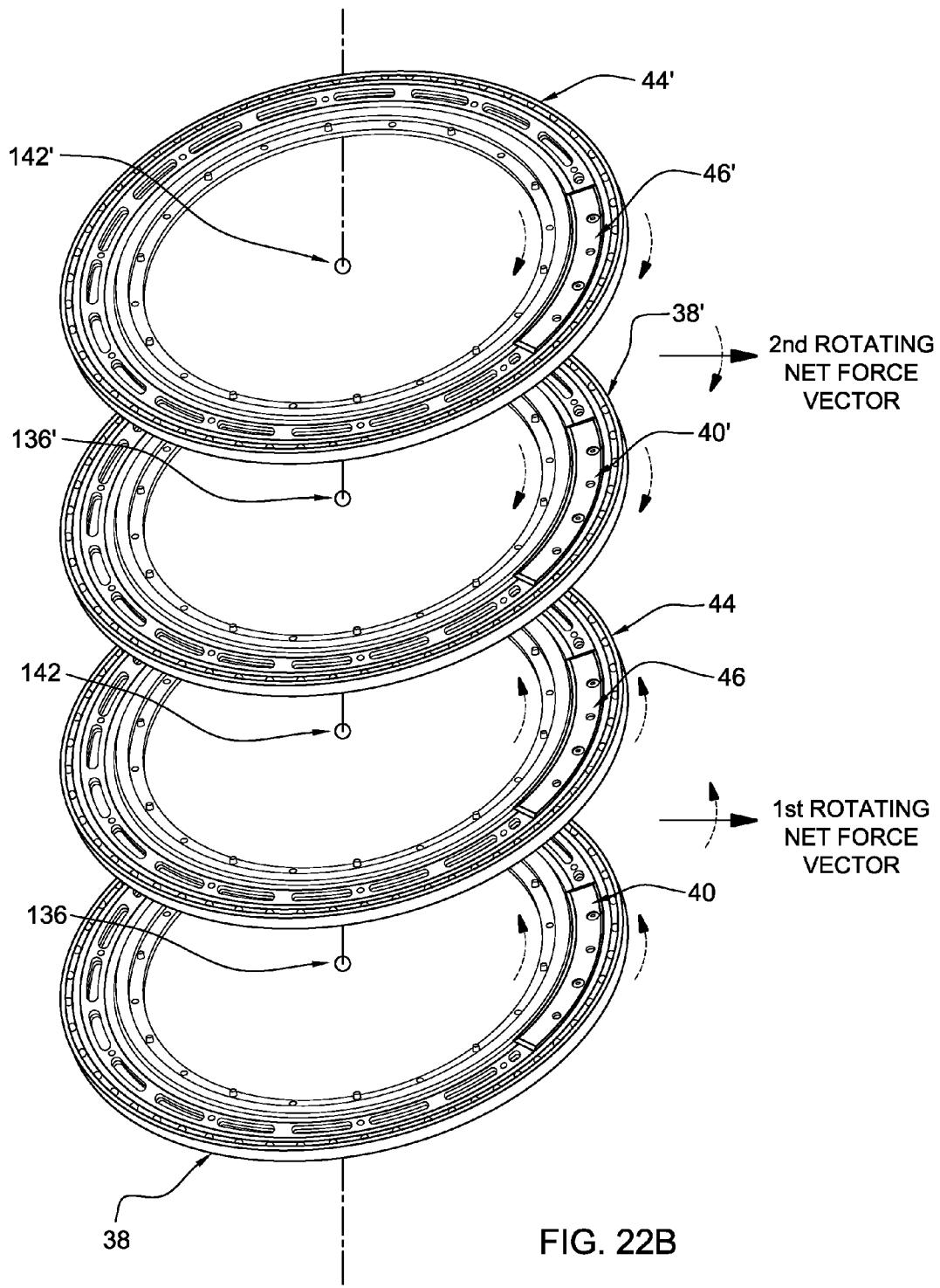

FIG. 20A-C illustrates a hub mounted rotating assembly vibration control system 20 with about a quarter section cut away to reveal the internals housed inside the annular ring housing 30. The helicopter rotating hub mounted vibration control system preferably includes an annular ring housing 30 attachable to the helicopter rotary wing hub and rotating with the helicopter rotary wing hub at the helicopter operational rotation frequency. The helicopter rotating hub mounted vibration control system housing 30 including a first imbalance mass concentration rotor 38, a second imbalance mass concentration rotor 44, a third imbalance mass concentration rotor 38', and a fourth imbalance mass concentration rotor 44'. FIG. 21 illustrates a further rotating assembly vibration control system 20, with a cross section showing the four rotors housed in the housing 30. FIG. 22A-B illustrate the imbalance mass concentration rotors with their mass concentrations 40, 46, 40', 46'. Preferably the first imbalance mass concentration rotor 38 has a first imbalance mass concentration rotor center axis of rotation 136 centered on the rotating assembly center axis of rotation 28, the second imbalance mass concentration rotor 44 having a second imbalance mass concentration rotor center axis of rotation 142 centered on the rotating assembly center axis of rotation 28, the third imbalance mass concentration rotor 38' having a third imbalance mass concentration rotor center axis of rotation 136' centered on the rotating assembly center axis of rotation 28, and the fourth imbalance mass concentration rotor 44' having a fourth imbalance mass concentration rotor center axis of rotation 142' centered on the rotating assembly center axis of rotation 28. The first imbalance mass concentration rotor 38 and the second imbalance mass concentration rotor 44 are driven at a first rotation speed greater than the rotating assembly operational rotation frequency 26 (1 P) while controlling the rotational position of the first imbalance mass concentration 40 and the second imbalance mass concentration 46 to produce a first rotating net force vector to inhibit a first vibration frequency. In preferred embodiments as illustrated in FIG. 20-22, the first imbalance mass concentration rotor 38 and the second imbalance mass concentration rotor 44 are driven at a four multiple vibration canceling rotation frequency (4 P) counter rotating direction (rotation opposing rotation of the rotating hub assembly) (counter clockwise if hub is rotating clockwise as illustrated). The first and second rotor imbalance mass concentrations 40, 46 are driven at 4 P opposing the direction of the rotating hub rotation while controlling the rotational position of the first imbalance mass concentration 40 and the second imbalance mass concentration 46 to produce a first rotating net force vector. The third imbalance mass concentration rotor 38' and the fourth imbalance mass concentration rotor 44' are driven at a second rotation speed greater than the rotating assembly operational rotation frequency 26 (P) while controlling the rotational position of the third imbalance mass concentration 40' and the fourth imbalance mass concentration 46' to produce a second rotating net force vector. The first and second rotating force vectors are controlled to inhibit vibration frequency (4 P). In a preferred embodiment as illustrated in FIG. 20-22, the third imbalance mass concentration rotor 38' and the fourth imbalance mass concentration rotor 44' are driven at a four multiple vibration canceling rotation frequency (4 P) co-rotating direction rotating with the rotation of the rotating hub assembly (4 P rotating in same direction as rotating hub, clockwise if hub is rotating clockwise as illustrated) while controlling the rotational position of the third imbalance mass concentration and the fourth imbalance mass concentration to produce a second rotating net force vector to inhibit a second vibration frequency (5 P) with respect to the 1 P rotating frame. With the rotor hub rotating at P, and having N blades, preferably the first and second imbalance mass concentrations are rotated at a whole number multiple of P, most preferably NP in the direction opposing the rotor hub rotation, and preferably the third and fourth imbalance mass concentrations are rotated at a whole number multiple of P, most preferably NP in the same direction as the rotor hub rotation. Preferably the first imbalance mass concentration is opposingly oriented relative to the second imbalance mass concentration during a starting stopping rotation speed less than the first rotation speed. Preferably the third imbalance mass concentration is opposingly oriented relative to the fourth imbalance mass concentration during a starting stopping rotation speed less than the second rotation speed.

Figure 23A:
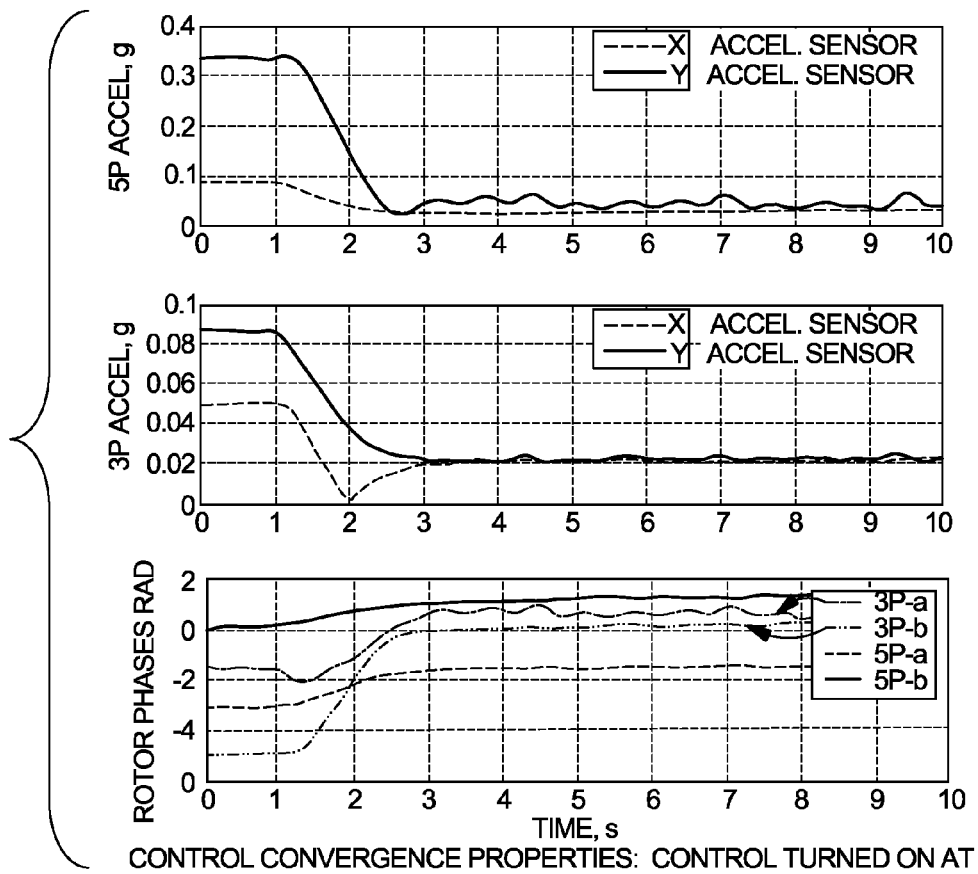
FIG. 23A-C illustrates dual frequency (3 P and 5 P) Hub Mounted Vibration control System (HMVS) control convergence properties, 3 P and 5 P rotor position commands, 3 P and 5 P tones.
Figure 23B:
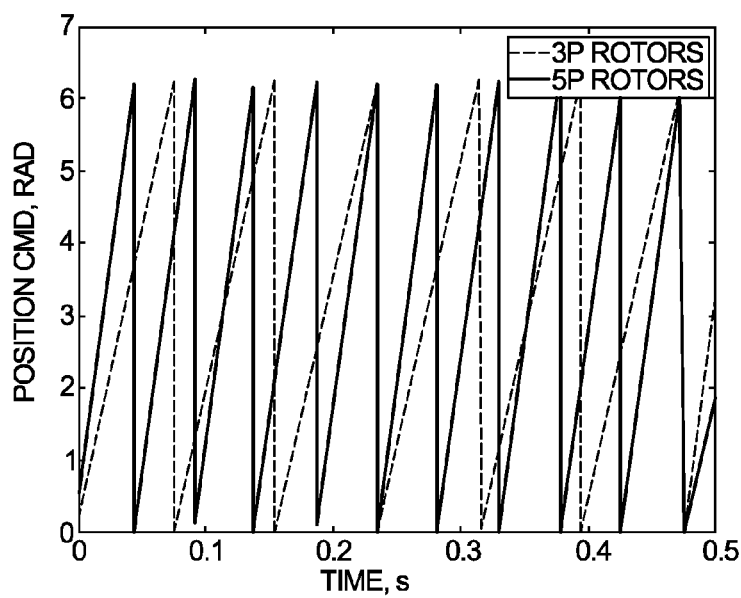
Figure 23C:
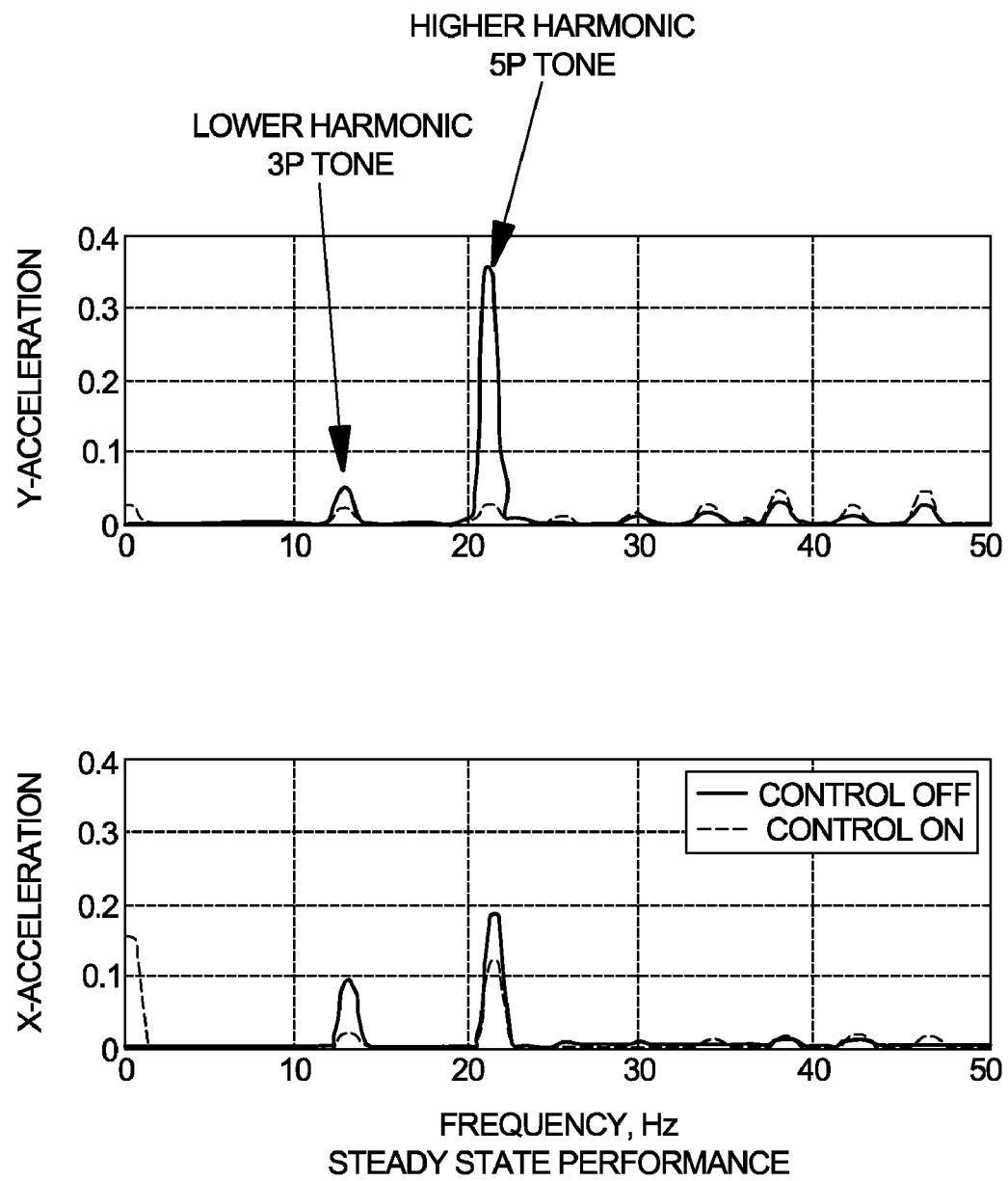

Preferably the first vibration frequency is a distinct rotating frame lower harmonic frequency from the second vibration frequency higher harmonic, and the first imbalance mass concentration rotor and the second imbalance mass concentration rotor is driven and controlled independently from the third imbalance mass concentration rotor and the fourth imbalance mass concentration rotor, preferably with the first imbalance mass concentration rotor and the second imbalance mass concentration rotor driven to rotate opposite of the hub assembly and the third and fourth rotors. Preferably the first vibration frequency lower harmonic is a distinct lower harmonic frequency 3 P tone from the second vibration frequency higher harmonic 5 P tone with respect to the 1 P rotating frame. FIG. 23A-C show simulated test data showing with the vibration control on the system inhibited the two distinct frequencies; the test was simulated using a stationary helicopter body and rotor hub with vibrations inputted into the rotor hub using controlled linear actuator disturbance force generators to simulate the in-flight helicopter rotating hub vibrations.

Preferably the first vibration frequency is a distinct lower harmonic frequency tone from the second vibration frequency tone, and the first imbalance mass concentration rotor rotational position control and the second imbalance mass concentration rotor rotational position control is segregated from the third imbalance mass concentration rotor rotational position control and the fourth imbalance mass concentration rotor rotational position control. Preferably the first imbalance mass concentration rotor rotational position control and the second imbalance mass concentration rotor rotational position control is segregated from the third imbalance mass concentration rotor rotational position control and the fourth imbalance mass concentration rotor rotational position control, preferably with the electronics control system 50 comprised of separate subsystems 50', 50".

Figure 24A:
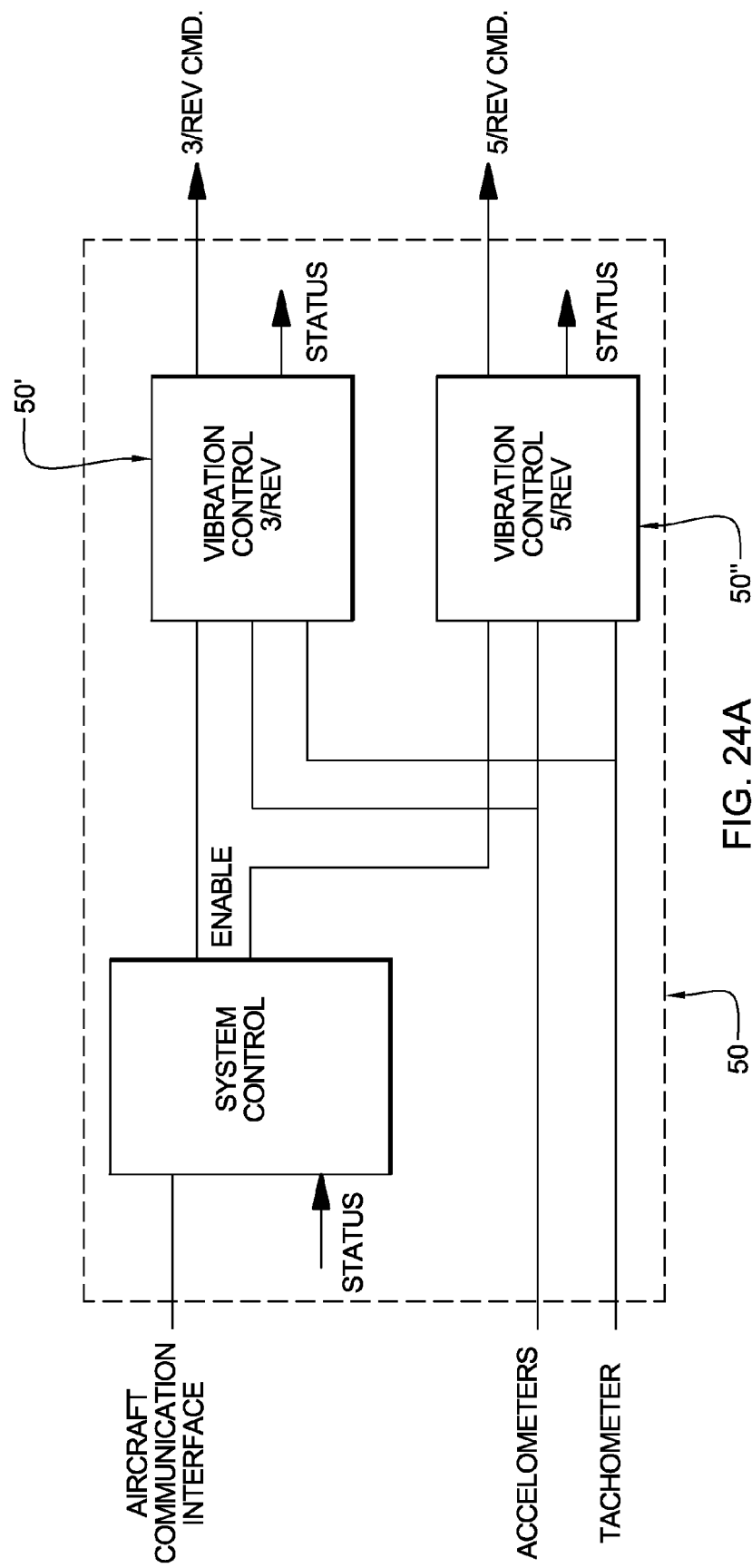
FIG. 24A-B illustrates methods/systems for controlling helicopter vibrations with a dual frequency HMVS with 3 Rev and 5 Rev control.
Figure 24B:
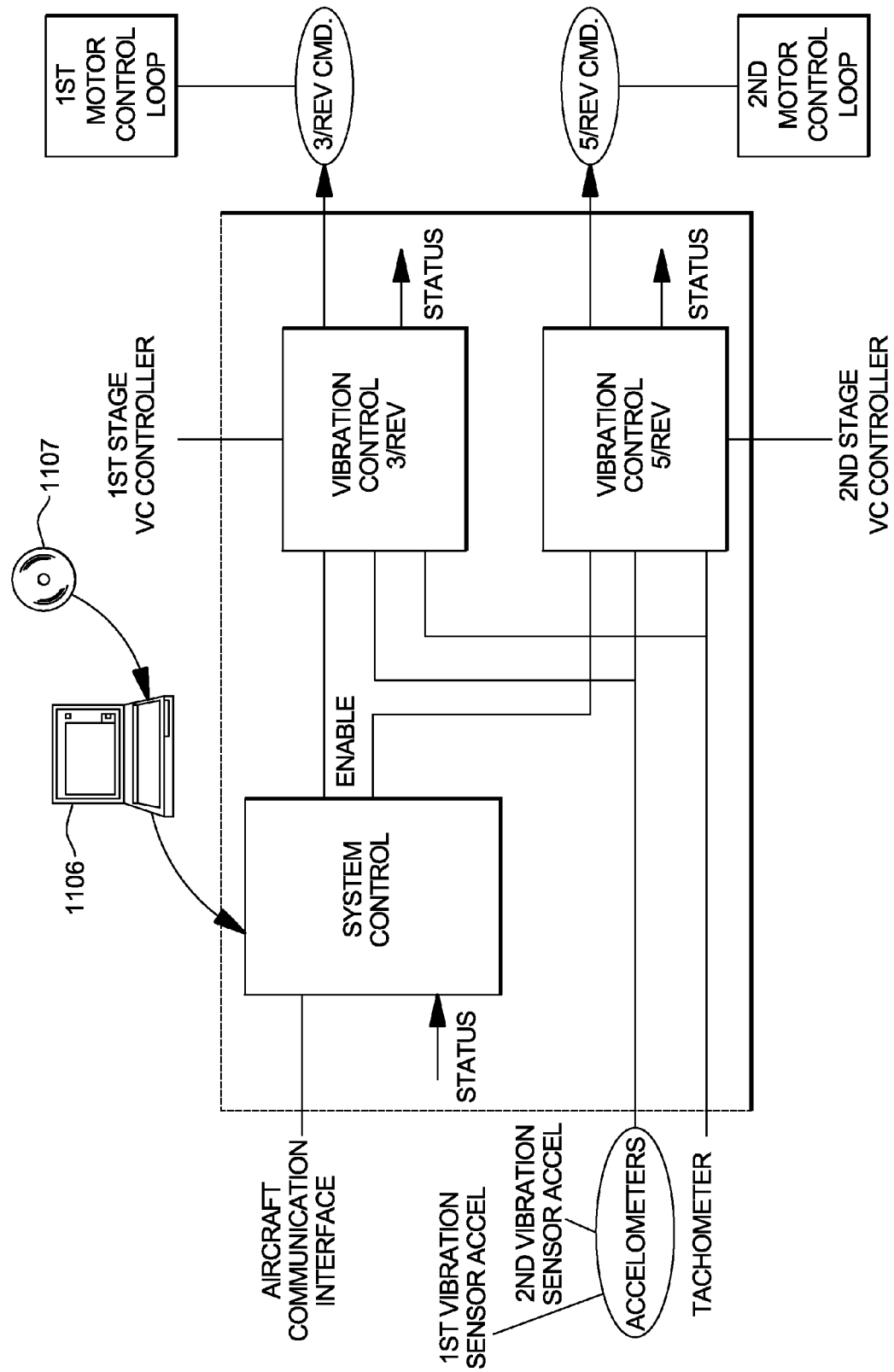

Preferably the vibration control system includes a tachometer input and a first rotation speed rotors stage VC controller for controlling the first imbalance mass concentration rotor rotational position and the second imbalance mass concentration rotor rotational position, and a second rotation speed rotors stage VC controller for controlling the third imbalance mass concentration rotor rotational position and the fourth imbalance mass concentration rotor rotational position. FIG. 24A-B illustrates a vibration control system with a tachometer input and a first rotation speed rotors stage VC controller for controlling the first imbalance mass concentration rotor rotational position and the second imbalance mass concentration rotor rotational position with 3/Rev commands (3 P commands) to a first motor control loop, and a second rotation speed rotors stage VC controller for controlling the third imbalance mass concentration rotor rotational position and the fourth imbalance mass concentration rotor rotational position with 5/Rev commands (5 P commands) to a second motor control loop.

Preferably the vibration control system includes a first rotation speed electronics control system subsystem 50' for controlling the first imbalance mass concentration rotor rotational position and the second imbalance mass concentration rotor rotational position, and a second rotation speed electronics control system subsystem 50" for controlling the third imbalance mass concentration rotor rotational position and the fourth imbalance mass concentration rotor rotational position. Preferably the vibration control system first rotation speed electronics control system subsystem 50' is a first rotation speed rotors 3 P stage VC controller for controlling the first imbalance mass concentration rotor rotational position and the second imbalance mass concentration rotor rotational position, and the second rotation speed electronics control system subsystem 50" is a second rotation speed rotors 5 P stage VC controller for controlling the third imbalance mass concentration rotor rotational position and the fourth imbalance mass concentration rotor rotational position.

Preferably the vibration control system includes a fault mode control protocol for controlling a rotation of the rotors during a sensed failure of the rotating assembly vibration control system, preferably with the system braking a failed rotor.

Preferably the first imbalance mass concentration is opposingly oriented to the second imbalance mass concentration during a first starting stopping rotation speed less than the first rotation speed and the third imbalance mass concentration is opposingly oriented to the fourth imbalance mass concentration during a second starting stopping rotation speed less than the second rotation speed.

In an embodiment the invention includes a computer program product in a storage medium for controlling a rotating vibration control system with a first imbalance mass concentration rotor, a second imbalance mass concentration rotor, a third imbalance mass concentration rotor, and a fourth imbalance mass concentration rotor. The computer program product includes a computer readable storage medium. The computer program product includes first program instructions for driving the first imbalance mass concentration rotor and the second imbalance mass concentration rotor at a first rotation speed vibration canceling rotation frequency while controlling the rotational position of the first imbalance mass concentration and the second imbalance mass concentration to produce a first net force vector to inhibit a first vibration frequency. Preferably the mass concentrations are controlled to inhibit a 3 P lower harmonic. The computer program product includes second program instructions for driving the third imbalance mass concentration rotor and the fourth imbalance mass concentration rotor at a second rotation speed vibration canceling rotation frequency while controlling the rotational position of the first imbalance mass concentration and the second imbalance mass concentration separate from the controlling of the first imbalance mass concentration and the second imbalance mass concentration to produce a second net force vector to inhibit a second vibration frequency. Preferably the mass concentrations are controlled to inhibit a 5 P higher harmonic. Preferably the computer program product includes program instructions opposingly orient the first imbalance mass concentration relative to the second imbalance mass concentration during a transitioning rotation speed, and the third imbalance mass concentration relative to the fourth imbalance mass concentration during a transitioning rotation speed. FIGS. 20A and 24B illustrate the computer program product in a storage medium 1107, such as a storage medium 1107 readable by a computer 1106 and up loadable into the electronics control system 50 and subsystems 50', 50", with the electronics control system 50 and subsystems 50', 50" utilizing such instructions.

Preferably the computer program instructions include program instructions for calculating rotational positions of the third and fourth imbalance mass concentration rotors independently of the first and second imbalance mass concentration rotor positions.

Preferably the computer program instructions include program instructions for monitoring a tachometer input signal, and maintaining an opposing orientation of the first imbalance mass concentration and the second imbalance mass concentration.

Preferably a fault mode control protocol for controlling a rotation of the rotors during a sensed failure of the rotating vibration control system, preferably with instructions for braking a failed rotor. Preferably the fault mode control protocol includes instructions for monitoring a sensor signal and detecting a first rotor failure. Preferably the fault mode control protocol includes instructions for monitoring a sensor signal and detecting a second rotor failure. Preferably the fault mode control protocol includes instructions for monitoring a sensor signal and detecting a third rotor failure. Preferably the fault mode control protocol includes instructions for monitoring a sensor signal and detecting a fourth rotor failure.

Preferably the computer program instructions include program instructions to monitor a plurality of sensor signals. Preferably the computer program instructions include program instructions to monitor a plurality of accelerometers housed in the housing 30. Preferably the computer program instructions include program instructions to monitor a plurality of prefer position sensors housed in the housing a sensing the position of the rotors 38, 44, 38', 44', preferably Hall sensors. Preferably the computer program instructions include program instructions to monitor a plurality of fault sensors and health monitor sensors.

In an embodiment the invention includes computer program product in a storage medium for controlling a rotating assembly vibration control system. The computer program product including a computer readable storage medium. The computer program product including first program instructions to control a rotation of a first rotor and a rotation of a second rotor. The computer program product including second program instructions to monitor a plurality of sensor signals. The computer program product including third program instructions to control the rotation speed, rotation direction and phase of the first rotor and the rotation speed, rotation direction and phase of the second rotor to minimize a first monitored vibration frequency sensor signal. The computer program product including fourth program instructions to control a rotation of a third rotor and a rotation of a fourth rotor. The computer program product including fifth program instructions to monitor a plurality of sensor signals. The computer program product including sixth program instructions to control the rotation speed, rotation direction and phase of the third rotor and the rotation speed, rotation direction and phase of the fourth rotor to minimize a second monitored vibration frequency sensor signal.

Preferably the computer program product includes below speed program instructions, the below speed program instructions providing commands to opposingly orient the first rotor first imbalance mass concentration relative to the second rotor second imbalance mass concentration when the speed is below the vibration control rotation speed, preferably when starting and stopping the system. Preferably the computer program product includes below speed program instructions, the below speed program instructions providing commands to opposingly orient the third rotor first imbalance mass concentration relative to the fourth rotor second imbalance mass concentration when the speed is below the vibration control rotation speed, preferably when starting and stopping the system.

In an embodiment the invention includes a rotating vibration control system for a rotating assembly having at least a first vibration frequency operational vibration and at least a second vibration frequency operational vibration. The rotating vibration control system includes a first rotor with a first imbalance mass concentration, the first rotor driven to rotate at a first rotation speed greater than an operational rotation frequency of the rotating assembly, preferably in a counter rotating direction, with rotation opposing rotation of the rotating assembly. The rotating vibration control system includes a second rotor with a second imbalance mass concentration, the second rotor driven to rotate at the first rotation speed greater than an operational rotation frequency of the rotating assembly, preferably in the counter rotating direction, opposing the rotation of the rotating assembly. The rotating vibration control system includes a third rotor with a third imbalance mass concentration, the third rotor driven to rotate at a second rotation speed greater than an operational rotation frequency of the rotating assembly, preferably in a co-rotating direction, rotating with the rotation of the rotating assembly. The rotating vibration control system includes a fourth rotor with a fourth imbalance mass concentration, the fourth rotor driven to rotate at the second rotation speed greater than an operational rotation frequency of the rotating assembly in the co-rotating direction with the rotation of the rotating assembly.

The rotating vibration control system includes at least a first vibration sensor for producing a plurality of first vibration sensor signals. The rotating vibration control system includes at least a second vibration sensor for producing a plurality of second vibration sensor signals. The rotating vibration control system includes a first rotor rotational position sensor a second rotor rotational position sensor, a third rotor rotational position sensor, and a fourth rotor rotational position sensor, preferably Hall effect sensors sensing the four rotor positions. The rotating vibration control system preferably includes a first motor control loop for controlling the rotation of the first rotor and the rotation of the second rotor and receives first stage VC controller motor commands. The rotating vibration control system preferably includes a first vibration control loop first rotation speed stage VC controller for controlling rotors and providing commands to the first motor control loop to minimize the first vibration sensor signals and the second vibration sensor signals. The rotating vibration control system preferably includes a second motor control loop for controlling the rotation of the third rotor and the rotation of the fourth rotor and receives second stage VC controller motor commands. The rotating vibration control system preferably includes a second vibration control loop second rotation speed stage VC controller for controlling rotors and providing commands to the second motor control loop to minimize the first vibration sensor signals and the second vibration sensor signals. Preferably the second vibration control loop second stage VC controller commands the second motor control loop independent of the first vibration control loop first stage VC controller.

Preferably the motor control loops close a control loop around the respective motors based on respective rotor position feedback derived from the rotor rotational position sensors. Preferably the system includes a soft start stop control subsystem, the soft start stop control subsystem providing commands to opposingly orient the first imbalance mass concentration relative to the second imbalance mass concentration, and the third imbalance mass concentration opposing the fourth.

Preferably the soft start stop control subsystem includes program instructions to opposingly orient the first imbalance mass concentration relative to the second imbalance mass concentration during a rotation speed ramp up, and the third imbalance mass concentration opposing the fourth.

Preferably the soft start stop control subsystem includes program instructions to opposingly orient the first imbalance mass concentration relative to the second imbalance mass concentration during a rotation speed ramp down, and the third imbalance mass concentration opposing the fourth.

In an embodiment the invention includes a rotary wing aircraft rotating hub mounted vibration control system for a rotary wing hub having at least a first and a second vibration frequency while rotating at a rotary wing operational rotation frequency. The rotating hub mounted vibration control system is comprised of: a system housing, the system housing attached to the rotary wing hub and rotating with the rotary wing hub at the operational rotation frequency. Preferably the housing has an electronics housing cavity subsystem and an adjacent coaxial rotor housing cavity subsystem, the rotor housing cavity subsystem containing the rotors.

The housing housing a first coaxial ring motor having a first rotor with a first imbalance mass concentration, a second coaxial ring motor having a second rotor with a second imbalance mass concentration.

The housing housing a third coaxial ring motor having a third rotor with a third imbalance mass concentration, a fourth coaxial ring motor having a fourth rotor with a fourth imbalance mass concentration.

The housing housing an electronics control system for controlling the vibration control system, preferably with computer electronics which utilize computer medium to operate and execute program instructions from computer program products, which are storagable on and loadable from computer storage medium.

The electronics control system includes a first rotation speed rotor stage VC controller electronics control subsystem for controlling a rotational position of the first imbalance mass concentration rotor and a rotational position of the second imbalance mass concentration rotor, the first rotation speed rotor stage VC controller electronics control subsystem controlling a speed and a phase of the first coaxial ring motor and the second coaxial ring motor such that the first imbalance mass concentration and the second imbalance mass concentration are directly driven at a whole number multiple vibration canceling rotation frequency greater than the operational rotation frequency wherein the first rotary wing hub vibration frequency is reduced.

The electronics control system includes a second rotation speed rotor stage VC controller electronics control subsystem for controlling a rotational position of the third imbalance mass concentration rotor and a rotational position of the fourth imbalance mass concentration rotor, the second rotation speed rotor stage VC controller electronics control subsystem controlling a speed and a phase of the third coaxial ring motor and the fourth coaxial ring motor such that the third imbalance mass concentration and the fourth imbalance mass concentration are directly driven at a whole number multiple vibration canceling rotation frequency greater than the operational rotation frequency wherein the second helicopter rotary wing hub vibration frequency is reduced.

Preferably first rotation speed rotor stage VC controller electronics control subsystem is separate from the second rotation speed rotor stage VC controller electronics control subsystem, preferably two subsystems control their rotors independently of the other rotors, preferably the location of the first and second rotors does not directly depend on the location of the third and fourth.

Preferably the first rotation speed rotor stage VC controller electronics control subsystem is physically separate from the second rotation speed rotor stage VC controller electronics control subsystem, preferably stacked in at least two electronics layers, preferably the electronics are housed proximate the center axis of rotation, proximate the housing ID, distal from housing OD. Preferably the rotors are stacked in layers, and the electronics subsystems are stacked in layers, the electronics proximate the housing ID and the rotors proximate the housing OD.

In an embodiment the invention includes a method of controlling a plurality of vibration frequencies of an aircraft with a rotary hub which rotates at an operational rotation frequency. The method includes providing an annular ring housing containing a first coaxial ring motor having a first rotor with a first imbalance mass concentration, a second coaxial ring motor having a second rotor with a second imbalance mass concentration, a third coaxial ring motor having a third rotor with a third imbalance mass concentration, a fourth coaxial ring motor having a fourth rotor with a fourth imbalance mass concentration, and an electronics control system for controlling the vibration control system. Preferably the electronics control system computer electronics execute program instructions from computer program products, which are storagable on and loadable from computer storage medium, the electronics control system including a first rotation speed rotor stage VC controller electronics control subsystem for controlling a rotational position of the first imbalance mass concentration rotor and a rotational position of the second imbalance mass concentration rotor, the electronics control system including a second rotation speed rotor stage VC controller electronics control subsystem for controlling a rotational position of the third imbalance mass concentration rotor and a rotational position of the fourth imbalance mass concentration rotor.

The method includes securing the annular ring housing to the rotary hub with the annular ring housing rotating at the operational rotation frequency with the rotary hub, driving the first rotor and the second rotor at a first whole number multiple vibration canceling rotation frequency greater than the operational rotation frequency while controlling the rotational position of the first imbalance mass concentration and the second imbalance mass concentration in order to produce a first rotating net force vector to inhibit a first vibration frequency, and driving the third rotor and the fourth rotor at a second whole number multiple vibration canceling rotation frequency greater than the operational rotation frequency while controlling the rotational position of the third imbalance mass concentration and the fourth imbalance mass concentration in order to produce a second rotating net force vector to inhibit a second vibration frequency.

Preferably the first rotation speed rotor stage VC controller electronics control subsystem controls a speed and a phase of the first coaxial ring motor and the second coaxial ring motor such that the first imbalance mass concentration and the second imbalance mass concentration are directly driven at a whole number multiple vibration canceling rotation frequency greater than the operational rotation frequency wherein the first rotary wing hub vibration is reduced independent from the second rotation speed rotor stage VC controller electronics control subsystem controlling the speed and phase of the third coaxial ring motor and the fourth coaxial ring motor such that the third imbalance mass concentration and the fourth imbalance mass concentration are directly driven at a whole number multiple vibration canceling rotation frequency greater than the operational rotation frequency wherein the second helicopter rotary wing hub vibration is reduced.

Figure 25A:
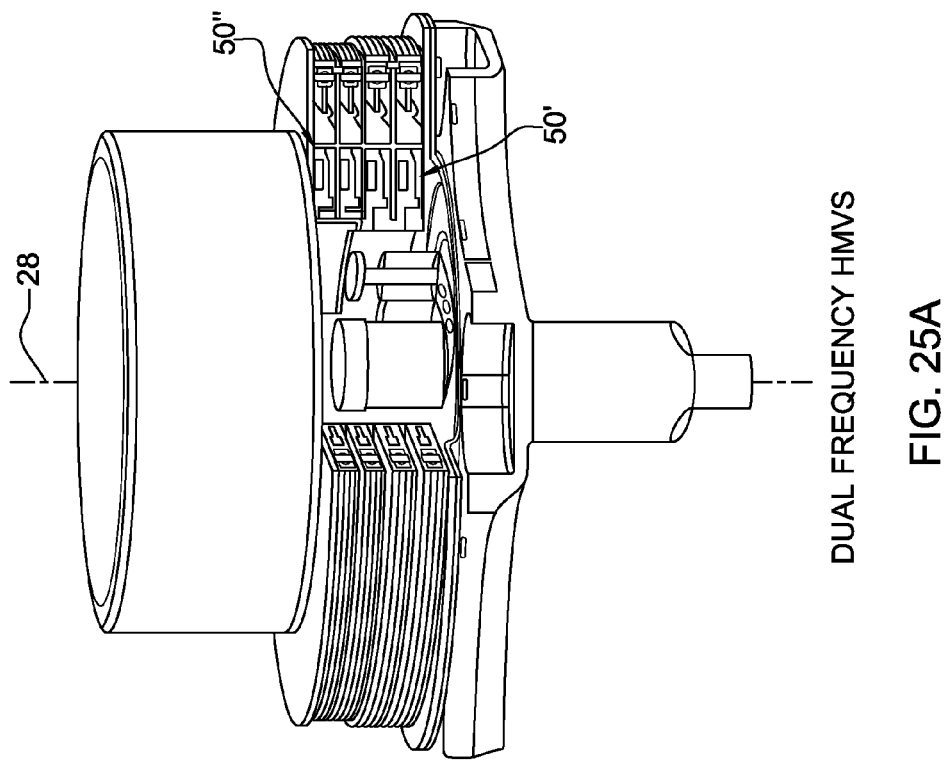
FIG. 25A-C illustrates dual frequency (3 P and 5 P) HMVS for a helicopter rotor head.
Figure 26A:
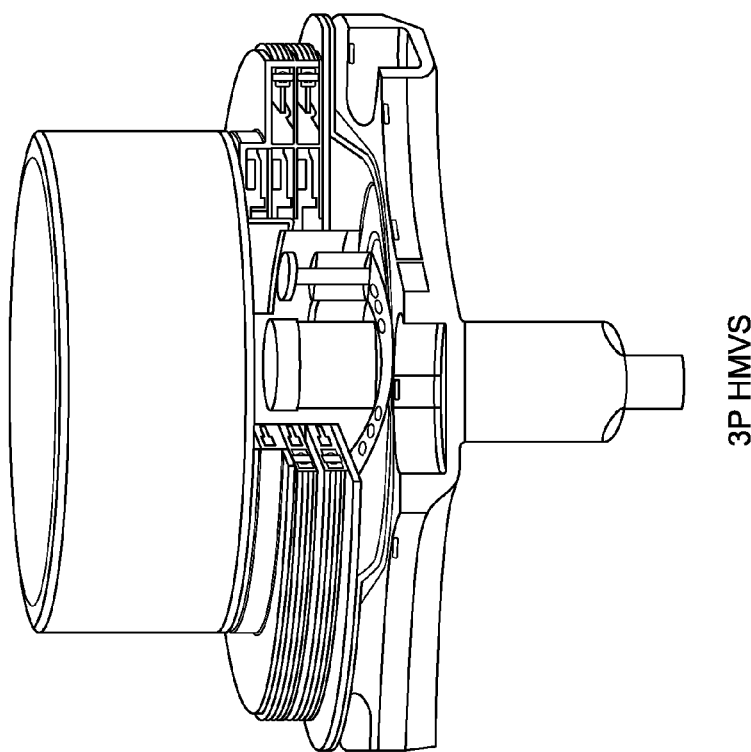
FIG. 26A-B illustrates a single frequency (3 P) HMVS for a helicopter rotor head.
Figure 25B:
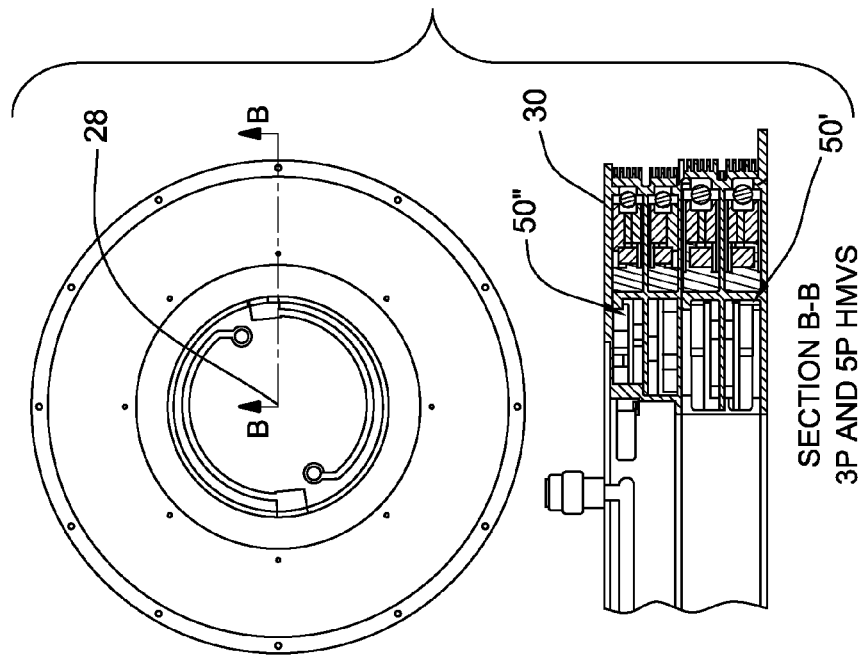
Figure 26B:
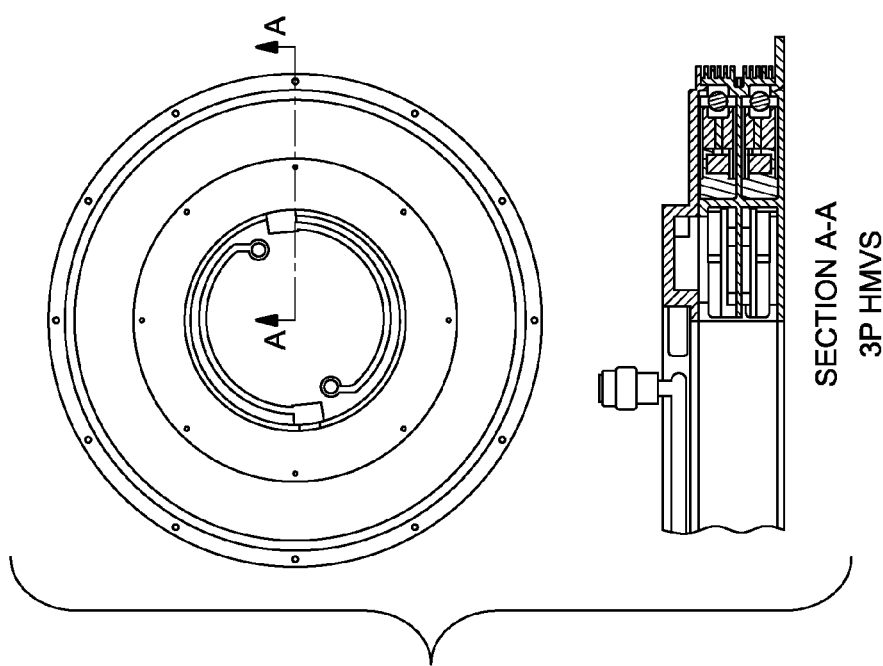
Figure 25C:
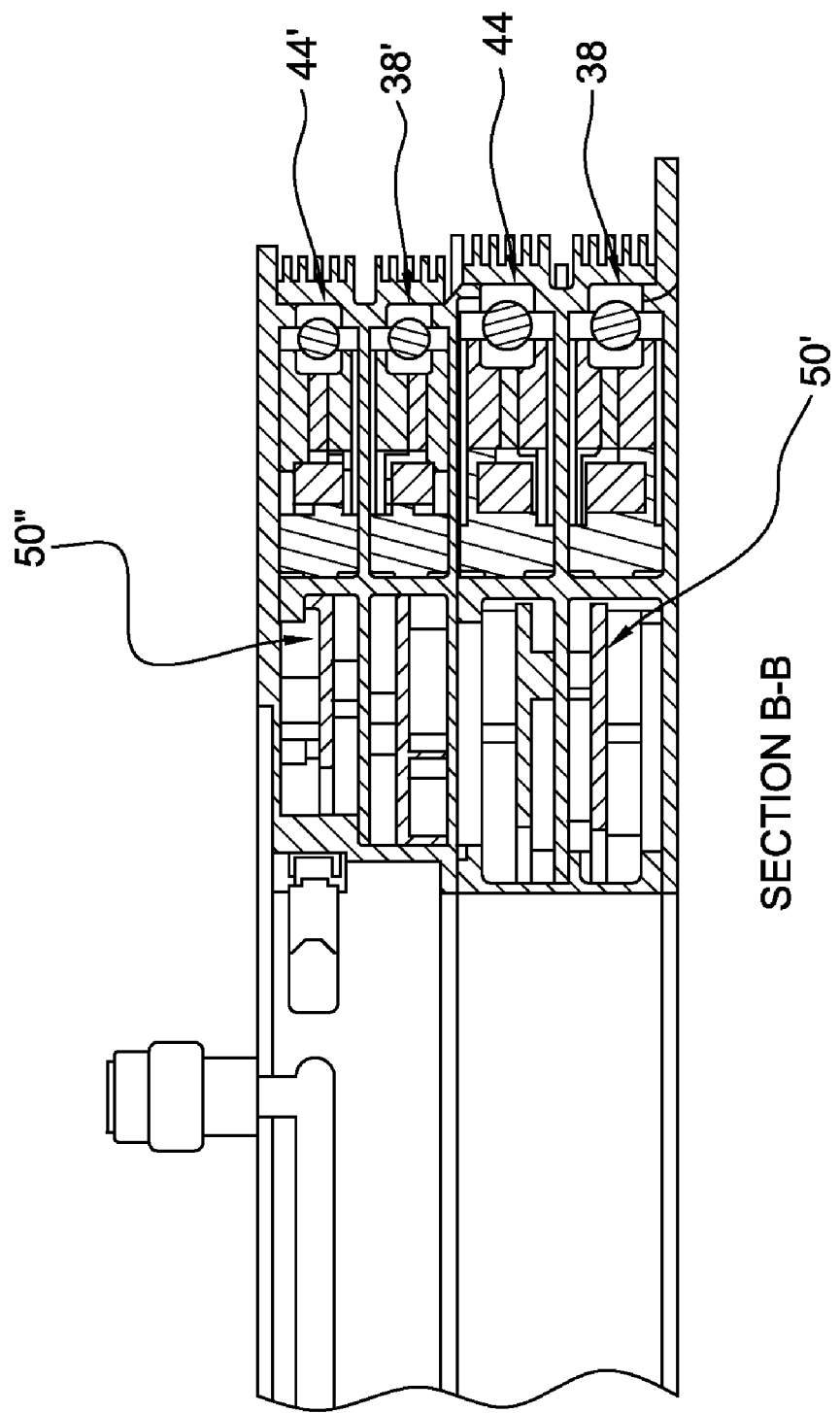
Figure 27A:
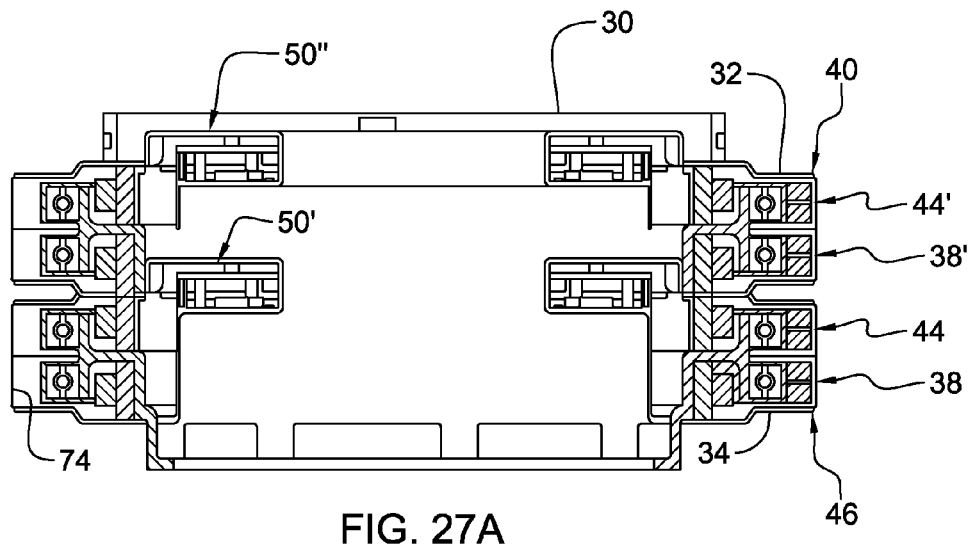
FIG. 27A-B illustrates a dual frequency HMVS for a helicopter rotor head.
Figure 27B:
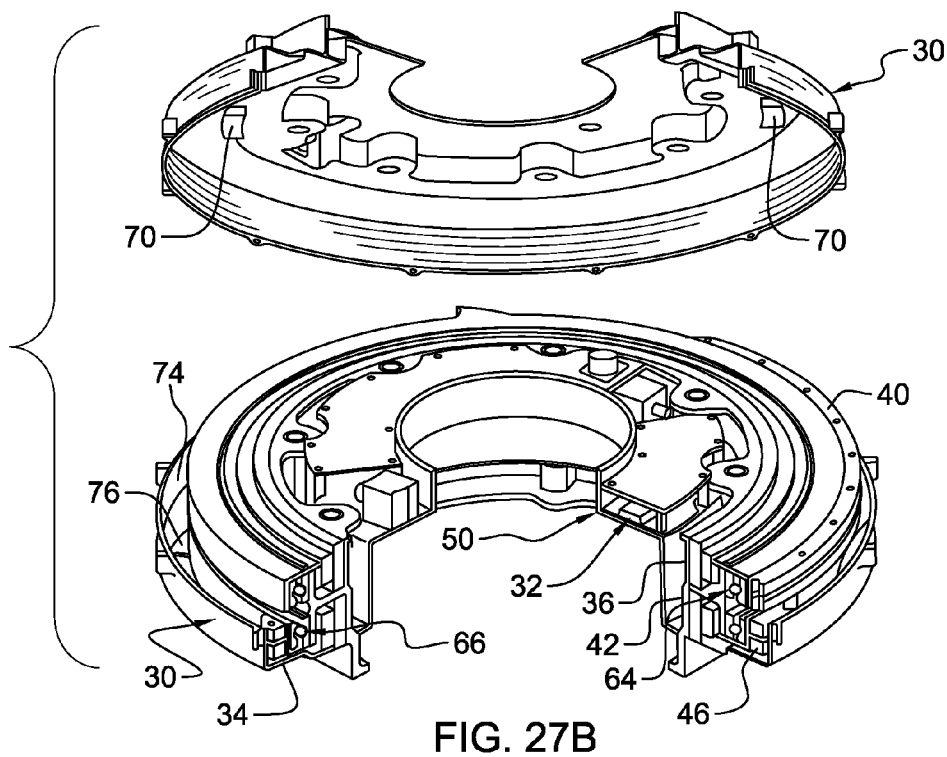
Figure 28A:
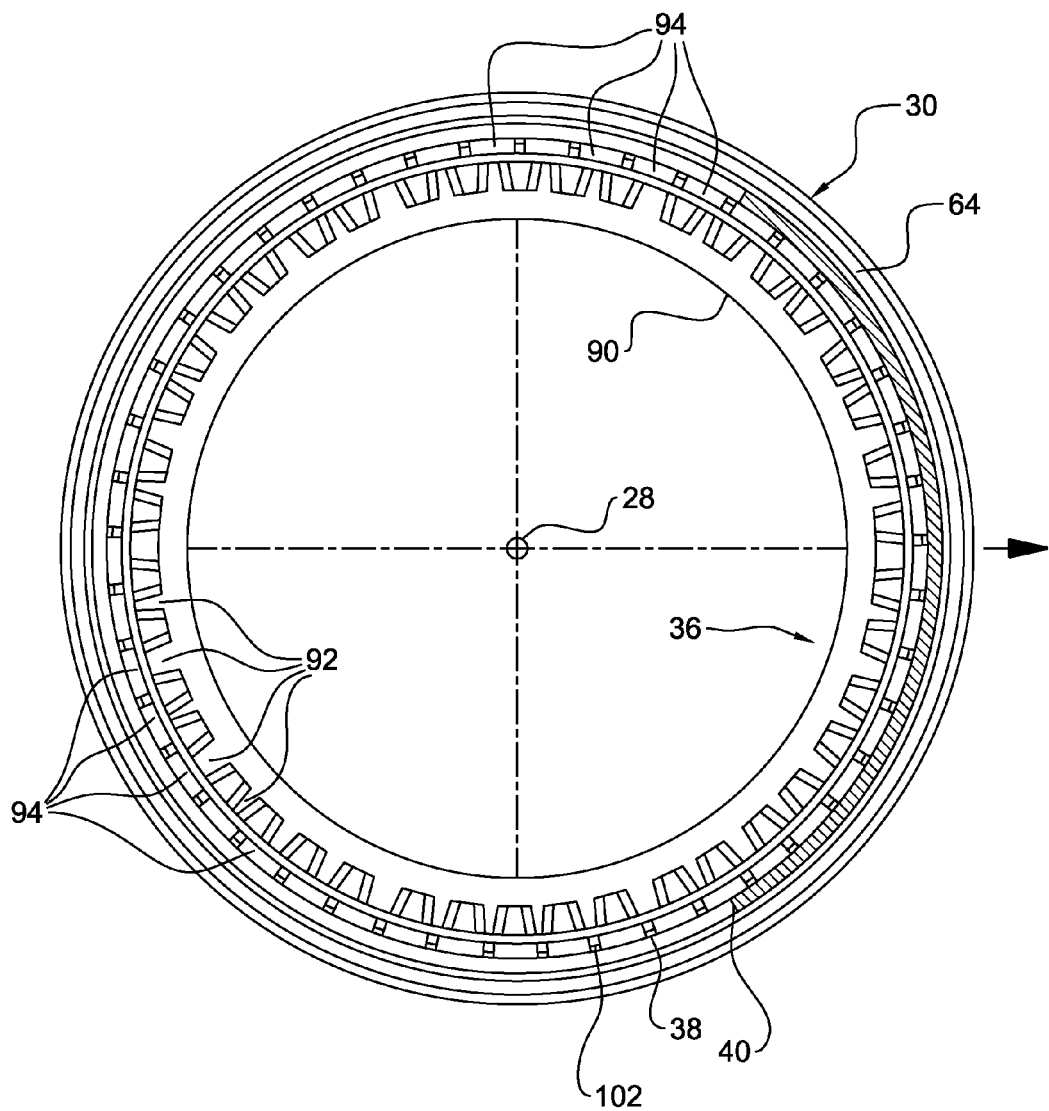
FIG. 28A-D illustrates HMVS imbalance rotors for generating two frequencies.
Figure 28B:
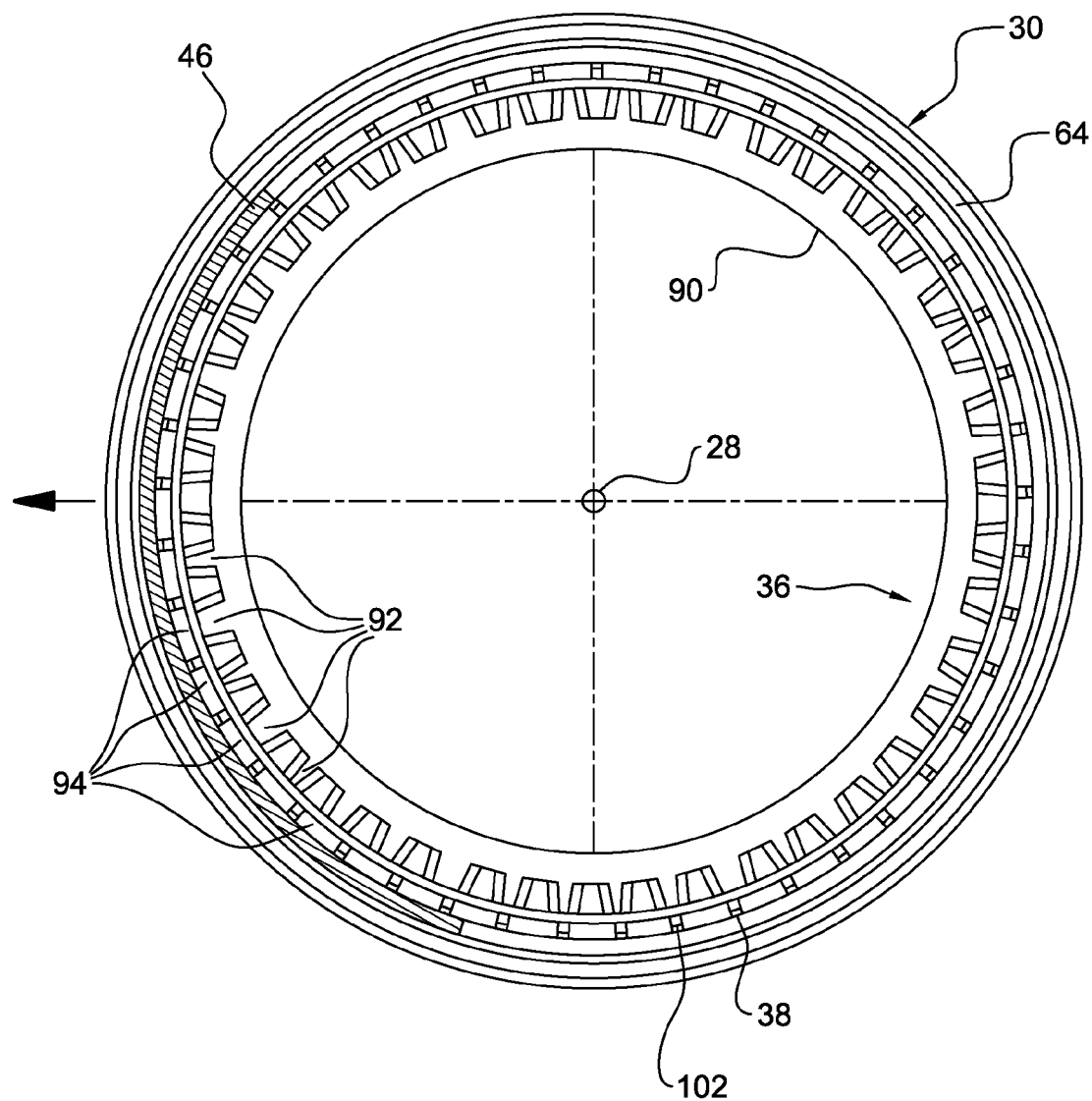
Figure 28C:
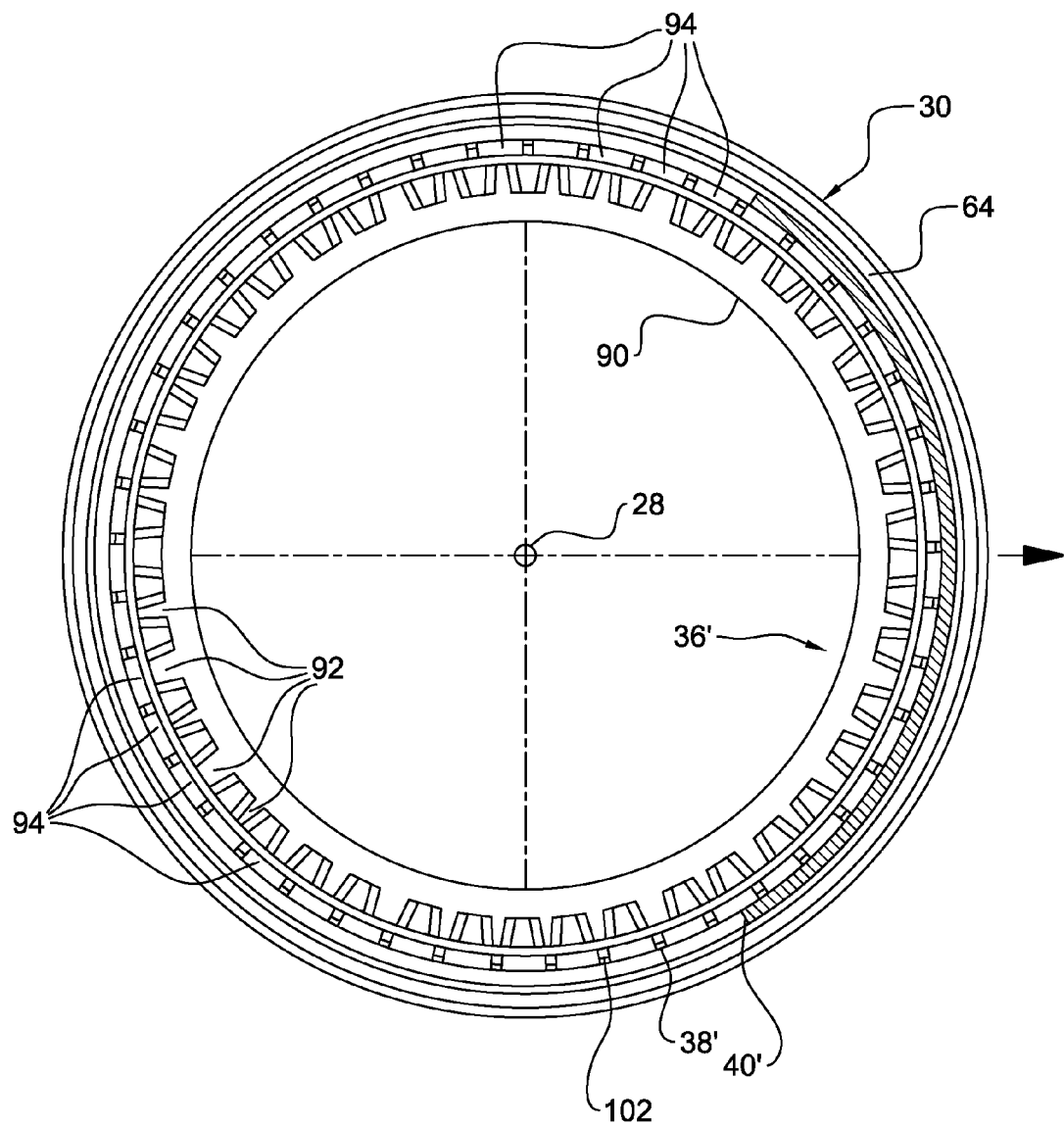
Figure 28D:
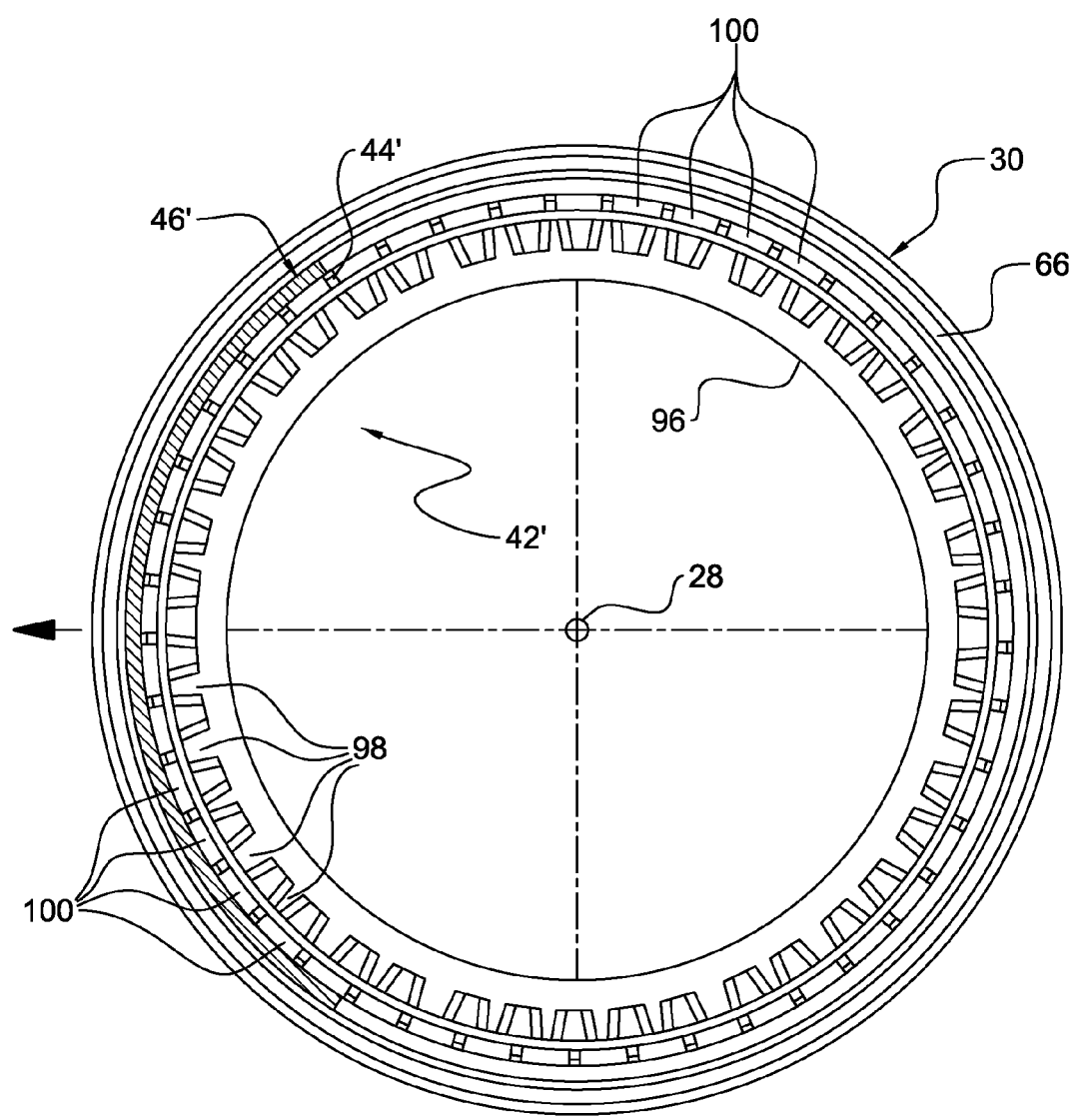
Figure 29:
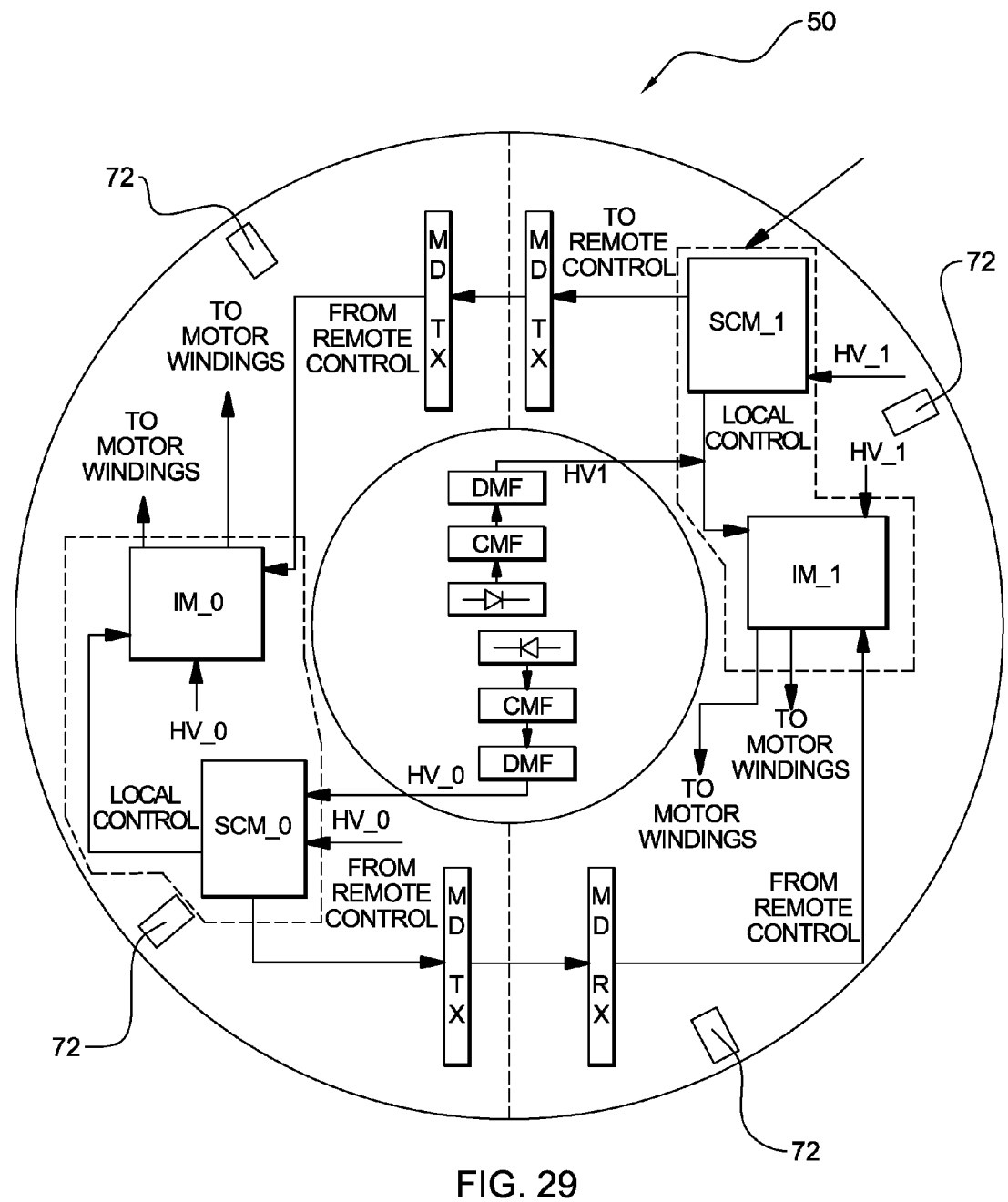
FIG. 29 illustrates HMVS control methods/systems.
Figure 30A:
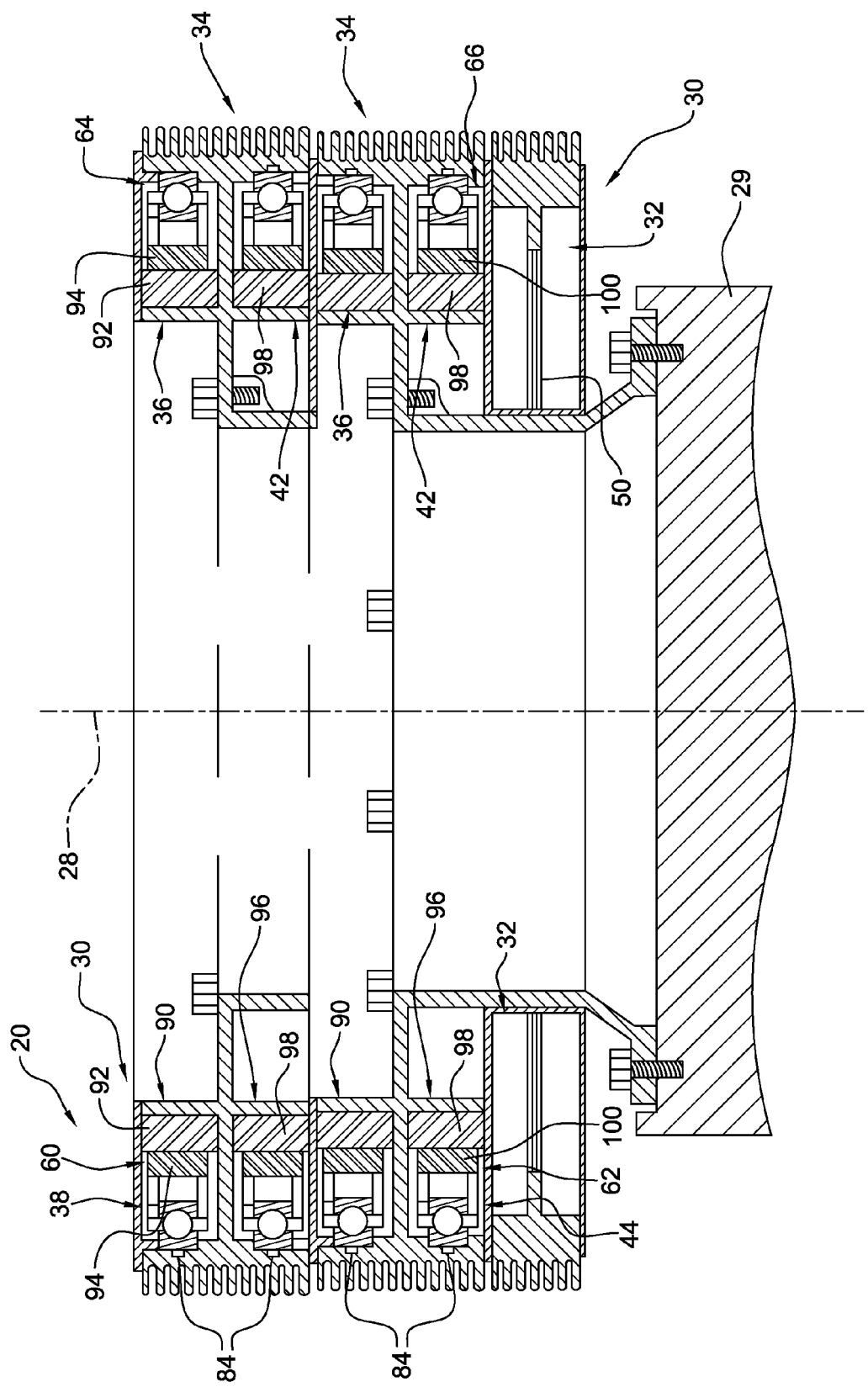
FIG. 30A-B illustrates a dual frequency HMVS on a helicopter rotor head.
Figure 30B:
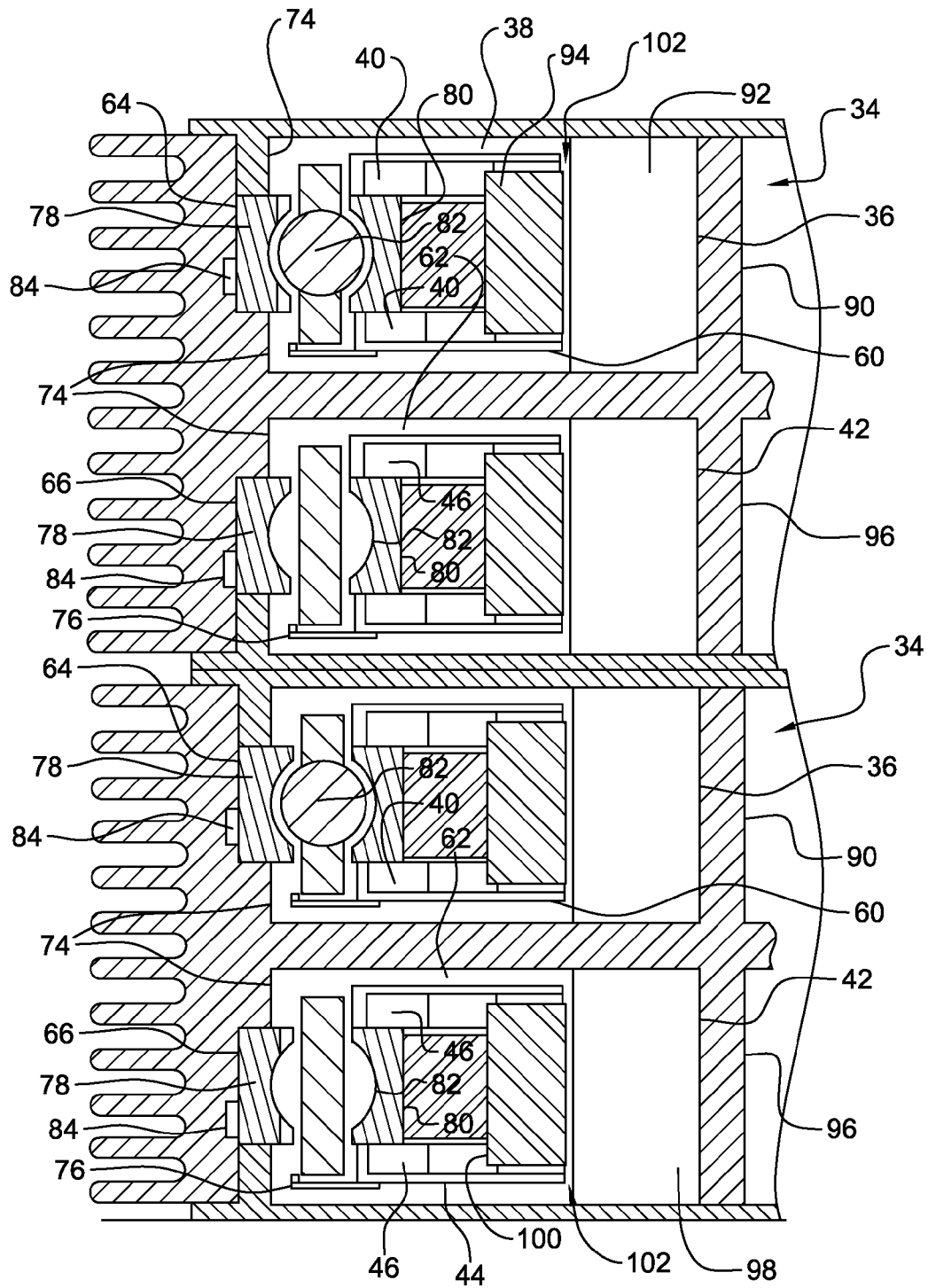
Figure 31:
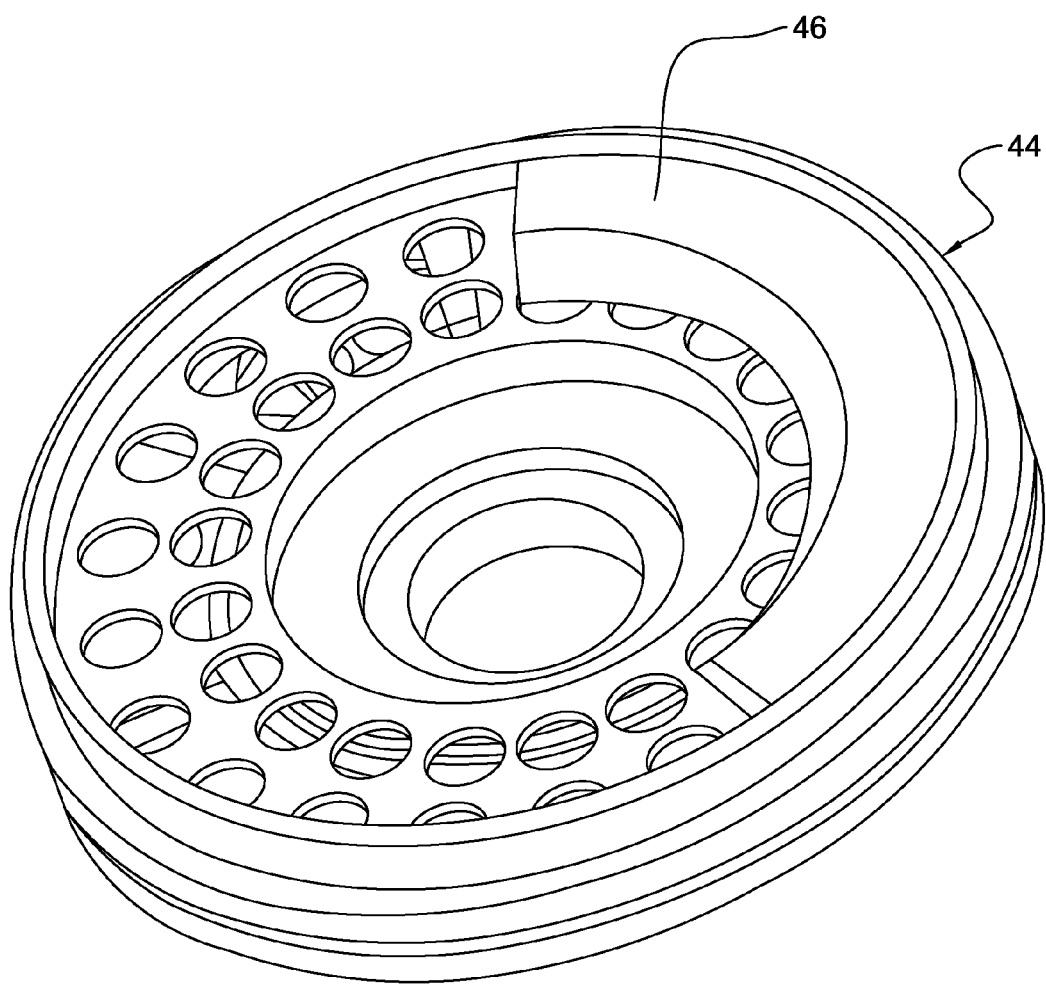
FIG. 31 illustrates an imbalance rotor with an imbalance mass concentration.
Figure 32:
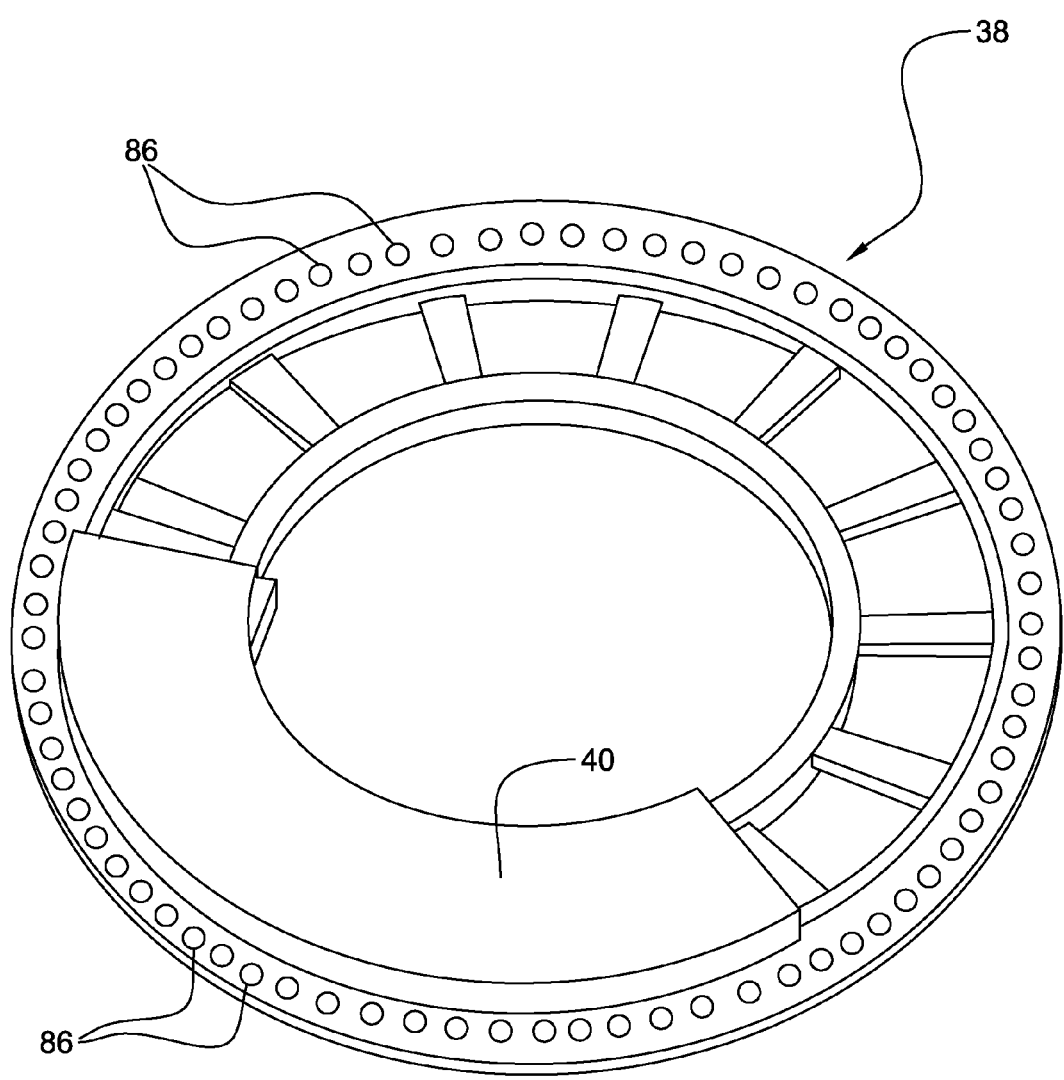
FIG. 32 illustrates an imbalance rotor with an imbalance mass concentration.

FIGS. 25 and 26 illustrate embodiments of the invention. FIG. 25A-C show the stacking of the imbalance rotors and motors, and the stacking of the separate electronics control subsystems 50', 50". Preferably the stages are vertically stackable and separate, preferably with the electronics controls proximate the axis 28 and the housing ID and the rotor imbalance masses proximate the housing OD and distal from the axis 28. As a comparison between FIGS. 25 and 26 shows, the vertically stackable stages are preferably separate, and in a preferred embodiment the first stage is used solely and separate as shown in FIG. 25. FIG. 27A-B illustrates another embodiment of the invention with the stacking of the stages. FIG. 27B illustrates an embodiment of sensing the position of rotors and the imbalance mass with sensors 70, contained within the housing 30, with the sensors 70 position and mounted to provided position information regarding the rotational position of the imbalance mass being controlled. In an embodiment an inner motor control loop closes a control loop around the motors driving the rotors based on rotor motor position feedback derived from motor position sensors 70, preferably from the rotor magnetic encoder rotor position sensor read heads 70, preferably a Hall sensor. The inner loop servos the position of the motor to track commands sent from the vibration control stage VC controller such as the Rev Cmd. In FIG. 24 preferably these commands are in the form of a phase with respect to the provided tachometer signal input. FIG. 28A-D illustrate embodiments of the invention. FIG. 28A shows a first motor 36 with first imbalance rotor 38 with first imbalance rotor eccentric mass concentration 40. FIG. 28B shows a second motor 42 with second imbalance rotor 44 with second imbalance rotor eccentric mass concentration 46. FIG. 28C shows a third motor 36' with third imbalance rotor 38' with third imbalance rotor eccentric mass concentration 40'. FIG. 28D shows a fourth motor 42' with fourth imbalance rotor 44' with fourth imbalance rotor eccentric mass concentration 46'. FIG. 29 illustrates an embodiment of an electronics control system 50 for housing in the annular housing, with the electronics control system 50 circuit board including orthogonally positioned accelerometers 72, with the vibration sensor accelerometer hardware 72 providing orthogonal acceleration vibration signals. FIG. 30A-B illustrates another embodiment of the invention with the stacking of the rotor stages. In FIG. 30A the electronics control system 50 is shown stacked below the lower rotor. FIG. 31-32 illustrate further embodiments of imbalance rotors with imbalance mass concentrations.

In embodiments the invention includes a rotary wing aircraft, the rotary wing aircraft having a nonrotating aerostructure body and a rotating rotary wing hub, the rotary wing aircraft including a vehicle vibration control system, a rotating hub mounted vibration control system, the rotating hub mounted vibration control system mounted to the rotating rotary wing hub with the rotating hub mounted vibration control system rotating with the rotating rotary wing hub, a rotary wing aircraft member sensor for outputting rotary wing aircraft member data correlating to the relative rotation of the rotating rotary wing hub member rotating relative to the nonrotating body, at least a first nonrotating body vibration sensor, the at least first nonrotating body vibration sensor outputting at least first nonrotating body vibration sensor data correlating to vibrations, at least a first nonrotating body circular force generator, the at least a first nonrotating body circular force generator fixedly coupled with the nonrotating body, a distributed force generation data communications network link, the distributed force generation data communications system network link linking together at least the first nonrotating body circular force generator and the rotating hub mounted vibration control system wherein the rotating hub mounted vibration control system and the first nonrotating body circular force generator communicate force generation vibration control data through the distributed force generation data communications network, the at least first nonrotating body circular force generator controlled to produce a rotating force with a controllable rotating force magnitude and a controllable rotating force phase, the controllable rotating force magnitude controlled from a minimal force magnitude up to a maximum force magnitude, and with the controllable rotating force phase controlled in reference to the rotary wing aircraft member sensor data correlating to the relative rotation of the rotating rotary wing hubrotating relative to the nonrotating body wherein the vibration sensed by the at least first nonrotating body vibration sensor is reduced.

In embodiments the invention includes a aircraft vibration control system, for a aircraft vehicle having a nonrotating aerostructure body and a rotating rotary wing hub, including, a rotating hub mounted vibration control system, the rotating hub mounted vibration control system mounted to the rotating rotary wing hub with the rotating hub mounted vibration control system rotating with the rotating rotary wing hub, a rotary wing aircraft member sensor for outputting rotary wing aircraft member data correlating to the relative rotation of the rotating rotary wing hub member rotating relative to the nonrotating body, at least a first nonrotating body vibration sensor, the at least first nonrotating body vibration sensor outputting at least first nonrotating body vibration sensor data correlating to vibrations, at least a first nonrotating body force generator, the at least first nonrotating body force generator fixedly coupled with the nonrotating body, a distributed force generation data communications network serial link, the distributed force generation data communications system network serial link linking together at least the first nonrotating body force generator and the rotating hub mounted vibration control system wherein the rotating hub mounted vibration control system and the first nonrotating body force generator communicate and share force generation vibration control data through the distributed force generation data communications network, the at least first nonrotating body force generator controlled to produce a force with a controllable magnitude and a controllable phase, the controllable force magnitude controlled from a minimal force magnitude up to a maximum force magnitude, and with the controllable force phase controlled in reference to the rotary wing aircraft member sensor data correlating to the relative rotation of the rotating rotary wing hub rotating relative to the nonrotating body and the rotating hub mounted vibration control system includes at least a first hub mounted vibration control system rotor with a first imbalance mass concentration, the first hub mounted vibration control system rotor driven to rotate at a first rotation speed greater than an operational rotation frequency of the rotating rotary wing hub, and at least a second hub mounted vibration control system rotor with a second imbalance mass concentration, the second hub mounted vibration control system rotor driven to rotate at the first rotation speed greater than the operational rotation frequency of the rotating rotary wing hub, wherein the vibration sensed by the at least first nonrotating body vibration sensor is reduced.

In embodiments the invention includes a aircraft vibration control system, for a aircraft vehicle having a nonrotating aerostructure body and a rotating rotary wing hub, including, a rotating hub mounted means for controlling vibrations, the rotating hub mounted means for controlling vibrations mounted to the rotating rotary wing hub with the rotating hub mounted means for controlling vibrations rotating with the rotating rotary wing hub, a rotary wing aircraft member sensor for outputting rotary wing aircraft member data correlating to the relative rotation of the rotating rotary wing hub member rotating relative to the nonrotating body, at least a first nonrotating body vibration sensor, the at least first nonrotating body vibration sensor outputting at least first nonrotating body vibration sensor data correlating to vibrations, at least a first nonrotating body force generator, the at least first nonrotating body force generator fixedly coupled with the nonrotating body, a means for linking together the first nonrotating body force generator and the rotating hub mounted means for controlling vibrations wherein the rotating hub mounted means for controlling vibrations and the first nonrotating body force generator communicate and share force generation vibration control data through the means for linking, the at least first nonrotating body force generator controlled to produce a force with a controllable magnitude and a controllable phase, the controllable force magnitude controlled from a minimal force magnitude up to a maximum force magnitude, and with the controllable force phase controlled in reference to the rotary wing aircraft member sensor data correlating to the relative rotation of the rotating rotary wing hub rotating relative to the nonrotating body and, wherein the vibration sensed by the at least first nonrotating body vibration sensor is reduced.

In embodiments the invention includes a vehicle vibration control system for controlling troublesome vibrations in a nonrotating vehicle body having a rotating machine member, the vehicle vibration control system including a vehicle vibration control system controller, a rotating machine member sensor, for inputting vehicle rotating machine member data correlating to a relative rotation of the rotating machine member rotating relative to the nonrotating body into the vehicle vibration control system controller, at least a first nonrotating vehicle body vibration sensor, the at least first nonrotating vehicle body vibration sensor inputting at least first nonrotating vehicle body vibration sensor data correlating to vehicle vibrations into the vehicle vibration control system controller, at least a first nonrotating vehicle body circular force generator, the at least a first nonrotating vehicle body circular force generator for fixedly mounting to the nonrotating vehicle body wherein the at least first nonrotating vehicle body circular force generator is controlled by the controller to produce a rotating force with a controllable rotating force magnitude and a controllable rotating force phase, the controllable rotating force magnitude controlled from a minimal force magnitude up to a maximum force magnitude, and with the controllable rotating force phase controlled in reference to the vehicle rotating machine member sensor data correlating to the relative rotation of the vehicle rotating machine member rotating relative to the nonrotating vehicle body with the vehicle vibration sensed by the at least first nonrotating vehicle body vibration sensor reduced by the controller, and a hub mounted vibration control system, the hub mounted vibration control system linked with the vehicle vibration control system controller.

In embodiments the invention includes a method of controlling vibration, the method including, providing at least a first nonrotating vehicle body circular force generator, fixedly mounting the at least first nonrotating vehicle body circular force generator to a nonrotating vehicle body, controlling the at least first nonrotating vehicle body circular force generator to produce a rotating force with a controllable rotating force magnitude and a controllable rotating force phase, providing hub mounted vibration control system, fixedly mounting the hub mounted vibration control system to a rotatable hub of the nonrotating vehicle body, providing distributed force generation data communications network link and linking the hub mounted vibration control system together with the at least first nonrotating vehicle body circular force generator.

It will be apparent to those skilled in the art that various modifications and variations can be made to the invention without departing from the spirit and scope of the invention. Thus, it is intended that the invention cover the modifications and variations of this invention provided they come within the scope of the appended claims and their equivalents. It is intended that the scope of differing terms or phrases in the claims may be fulfilled by the same or different structure(s) or step(s).

The invention claimed is:

1. A rotary wing aircraft, said rotary wing aircraft having a nonrotating aerostructure body and a rotating rotary wing hub,
   said rotary wing aircraft including a vehicle vibration control system,
   a rotating hub mounted vibration control system, said rotating hub mounted vibration control system mounted to said rotating rotary wing hub with said rotating hub mounted vibration control system rotating with said rotating rotary wing hub,
   a rotary wing aircraft member sensor for outputting rotary wing aircraft member data correlating to said relative rotation of said rotating rotary wing hub member rotating relative to said nonrotating body,
   at least a first nonrotating body vibration sensor, said at least first nonrotating body vibration sensor outputting at least first nonrotating body vibration sensor data correlating to vibrations,
   at least a first nonrotating body circular force generator, said at least a first nonrotating body circular force generator fixedly coupled with said nonrotating body,
   a distributed force generation data communications network link, said distributed force generation data communications system network link linking together at least said first nonrotating body circular force generator and said rotating hub mounted vibration control system wherein said rotating hub mounted vibration control system and said first nonrotating body circular force generator communicate force generation vibration control data through said distributed force generation data communications network, said at least first nonrotating body circular force generator controlled to produce a rotating force with a controllable rotating force magnitude and a controllable rotating force phase, said controllable rotating force magnitude controlled from a minimal force magnitude up to a maximum force magnitude, and with said controllable rotating force phase controlled in reference to said rotary wing aircraft member sensor data correlating to said relative rotation of said rotating rotary wing hubrotating relative to said nonrotating body wherein said vibration sensed by said at least first nonrotating body vibration sensor is reduced.

2. An aircraft, as claimed in claim 1, including m nonrotating vehicle body circular force generators.

3. An aircraft, as claimed in claim 1, said rotating hub mounted vibration control system including a first rotating body vibration sensor, said rotating hub mounted vibration control system first rotating body vibration sensor outputting first rotating body vibration sensor data into said distributed force generation data communications network link.

4. An aircraft, as claimed in claim 1, wherein a master controller connected to said distributed force generation data communications network link controls said rotating hub mounted vibration control system and said first nonrotating body circular force generator wherein vibrations sensed by said at least a first nonrotating body vibration sensor are minimized.

5. An aircraft, as claimed in claim 1, wherein said distributed force generation data communications network link is a serial communications network link.

6. An aircraft, as claimed in claim 1, wherein rotating rotary wing hub has an operational rotation frequency and said rotating hub mounted vibration control system including a first hub mounted vibration control system rotor with a first imbalance mass concentration, said first hub mounted vibration control system rotor driven to rotate at a first rotation speed greater than said operational rotation frequency of said rotating rotary wing hub, a second hub mounted vibration control system rotor with a second imbalance mass concentration, said second hub mounted vibration control system rotor driven to rotate at said first rotation speed greater than said operational rotation frequency of said rotating rotary wing hub, a third hub mounted vibration control system rotor with a third imbalance mass concentration, said third hub mounted vibration control system rotor driven to rotate at a second rotation speed greater than said operational rotation frequency of said rotating rotary wing hub, a fourth hub mounted vibration control system rotor with a fourth imbalance mass concentration, said fourth hub mounted vibration control system rotor driven to rotate at said second rotation speed greater than said operational rotation frequency of said rotating rotary wing hub.

7. An aircraft, as claimed in claim 1, wherein said rotating hub mounted vibration control system including a first hub mounted vibration control system rotor with a first imbalance mass concentration, said first hub mounted vibration control system rotor driven to rotate at a first rotor speed greater than an operational rotation frequency of said rotating rotary wing hub, a second hub mounted vibration control system rotor with a second imbalance mass concentration, said second hub mounted vibration control system rotor driven to rotate at a second rotor speed greater than said operational rotation frequency of said rotating rotary wing hub.

8. An aircraft, as claimed in claim 1, wherein said first nonrotating body circular force generator includes a local drive electronic control system, and said first nonrotating body circular force generator local drive electronic control system comprises a node on said distributed force generation data communications network link.

9. An aircraft, as claimed in claim 1, wherein said rotating hub mounted vibration control system receives said rotary wing aircraft member data from said distributed force generation data communications network link.

10. An aircraft as claimed in claim 1, including at least a first distributed networked accelerometer, said at least first distributed networked accelerometer having an accelerometer network link with said distributed force generator data communications network.

11. An aircraft as claimed in claim 1, including n vibration sensors and m circular force generators, with $m \geq 2$, said first circular force generator including a first rotating mass ($mass_{1\_1}$) controllably driven about a first circular force generator axis with a first rotating mass controllable rotating imbalance phase $\Phi_{1\_1}$ and a second corotating mass ($mass_{1\_2}$) controllably driven about said first circular force generator axis with a second rotating mass controllable rotating imbalance phase $\Phi_{1\_2}$, and a second circular force generator including a first rotating mass ($mass_{2\_1}$) controllably driven about a second circular force generator axis with a first rotating mass controllable rotating imbalance phase $\Phi_{2\_1}$ and a second corotating mass ($mass_{2\_2}$) controllably driven about said second circular force generator axis with a second rotating mass controllable rotating imbalance phase $\Phi_{2\_2}$, said second circular force generator oriented relative to said first circular force generator wherein said second circular force generator axis is nonparallel with said first circular force generator axis.

12. An aircraft as claimed in claim 1, wherein $m \geq 3$, and including a third circular force generator including a first rotating mass ($mass_{3\_1}$) controllably driven about a third circular force generator axis with a first rotating mass controllable rotating imbalance phase $\Phi_{3\_1}$ and a second corotating mass ($mass_{3\_2}$) controllably driven about said third circular force generator axis with a second rotating mass controllable rotating imbalance phase $\Phi_{3\_2}$, said third circular force generator axis oriented relative to said second circular force generator axis and said first circular force generator axis.

13. An aircraft as claimed in claim 1, wherein said aircraft nonrotating body includes a ceiling and a distal floor, said distal floor below said ceiling, including n nonrotating body vibration sensors and m nonrotating body circular force generators, a controller calculating a rotating reference signal from said rotating member data correlating to said relative rotation of said rotating hubmember rotating relative to said nonrotating body, said first nonrotating body circular force generator including a first rotating mass ($mass_{1\_1}$) controllably driven about a first rotating mass axis with a first rotating mass controllable rotating imbalance phase $\Phi_{1\_1}$, and a second corotating mass ($mass_{1\_2}$) controllably driven about a second rotating mass axis with a second rotating mass controllable rotating imbalance phase $\Phi_{1\_2}$, said imbalance phase $\Phi_{1\_1}$ and said imbalance phase $\Phi_{1\_2}$ controlled in reference to said rotating reference signal, said first nonrotating body circular force generator mounted to said body proximate said ceiling, and said mth nonrotating body circular force generator including a first rotating mass ($mass_{m\_1}$) controllably driven about a first rotating mass axis with a first rotating mass controllable rotating imbalance phase $\Phi_{m\_1}$ and a second corotating mass ($mass_{m\_2}$) controllably driven about a second rotating mass axis with a second rotating mass controllable rotating imbalance phase $\Phi_{m\_2}$, said imbalance phase $\Phi_{m\_1}$ and said imbalance phase $\Phi_{m\_2}$ controlled in reference to said rotating reference signal, said mth nonrotating vehicle body circular force generator mounted to said vehicle body proximate said floor.

14. An aircraft vibration control system, for a aircraft vehicle having a nonrotating aerostructure body and a rotating rotary wing hub, including, a rotating hub mounted vibration control system, said rotating hub mounted vibration control system mounted to said rotating rotary wing hub with said rotating hub mounted vibration control system rotating with said rotating rotary wing hub, a rotary wing aircraft member sensor for outputting rotary wing aircraft member data correlating to said relative rotation of said rotating rotary wing hub member rotating relative to said nonrotating body, at least a first nonrotating body vibration sensor, said at least first nonrotating body vibration sensor outputting at least first nonrotating body vibration sensor data correlating to vibrations, at least a first nonrotating body force generator, said at least first nonrotating body force generator fixedly coupled with said nonrotating body, a distributed force generation data communications network serial link, said distributed force generation data communications system network serial link linking together at least said first nonrotating body force generator and said rotating hub mounted vibration control system wherein said rotating hub mounted vibration control system and said first nonrotating body force generator communicate and share force generation vibration control data through said distributed force generation data communications network, said at least first nonrotating body force generator controlled to produce a force with a controllable magnitude and a controllable phase, said controllable force magnitude controlled from a minimal force magnitude up to a maximum force magnitude, and with said controllable force phase controlled in reference to said rotary wing aircraft member sensor data correlating to said relative rotation of said rotating rotary wing hub rotating relative to said nonrotating body and said rotating hub mounted vibration control system includes at least a first hub mounted vibration control system rotor with a first imbalance mass concentration, said first hub mounted vibration control system rotor driven to rotate at a first rotation speed greater than an operational rotation frequency of said rotating rotary wing hub, and at least a second hub mounted vibration control system rotor with a second imbalance mass concentration, said second hub mounted vibration control system rotor driven to rotate at said first rotation speed greater than said operational rotation frequency of said rotating rotary wing hub, wherein said vibration sensed by said at least first nonrotating body vibration sensor is reduced.

15. An aircraft vibration control system as claimed in claim 14 wherein said rotating hub mounted vibration control system includes a third hub mounted vibration control system rotor with a third imbalance mass concentration, said third hub mounted vibration control system rotor driven to rotate at a second rotation speed greater than said operational rotation frequency of said rotating rotary wing hub, and a fourth hub mounted vibration control system rotor with a fourth imbalance mass concentration, said fourth hub mounted vibration control system rotor driven to rotate at said second rotation speed greater than said operational rotation frequency of said rotating rotary wing hub.

16. An aircraft vibration control system, for a aircraft vehicle having a nonrotating aerostructure body and a rotating rotary wing hub, including, a rotating hub mounted means for controlling vibrations, said rotating hub mounted means for controlling vibrations mounted to said rotating rotary wing hub with said rotating hub mounted means for controlling vibrations rotating with said rotating rotary wing hub, a rotary wing aircraft member sensor for outputting rotary wing aircraft member data correlating to said relative rotation of said rotating rotary wing hub member rotating relative to said nonrotating body, at least a first nonrotating body vibration sensor, said at least first nonrotating body vibration sensor outputting at least first nonrotating body vibration sensor data correlating to vibrations, at least a first nonrotating body force generator, said at least first nonrotating body force generator fixedly coupled with said nonrotating body, a means for linking together said first nonrotating body force generator and said rotating hub mounted means for controlling vibrations wherein said rotating hub mounted means for controlling vibrations and said first nonrotating body force generator communicate and share force generation vibration control data through said means for linking, said at least first nonrotating body force generator controlled to produce a force with a controllable magnitude and a controllable phase, said controllable force magnitude controlled from a minimal force magnitude up to a maximum force magnitude, and with said controllable force phase controlled in reference to said rotary wing aircraft member sensor data correlating to said relative rotation of said rotating rotary wing hub rotating relative to said nonrotating body and, wherein said vibration sensed by said at least first nonrotating body vibration sensor is reduced.

17. A vehicle vibration control system for controlling troublesome vibrations in a nonrotating vehicle body having a rotating machine member, said vehicle vibration control system including a vehicle vibration control system controller, a rotating machine member sensor, for inputting vehicle rotating machine member data correlating to a relative rotation of said rotating machine member rotating relative to said nonrotating body into said vehicle vibration control system controller, at least a first nonrotating vehicle body vibration sensor, said at least first nonrotating vehicle body vibration sensor inputting at least first nonrotating vehicle body vibration sensor data correlating to vehicle vibrations into said vehicle vibration control system controller, at least a first nonrotating vehicle body circular force generator, said at least a first nonrotating vehicle body circular force generator for fixedly mounting to said nonrotating vehicle body wherein said at least first nonrotating vehicle body circular force generator is controlled by said controller to produce a rotating force with a controllable rotating force magnitude and a controllable rotating force phase, said controllable rotating force magnitude controlled from a minimal force magnitude up to a maximum force magnitude, and with said controllable rotating force phase controlled in reference to said vehicle rotating machine member sensor data correlating to said relative rotation of said vehicle rotating machine member rotating relative to said nonrotating vehicle body with said vehicle vibration sensed by said at least first nonrotating vehicle body vibration sensor reduced by said controller, and a hub mounted vibration control system, said hub mounted vibration control system linked with said vehicle vibration control system controller.

18. A system, as claimed in claim 17, wherein said hub mounted vibration control system is linked to said vehicle vibration control system controller with a communication bus.

19. A method of controlling vibration, said method including, providing at least a first nonrotating vehicle body circular force generator, fixedly mounting said at least first nonrotating vehicle body circular force generator to a nonrotating vehicle body, controlling said at least first nonrotating vehicle body circular force generator to produce a rotating force with a controllable rotating force magnitude and a controllable rotating force phase, providing hub mounted vibration control system, fixedly mounting said hub mounted vibration control system to a rotatable hub of said nonrotating vehicle body, providing a distributed force generation data communications network link and linking said hub mounted vibration control system together with said at least first nonrotating vehicle body circular force generator.

* * * * *